(12) United States Patent
Noureldin

(10) Patent No.: US 7,729,809 B2
(45) Date of Patent: Jun. 1, 2010

(54) SYSTEM, METHOD, AND PROGRAM PRODUCT FOR TARGETING AND IDENTIFICATION OF OPTIMAL PROCESS VARIABLES IN CONSTRAINED ENERGY RECOVERY SYSTEMS

(75) Inventor: Mahmoud Bahy Noureldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 12/575,743

(22) Filed: Oct. 8, 2009

(65) Prior Publication Data
US 2010/0070258 A1 Mar. 18, 2010

Related U.S. Application Data

(63) Continuation-in-part of application No. 11/768,084, filed on Jun. 25, 2007.

(60) Provisional application No. 60/816,234, filed on Jun. 23, 2006.

(51) Int. Cl.
G06F 19/00 (2006.01)
G05D 9/00 (2006.01)
G05D 11/00 (2006.01)

(52) U.S. Cl. .............. 700/291; 700/278; 700/299; 60/206; 60/266; 60/267; 703/2; 703/7; 703/9

(58) Field of Classification Search .......... 700/278, 700/291, 299; 60/206, 266, 267; 703/2, 703/7, 9
See application file for complete search history.

(56) References Cited

U.S. PATENT DOCUMENTS

| 4,142,108 | A | * | 2/1979 | Matthews ................ 290/1 R |
| 4,449,571 | A | * | 5/1984 | Kramert .................. 126/248 |
| 5,269,135 | A | * | 12/1993 | Vermejan et al. .......... 60/226.1 |
| 5,517,428 | A | | 5/1996 | Williams |
| 6,785,633 | B2 | | 8/2004 | Patanian et al. |
| 7,103,452 | B2 | | 9/2006 | Retsina |

(Continued)

FOREIGN PATENT DOCUMENTS

CN 101206754 A 6/2008

(Continued)

OTHER PUBLICATIONS

"Optimization Application: Pinch Technology Analysis", Excerted from chapter 9 of "Optimum Design and Design Strategy", pp. 414-433.*

(Continued)

*Primary Examiner*—Michael D Masinick
(74) *Attorney, Agent, or Firm*—Bracewell & Giuliani LLP

(57) ABSTRACT

Systems, methods, and program product to calculate global energy utility targets and to model and determine an optimal solution for a non-thermodynamically constrained process or cluster of processes subject to non-thermodynamic constraints under all possible process changes and streams specific minimum temperature approaches, are provided. An exemplary system can utilize thermodynamic constraints exhibited in stream-specific minimum temperature approach values $\Delta T_{min}^i$ as optimization parameters, in addition to other process conditions degrees of freedom including the addition of new waste heat carrier streams to target for minimizing energy consumption of the non-thermodynamic constrained waste heat recovery problem and to identify the optimal operating conditions that result in desired minimum energy consumption subject to the non-thermodynamic constraints.

55 Claims, 24 Drawing Sheets

U.S. PATENT DOCUMENTS

| | | | |
|---|---|---|---|
| 7,125,540 B1* | 10/2006 | Wegeng et al. | 423/650 |
| 7,356,383 B2 | 4/2008 | Pechtl et al. | |
| 2002/0134542 A1* | 9/2002 | Unsworth | 165/277 |
| 2006/0036417 A1 | 2/2006 | Wu et al. | |
| 2006/0048920 A1* | 3/2006 | Helleur | 165/108 |
| 2007/0061049 A1 | 3/2007 | Masuda et al. | |
| 2008/0140376 A1 | 6/2008 | Elgue et al. | |
| 2008/0163625 A1* | 7/2008 | O'Brien | 60/651 |
| 2009/0151321 A1* | 6/2009 | Jarmon et al. | 60/266 |

FOREIGN PATENT DOCUMENTS

| | | |
|---|---|---|
| JP | 2002122005 A | 4/2002 |
| JP | 2003016113 A | 1/2003 |
| JP | 2004272347 A | 9/2004 |
| WO | 01/08054 A2 | 2/2001 |
| WO | 2005/010783 A1 | 2/2005 |

OTHER PUBLICATIONS

"Pinch Location and minimum temperature approach for discontinuous composite curves", Lakshmanan et al, Department of chemical engineering, The University of Edinburgh, UK. Mar. 17, 2002.*

"Optimization of CHP systems using pinch technology", Saboo et al, SRM University, Chennai India, date not known.*

"Energy Recovery by punch technology", Matijaseviae et al, Univeristy of Zagreb, Croatia, Sep. 17, 2001.*

"Pinch Analysis: For the Efficient Use of Energy, Water, and Hydrogen", Canmet Energy, Industrial Systems Operation, Oil Refining, Mar. 2003.*

Yerramsetty et al., "Synthesis of cost-optimal heat exchanger networks using differential evolution", Computer & Chemical Engineering 32, 2008, pp. 1861-1876, www.elsevier.com/locate/compchemeng.

Gundersen et al., "The Synthesis of Cost Optimal Heal Exchanger Networks", An Industrial Review of the State of the Art, Review Paper, vol. 12, No. 6, pp. 503-530, 1998.

Furman et al. "A Critical Review and Annotated Bibliography for Heat Exchanger Network Synthesis in the 20th Century", Reviews, Ind. Eng. Chem. Res. 2002, 41, 2335-2370, 2002.

Ruyck et al., "Broadening the Capabilities of pinch analysis through virtual heat exchanger networks", Energy Conversion & Management 44, 2003, 2321-2329, www.elsevier.com/locate/encanman.

Neil Petchers, "Combined Heating, Cooling & Power Handbook: Technologies & Applications", An Integrated Approach to Energy Resource Optimization, Chapter 8, 2003, XP-002489819.

Serna et al., "An are targeting algorithm for the synthesis of heat exchanger networks", Chemical Engineering Science 59, 2004, pp. 2517-2520, www.elsevier.com/locate/ces.

Ravagnani et al., "Heat exchanger network synthesis and optimisation using genetic algorithm" Applied Thermal Engineering 25, 2005, 1003-1017, www.elsevier.com/locate/apthermeng.

* cited by examiner

SYSTEM, METHOD, AND PROGRAM PRODUCT FOR TARGETING AND IDENTIFICATION OF OPTIMAL PROCESS VARIABLES IN CONSTRAINED ENERGY RECOVERY SYSTEMS

RELATED APPLICATIONS

This non-provisional application is a continuation-in-part application of and claims priority to and the benefit of U.S. patent application Ser. No. 11/768,084, filed Jun. 25, 2007, titled "System, Method, and Program Product for Targeting an Optimal Driving Force Distribution in Energy Recovery Systems" which claims priority to and the benefit of U.S. Patent Application No. 60/816,234, filed Jun. 23, 2006, titled "Method and Program Product for Targeting and Optimal Driving Force Distribution in Energy Recovery Systems," and is related to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit," each incorporated herein by reference in its entirety.

BACKGROUND OF THE INVENTION

1. Field of the Invention

The present invention relates in general to the field of energy recovery systems, and in particular, systems, program product, and methods related to determining, calculating, and modeling energy consumption requirements of a non-thermodynamically constrained process or cluster of processes.

2. Description of the Related Art

Many different types of processes consume energy to obtain an output result, or to produce a required product or compound. For example, chemical processes consume energy to provide a desired result. For large-scale processes that consume significant amounts of energy, it is preferable to minimize the energy consumed, where possible. In the case of, for example, electrical energy generation systems or relatively large manufacturing plant or factories, it is preferable to optimize and potentially minimize the consumption of energy through careful operation, design or reconfiguration of the plant and equipment used, taking into considerations process constraints such as safety, health and environment.

For example, in some industrial manufacturing processes, specific streams of material flows need to be supplied to different types of equipment and machinery at specific temperatures. These material flows may need to be heated or cooled from an original starting temperature to a target temperature. This, in turn, will require the consumption of energy to not only cool specific streams, but also to heat other specific streams while monitoring for corrosion problems, scaling problems, streams location, environmental compliances, and hazardous situations.

The total energy employed or consumed by the industrial manufacturing processes can be optimized to a global minimal level through, for example, careful placement and configuration of specific material streams with respect to one another. For example, there may be the potential for hot streams that require cooling to be placed in proximity with cold streams that require heating. Streams having thermal energy already present that needs to be removed, or streams that need to have heat added, can be associated with one another to optimize the energy consumption of the process. In addition, the minimum temperature differences between hot streams and cold streams upon optimization can also result in huge savings in energy consumption. These savings, however, are not realizable as long as there are some constraints that may prevent some of the streams from being matched with some others, and therefore, needs some consideration. These "non-thermodynamic" constraints, for example, can be related to corrosion, environmental reasons, scaling, leakage problems, streams far apart, or streams in different hazardous zones, etc.

These considerations can be taken into account during the energy targeting phase prior to design, or alternatively, during the reconfiguration or refitting of the plant or equipment. It is by the inventor that it would be preferable to consider these optimization issues with a modeling system prior to the actual design, redesign, construction or modification of the actual plant and equipment. State-of-the-art software currently on the market, including AspenTech Inc. software Aspen Pinch and HX-NET Pinch Express of KBC and Sprint of UMIST, however, do not address such targeting problem for non-thermodynamically constrained process situations under all possible combinations of solutions in the process, which can include the modifying resource stream conditions of one or more of all streams and/or adding one or more heat carriers at different flow and supply temperatures. In the targeting phase, these software products only allow specific stream conditions of a process to be tracked and individual operational attributes associated with these streams to be modeled and adjusted, if required. In general terms, such software products are normally employed to track the temperatures and heat capacity flows of specific material streams in a process. Although such software can provides useful tools, they are not particularly flexible in application, and do not address some of the above problems systematically.

For example, in grassroots heat exchanger network design, the parameter known as global $\Delta T_{min}$ (referred to interchangeably as minimum approach temperature or minimum temperature approach) is typically used in the state-of-the-art commercial software to represent the desired level of heat recovery between hot and cold streams, such as, for example, the minimum temperature difference allowed to recover energy through a heat exchanger. A single value for a specific material stream attribute can only be adjusted at one time including the $\Delta T_{min}$. This forces a user of the system to employ a trial and error approach through 'tweaking' particular attributes of specific streams one at a time, to hopefully arrive at an optimized value for Qc and/or Qh, which represent the total energy consumed for heating (Qh) and the total energy consumed for cooling (Qc) for the process model. This limitation becomes compounded and makes the existing software difficult to employ effectively in large-scale processes, which employ many material streams, where these material streams may have a number of operational attributes that can be modeled and adjusted. This is also the case when several sets of stream-specific minimum temperature approaches need to be analyzed for optimal energy recovery for constrained waste energy recovery system.

Further, process stream changes not only may result in reduction in energy utility, but may also bring reduction in $\Delta T_{min}$. Thus, in current state-of-the art technology, the capital/energy trade-off in energy system synthesis must be readjusted after each process change. Recognized by the inventor is that the change in the driving force distribution due to both stream-specific $\Delta T_{min}$ and each process change also affects the utility level selection, and that the problem is interlinked and multi-dimensional in that process changes and stream-specific $\Delta T_{min}$ selection are often competing for optimal selection of utilities, optimal process conditions, and optimal energy recovery system synthesis especially for constrained waste heat recovery problems that exhibit several process constraints in matching hot and cold streams, for example, as identified above.

The two main methods that are currently in use in academia and in commercial products to attempt to address such issues are: mathematical programming and thermodynamic-heuristics based pinch technology. Both methods, however, fail to solve the problem of finding energy targets for waste heat recovery constrained problems, systematically, under all reasonably possible combinations of solutions using steam specific minimum temperature approach values or account for insertion of new carrier streams and/or changing specific streams flow, supply temperatures and target temperatures simultaneously, without manual iteration.

It is recognized by the inventor that driving force variation in constrained energy recovery systems can come from the combined effect of: the system's process conditions, the hot and cold stream minimum temperature approach value(s) $\Delta T_{min}$, and the nature of the streams included in the waste heat recovery problem. As such, it is recognized by the inventor that the optimal selection of the optimal solution to the constrained waste heat recovery system that can provide a significant positive impact on energy consumption, utility selection, utility systems, and/or energy recovery systems capital investment, would be a great contribution, especially in the current energy crisis market.

Currently, there are no methods or associated algorithms that can handle the theoretical, practical, and more economical non-thermodynamically constrained waste heat recovery targeting problem under variable process conditions to target and find optimal conditions without manual iterations (manual data entry) and in a user-friendly manner.

NZ Patent No. 527,244 (July 2004) and WO Application No. 2005/1,010,783 (February 2005) have addressed the problem of energy targeting to find an optimal driving force distribution due to process conditions optimization, but only for a global $\Delta T_{min}$, and not for stream-specific $\Delta T_{min}^i$. Other prior teachings have suggested using heuristics to find the energy utility targets and an optimal driving force distribution at constant process conditions and stream-dependent $\Delta T_{min}$. Still other prior teachings have tried to find an optimal driving force distribution through process conditions optimization at a fixed global $\Delta T_{min}$ using mathematical programming.

U.S. Non-Provisional patent application Ser. No. 11/768, 084, filed Jun. 25, 2007, by Noureldin et al., has addressed the problem of the energy targeting and finding the optimal process conditions taking into consideration heat exchangers network capital cost and pareto calculation, but in the energy targeting calculation portion it did not explicitly describe and analyze application to non-thermodynamics-based constraints such as, for example, corrosion, scaling, the physical existence of streams, safety and hazardous issues, health and environmental compliances and operability or other constraints that were not embedded in the list of the problem constraints.

In most industrial processes, it is at least inefficient, if not impractical, to require that all heat exchangers (and thus, all process streams and utilities) obey the same global minimum value for driving forces, since streams (process and utility), in general, have very different heat transfer coefficients. Quite often, the difference in film heat transfer coefficients can be several orders of magnitude. Thus, some heat exchangers require large $\Delta T_{min}$ values in order to avoid requiring an excessive heat transfer area, while other units will manage well with much smaller $\Delta T_{min}$ values. Accordingly, recognized by the inventor is that a hot stream-specific minimum temperature approach optimal set can lead to much better energy consumption targets, especially for non-thermodynamically constrained waste heat recovery problems. Further, when considering retrofitting, the same problems exist with still no practical solution to simultaneously finding energy targets under all possible combinations of different process conditions, while using stream-specific minimum temperature approach values ($\Delta T_{min}^i$).

Some scientists have recognized the need for at least assigning individual contributions to the minimum driving forces for each stream and utility, based upon the heat transfer coefficient of matched streams. These $\Delta T_{min}$ contributions could possibly, not only reflect heat transfer conditions, but could be used to represent the need for expensive materials of construction, heat exchanger types, etc. These methods, however, are based upon heuristics and are iterative, lack systemization, and do not consider the possible changes in process conditions that can result in significant changes in the energy system driving force distribution.

It has also been recognized by the inventor that in most industrial processes, it is at least inefficient, if not impractical, to properly target and find the most optimal conditions for waste heat recovery systems by employing an analysis which assumes non-constrained matches among hot and cold process streams. Further, while some researchers and commercial software are attempting to target for constrained energy recovery systems using linear programming, they do not consider the effect under even a reasonable expected set of possible combinations of process modifications that can include parametric and structural modifications such as, for example, the addition of one or more heat carrier streams, which can render better solutions of the constrained problem.

Accordingly, recognized by the inventor is that it would be beneficial to have a system, method and program product that can employ an algorithm that utilizes both process conditions manipulation including the creation of new heat carrier streams, and stream-specific minimum temperature approach values $\Delta T_{min}^i$ manipulation to target for energy consumption of constrained waste heat recovery problems under all possible solutions that can substantially reduce the effect of the constraints on the waste heat recovered values and that can be employed to find the best solution to reach the desired target systematically, without iteration or enumeration, without customized modeling, and in a user friendly manner.

SUMMARY OF THE INVENTION

In view of the foregoing, embodiments of the present invention advantageously provide an improved method, system and program product for theoretical, practical and economical energy targeting for the design and retrofit of energy recovery systems having one or more non-thermodynamic constraints usable to find global energy utility targets, to establish a good starting point for energy system design/retrofit using desired levels of heat recovery, to find optimal driving force distributions in the energy system which is a function of the combined effect of process conditions and stream-specific minimum temperature approach values $\Delta T_{min}^i$, and to establish a high fidelity relationship between energy cost versus capital cost to design energy recovery systems systematically and without enumeration.

Various embodiments of the present invention also provide systems, methods and user-friendly program product which incorporate an algorithm to calculate global energy utility targets and to define optimal solutions for a constrained process or cluster of processes under all possible process changes that support the inclusion of new heat carrier streams and thermodynamic constraints such as streams specific minimum temperature approach, simultaneously, and without a requirement for enumeration for a non-thermodynamic constrained waste heat recovery problem. Such embodiments of the present invention can advantageously utilize thermodynamic constraints exhibited in stream-specific minimum temperature approaches $\Delta T_{min}^i$, where the superscript "i" represents the specific hot stream optimally via considering them, for example, as optimization parameters, in addition to other process conditions degrees of freedom that include the addition of new waste heat carrier streams to target for minimizing energy consumption of the non-thermodynamic constrained waste heat recovery problem and to identify the optimal operating conditions that result in desired minimum energy consumption. Various embodiments of the present invention incorporate an algorithm to define optimal process conditions, process conditions of waste energy carrier streams, and the corresponding stream-specific minimum temperature approach values in heat recovery systems that can minimize energy consumption of the non-thermodynamic constrained waste heat recovery system.

Specifically, various embodiments of the present invention provide systems to optimize energy recovery for a process having a plurality of resource streams each having at least one, but more typically, a plurality of operational attributes. According to an embodiment of the present invention, such a system can include an energy utility modeling computer having a processor, and memory coupled to the processor to store software and database records therein, and a database stored in the memory (volatile or nonvolatile, internal or external) of the energy modeling computer. The database can include a plurality of sets of values each separately defining a potential range of values for at least one operational attribute for each of a plurality of hot process streams, and a plurality of sets of values each separately defining a potential range of values for at least one operational attribute for each of a plurality of cold process streams. These attributes can include, for example, a lower and an upper boundary value for a supply temperature (Ts) of each of the plurality of hot process streams and each of the plurality of cold process streams, a lower and an upper boundary value for a target temperature (Tt) of each of the plurality of hot process streams and each of the plurality of cold process streams, a lower and an upper boundary value for a heat capacity flow rate (FCp) of each of the plurality of hot process streams and each of the plurality of cold process streams. The database can also include one or more sets of values including lower and upper stream specific minimum temperature approach boundary values ($\{\Delta T_{min}^i[L:U]\}$) for each of the plurality of hot process streams.

The system can also include energy utility modeling program product either on a separate deliverable computer readable medium, e.g., DVD, etc., or stored in the memory of the energy utility modeling computer and adapted to optimize energy recovery for the process. The energy utility modeling program product can include instructions that when executed, for example, by the energy utility modeling computer, can cause the computer to perform the operations of receiving a first plurality of sets of values each separately defining a potential range of attribute values for an attribute of a plurality of attributes of one of a plurality of hot process streams and a second plurality of sets of values each separately defining a potential range of attribute values for an attribute of a plurality of attributes of one of a plurality of cold process streams, receiving a constrained stream list including an identification of at least one non-thermodynamically constrained process stream constrained from matching at least one other process stream due to a non-thermodynamic constraint (i.e., forbidden matches between streams), assigning a set of a plurality of stream-specific minimum temperature approach values $\{\Delta T_{min}^i\}$ to a corresponding plurality of hot process streams, decreasing a value of one of the plurality of minimum temperature approach value $\Delta T_{min}^i$ in the set of a plurality of stream-specific minimum temperature approach values $\{\Delta T_{min}^i\}$ assigned to a corresponding one of the plurality of hot process streams, and determining a plurality of temperature step intervals responsive to: the potential range of attribute values for the plurality of hot process streams, the potential range of attribute values for the plurality of cold process streams, and the assigned set of the plurality of stream-specific minimum temperature approach values $\Delta T_{min}^i$. Each temperature step interval can have an input interval indicating heat extracted collectively from the plurality of hot process streams, an output interval [EXCHH] indicating heat collectively applied to the plurality of cold process streams, and an output interval [$Q_s^{low\_surplus}$, $Q_s^{high\_surplus}$] indicating surplus heat available for a next of the plurality of temperature step intervals.

The operations can also include determining a global heating energy utility interval [Qh(minimum), Qh(maximum)] or simply [Qh] for exchangeable energy for the non-thermodynamically constrained process using the plurality of temperature step intervals, and determining a total global heating energy utility interval [Qh_total] for the non-thermodynamically constrained process responsive to determining the global heating energy utility interval [Qh] and a load value of non-exchangeable heating energy [EXTH].

The operations can further include determining a symmetric image [Qh(maximum), Qh(minimum)] of the global heating energy utility interval [Qh(minimum), Qh(maximum)] responsive to determining the global heating energy utility interval [Qh(minimum), Qh(maximum)], applying the symmetric image to the plurality of temperature step intervals, determining a global cooling energy utility interval [Qc(minimum), Qc(maximum)] or simply [Qc] for exchangeable energy for the non-thermodynamically constrained process, and determining a total global cooling energy utility interval [Qc_total] for the non-thermodynamically constrained process responsive to determining the global cooling energy utility interval [Qc] and a load value of non-exchangeable cooling energy [EXTC].

The operations can further include determining stream-by-stream for each of the plurality of temperature step intervals, a load value of non-exchangeable energy ([NON-EXCHC]) to be obtained from at least one external hot utility for the respective temperature step interval and each preceding temperature step interval to thereby determine a total of non-exchangeable energy [EXTH] to be obtained from the at least one external hot utility, and a load value of non-exchangeable energy ([NON-EXCHH]) to be obtained from at least one external cold utility for the responsive temperature step interval and each following temperature step interval to thereby determine a total of non-exchangeable energy [EXTC] to be obtained from the at least one external cold utility.

Still further, the operations can include determining the total global heating energy utility interval [Qh_total] by adding the optimal global heating energy utility interval [Qh] for exchangeable energy for the non-thermodynamically constrained process and the total of non-exchangeable energy [EXTH] to be obtained from at least one external hot utility required for each of the first plurality of temperature step intervals, and determining the total global cooling energy utility interval [Qc_total] by adding the optimal global cooling energy utility interval [Qc] for exchangeable energy for the non-thermodynamically constrained process and the total of non-exchangeable energy [EXTC] to be obtained from at least one external cold utility required for each of the first plurality of temperature step intervals.

The operations can also further include performing each of the operations of assigning a set of a plurality of stream-specific minimum temperature approach values $\{\Delta T_{min}^i\}$, decreasing a value of one of the plurality of minimum temperature approach value $\Delta T_{min}^i$ assigned to a corresponding one of the plurality of hot process streams, determining a plurality of temperature step intervals, determining a global heating energy utility interval [Qh(minimum), Qh(maximum)], determining an total global heating energy utility interval [Qh_total], determining a global cooling energy utility interval [Qc(minimum), Qc(maximum)], and determining a total global cooling energy utility interval [Qc_total], for each other of the plurality of hot process streams to thereby form a plurality of different sets of minimum temperature approach values $\{\Delta T_{min}^i\}$ and a corresponding plurality of global minimum heating and global minimum cooling energy utility values. The operations can still further include determining a set of minimum temperature approach values $\{\Delta T_{min}^i\}$ of the plurality of different sets of minimum temperature approach values $\{\Delta T_{min}^i\}$ resulting in a maximum decrease in: the total global minimum heating energy utility value, the total global minimum cooling energy utility value, or the total global minimum heating energy utility value and total global minimum cooling energy utility value, associated therewith, to thereby determine an optimal total global minimum heating energy utility value Qh_total and/or determine an optimal total global minimum cooling energy utility value Qc_total, which approach that of the subject industrial process without the inefficiencies caused by the non-thermodynamic constraints.

The operations can also include determining optimal process conditions that render the more important optimal total global minimum heating energy utility value (Qh_total) or optimal total global minimum cooling energy utility value (Qc_total) responsive to the determined optimal total energy consumption value. The optimal process conditions can include optimal supply temperature, an optimal target temperature, and an optimal flowrate for each of the plurality of existing process streams. The optimal process conditions can also include an optimal supply temperature, an optimal target temperature, and an optimal flowrate for each of the one or more newly created process streams resulting from the application of one or more dummy heat carrier resource stream into the above calculations.

According to another embodiment of the energy utility modeling program product, the operations can include receiving a first plurality of sets of range attribute values each separately defining a potential range of attribute values for an attribute of one of a plurality of hot process streams and a second plurality of sets of range attribute values each separately defining a potential range of attribute values of an attribute of one of a plurality of cold process streams, and indicia of the non-thermodynamically constrained process stream defining input data, determining a global minimum energy utility value for exchangeable energy for the non-thermodynamically constrained process for each of a plurality of potential combinations of a plurality of stream-specific minimum temperature approach values $\Delta T_{min}^i$ assigned to each of the plurality of hot process streams responsive to the input data, determining a total of non-exchangeable energy to be obtained from at least one external utility for the non-thermodynamically constrained process for each of the plurality of potential combinations of a plurality of stream-specific minimum temperature approach values $\Delta T_{min}^i$ assigned to each of the plurality of hot process streams responsive to the input data, and determining an optimal total energy consumption value for the non-thermodynamically constrained process responsive to the determined global minimum energy utility value for the non-thermodynamically constrained process and the total of non-exchangeable energy to be obtained from the at least one external utility, for each of the plurality of potential combinations of the plurality of stream-specific minimum temperature approach values $\Delta T_{min}^i$.

According to another embodiment of the energy utility modeling program product, the operations can include determining (e.g., stream-by-stream) for each of a plurality of temperature step intervals for each separate one of a plurality of different sets of minimum temperature approach values $\{\Delta T_{min}^i\}$ assigned to a plurality of hot process streams, a load value of exchangeable energy to be obtained from at least one resource stream for each respective temperature step interval responsive to at least one set of a range of attribute values for a non-thermodynamically constrained process stream, at least one set of a range of attribute values for a not non-thermodynamically constrained process stream (i.e., one with no stream matching constraints), and indicia of at least one non-thermodynamic constraint defining input data to thereby determine a global minimum energy utility value for each of the plurality of different sets of minimum temperature approach values $\{\Delta T_{min}^i\}$. The operations also include determining an optimal global minimum energy utility value for exchangeable energy for the non-thermodynamically constrained process responsive to the global minimum energy utility values determined for each of the plurality of different sets of minimum temperature approach values $\{\Delta T_{min}^i\}$. The operations also include determining (e.g., stream-by-stream) for each of the plurality of temperature step intervals for each of the plurality of different sets of minimum temperature approach values $\{\Delta T_{min}^i\}$, a load value of non-exchangeable energy to be obtained from at least one external utility for the respective temperature step interval to thereby determine a total of non-exchangeable energy to be obtained from the at least one external utility for the non-thermodynamically constrained process for each of the plurality of different sets of minimum temperature approach values $\{\Delta T_{min}^i\}$, determining at least one optimal total energy consumption value ([Qh_total] or [Qc_total]) for the non-thermodynamically constrained process responsive to the determined optimal global minimum energy utility value for the non-thermodynamically constrained process and the determined total of non-exchangeable energy to be obtained from the at least one external utility associated therewith, and determining optimal process conditions that render the optimal total energy consumption value responsive to the determined optimal total energy consumption value.

According to another embodiment of the energy utility modeling program product, the operations can include receiving at least one set of a range of attribute values for at least one attribute of the non-thermodynamically constrained process stream constrained from matching at least one other process stream due to a non-thermodynamic constraint, at least one set of a range of attribute values for at least one attribute of a not non-thermodynamically constrained process stream, optionally at least one set of a range of attribute values for at least one dummy heat carrier stream, and indicia of the non-thermodynamically constrained process stream constrained from matching at least one other process stream due to a non-thermodynamic constraint defining input data, and determining a global minimum energy utility value for exchangeable energy for the non-thermodynamically constrained process for each separate one of a plurality of potential combinations of a plurality of stream-specific minimum temperature approach values $\Delta T_{min}^{i}$ responsive to the input data. The operations can also include determining an optimal global minimum energy utility value for exchangeable energy for the non-thermodynamically constrained process responsive to determining the global minimum energy utility value for each of the plurality of potential combinations of the plurality of stream-specific minimum temperature approach values $\Delta T_{min}^{i}$, determining a total of non-exchangeable energy to be obtained from at least one external utility for the non-thermodynamically constrained process for each of the plurality of potential combinations of the plurality of stream-specific minimum temperature approach values $\Delta T_{min}^{i}$, responsive to the input data, determining an optimal total energy consumption value ([Qh_total] or [Qc_total]) for the non-thermodynamically constrained process responsive to the determined optimal global minimum energy utility value for the non-thermodynamically constrained process and the determined total of non-exchangeable energy associated therewith, and determining optimal process conditions that render the optimal total energy consumption value responsive to the determined optimal total energy consumption value.

Various embodiments of the present invention also include methods of modeling energy consumption of a non-thermodynamically constrained waste heat recovery process, or cluster of processes, using a plurality of resource streams including at least one non-thermodynamically constrained process stream. A method, according to an embodiment of the present invention, can include the steps of: determining (e.g., stream-by-stream) for each of a plurality of temperature step intervals for each separate one of a plurality of different sets of minimum temperature approach values $\{\Delta T_{min}^{i}\}$ assigned to a plurality of hot process streams, a load value of exchangeable energy to be obtained from at least one resource stream for each respective temperature step interval responsive to at least one set of a range of attribute values for a non-thermodynamically constrained process stream, at least one set of a range of attribute values for a not non-thermodynamically constrained process stream (i.e., one with no stream matching constraints), and indicia of at least one non-thermodynamic constraint defining input data to thereby determine a global minimum energy utility value for each of the plurality of different sets of minimum temperature approach values $\{\Delta T_{min}^{i}\}$. The method can also include determining an optimal global minimum energy utility value for exchangeable energy for the non-thermodynamically constrained process responsive to the global minimum energy utility values determined for each of the plurality of different sets of minimum temperature approach values $\{\Delta T_{min}^{i}\}$.

The method can also include determining (e.g., stream-by-stream) for each of the plurality of temperature step intervals for each of the plurality of different sets of minimum temperature approach values $\{\Delta T_{min}^{i}\}$, a load value of non-exchangeable energy to be obtained from at least one external utility for the respective temperature step interval to thereby determine a total of non-exchangeable energy to be obtained from the at least one external utility for the non-thermodynamically constrained process for each of the plurality of different sets of minimum temperature approach values $\{\Delta T_{min}^{i}\}$, determining at least one optimal total energy consumption value ([Qh_total] or [Qc_total]) for the non-thermodynamically constrained process responsive to the determined optimal global minimum energy utility value for the non-thermodynamically constrained process and the determined total of non-exchangeable energy to be obtained from the at least one external utility associated therewith, and determining optimal process conditions that render the optimal total energy consumption value responsive to the determined optimal total energy consumption value.

According to another embodiment of the method, the steps can include receiving at least one set of a range of attribute values for at least one attribute of the non-thermodynamically constrained process stream constrained from matching at least one other process stream due to a non-thermodynamic constraint, at least one set of a range of attribute values for at least one attribute of a not non-thermodynamically constrained process stream, optionally at least one set of a range of attribute values for at least one dummy heat carrier stream, and indicia of the non-thermodynamically constrained process stream constrained from matching at least one other process stream due to a non-thermodynamic constraint defining input data, and determining a global minimum energy utility value for exchangeable energy for the non-thermodynamically constrained process for each separate one of a plurality of potential combinations of a plurality of stream-specific minimum temperature approach values $\Delta T_{min}^{i}$ responsive to the input data.

The steps can also include determining an optimal global minimum energy utility value for exchangeable energy for the non-thermodynamically constrained process responsive to determining the global minimum energy utility value for each of the plurality of potential combinations of the plurality of stream-specific minimum temperature approach values $\Delta T_{min}^{i}$, determining a total of non-exchangeable energy to be obtained from at least one external utility for the non-thermodynamically constrained process for each of the plurality of potential combinations of the plurality of stream-specific minimum temperature approach values $\Delta T_{min}^{i}$, responsive to the input data, determining an optimal total energy consumption value ([Qh_total] or [Qc_total]) for the non-thermodynamically constrained process responsive to the determined optimal global minimum energy utility value for the non-thermodynamically constrained process and the determined total of non-exchangeable energy associated therewith, and determining optimal process conditions that render the optimal total energy consumption value responsive to the determined optimal total energy consumption value.

Various embodiments of the present invention advantageously include provisions for determining/calculating global energy utility targets and for modeling/determining an optimal solution for a non-thermodynamically constrained process or cluster of processes under all possible process changes and streams specific minimum temperature approaches, simultaneously, and that support the inclusion of new heat carrier streams and thermodynamic constraints for the non-thermodynamic constrained waste heat recovery problem, without enumeration. An exemplary system can advantageously utilize thermodynamic constraints exhibited in stream-specific minimum temperature approaches $\Delta T_{min}^{i}$ as optimization parameters, in addition to other process conditions degrees of freedom including the addition of waste heat carrier streams to target for minimizing energy consumption of the non-thermodynamic constrained waste heat recovery problem and to identify the optimal operating conditions that result in desired minimum energy consumption subject to the non-thermodynamic constraints.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
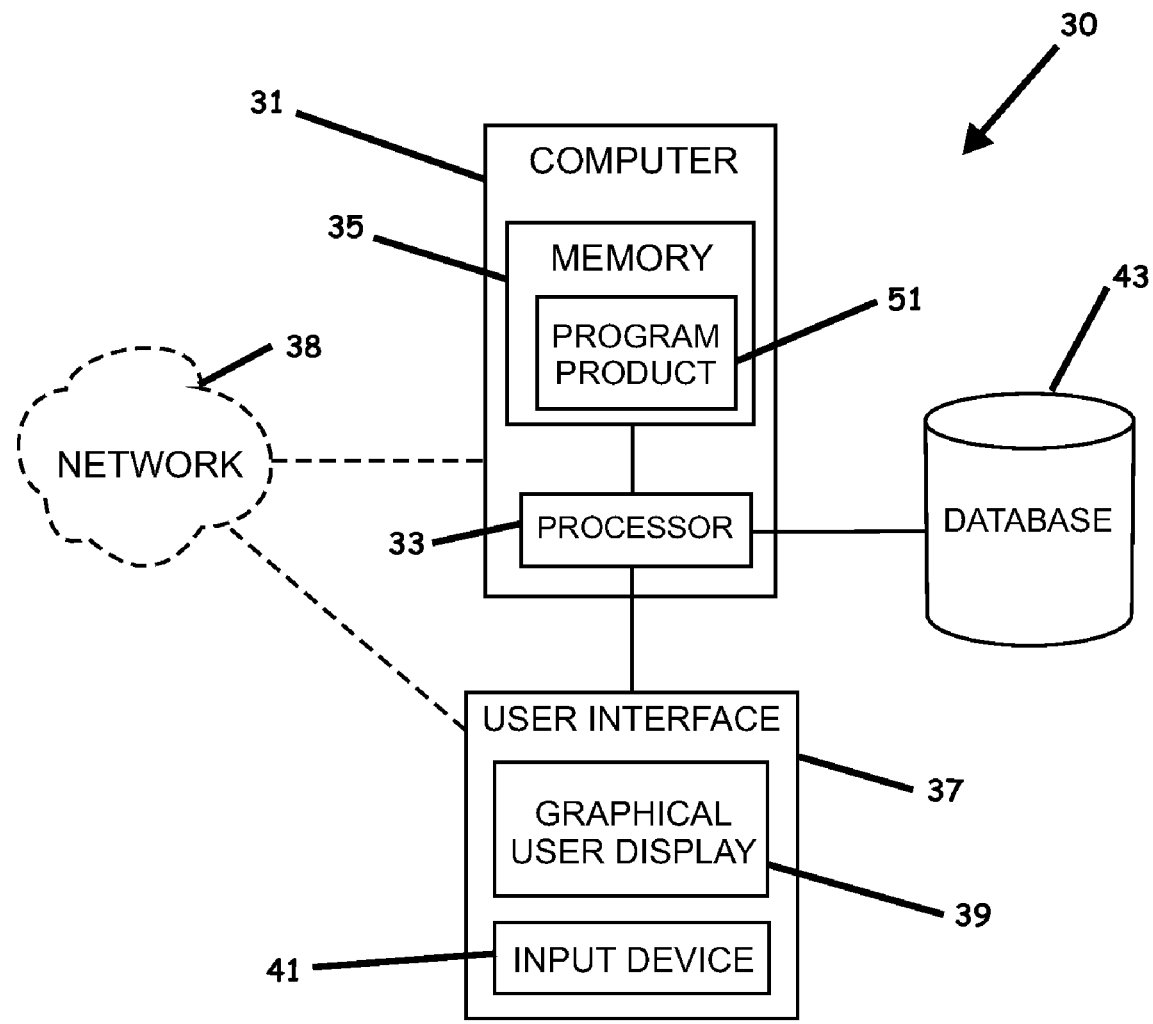
FIG. 1 is a schematic block diagram of a system to determine global energy utility targets and to define an optimal driving force distribution for a process having a plurality of resource streams according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As noted previously, the total energy employed or consumed by the constrained processes can be optimized to a global minimal level through, for example, careful placement and configuration of specific material streams with respect to one another. There may be the potential for hot streams that require cooling to be placed in proximity with cold streams that require heating. Thermal energy already present in streams that needs to be removed, or streams that need to have heat added, can therefore be associated with one another to optimize the energy consumption of the process. In addition, careful selection of minimum temperature differences between hot streams and cold streams upon optimization can also result in huge savings in energy consumption. These savings, however, are not realizable so long as there are some constraints that may prevent some of the streams from being matched with some others, and therefore, to maximize optimization, such constraints require consideration.

These constraints, which can be related to corrosion, environmental reasons, scaling, leakage problems, streams far apart, or streams in different hazardous zones and operability reasons, for example, can be taken into account during the energy targeting phase prior to design or alternatively, during the reconfiguration or refitting of the plant or equipment. It is highly preferable to consider these optimization issues with a modeling system prior to the actual design, redesign, construction or modification of the actual plant and equipment.

As noted above, the state-of-the-art software currently on the market does not address such targeting problem for constraint process situation while under all possible combinations of solutions in the process that can include modifying stream or all streams conditions and/or adding one or more carriers at different flow and supply temperatures. In the targeting phase, these software products only allow specific stream conditions of a process to be tracked and individual operational attributes associated with these streams to be modeled and discretely adjusted, if required. Although such software products provide useful tools, at least to some extent, they are not particularly flexible in application, and do not address the problems or provide the solutions provided by the various embodiments of the present invention.

As shown in FIGS. 1-23, various embodiments of the present invention provide systems, methods, and program product to be used to model the energy consumption of a non-thermodynamically constrained industrial process having constrained and non-thermodynamically constrained process streams, to optimize heat/energy recovery within the process through the determination of global energy utility targets and the determination of an optimal driving force distribution for the process. Note, those skilled in the art should appreciate that embodiments of the present invention may encompass specific hardware or apparatus used to implement the present invention in addition to a computer program product programmed into programmable logic or digital devices adapted to execute a number of processing steps to achieve the aims of the invention.

FIG. 1 illustrates an exemplary system 30 to model the energy consumption of a non-thermodynamically constrained waste heat recovery process to thereby determine global energy utility targets and to define an optimal driving force distribution for a process having a plurality of resource streams. The system 30 can include an energy utility modeling computer 31 having a processor 33, memory 35 coupled to the processor 33 to store software and database records therein, and a user interface 37 that can include a graphical display 39 for displaying graphical images, and a user input device 41 as known to those skilled in the art, to provide a user access to manipulate the software and database records. Note, the computer 31 can be in the form of a personal computer or in the form of a server serving multiple user interfaces 37. Accordingly, the user interface 37 can be either directly connected to the computer 31 or through a network 38 as known to those skilled in the art.

The system 30 can also include one or more tables and/or databases 43 stored in memory (internal or external) that is operably coupled to the energy modeling computer 31, as understood by those skilled in the art. The one or more databases 43 can include a plurality of sets of values each separately defining a potential range of values for at least one operational attribute for each of a plurality of hot process streams and a plurality of sets of values each separately defining a potential range of values for at least one operational attribute for each of a plurality of cold process streams. Such attributes can include, for example, a lower and an upper boundary value for a supply temperature (Ts) of each of the hot process streams and each of the cold process streams, a lower and an upper boundary value for a target temperature (Tt) of each of the hot process streams and each of the cold process streams, and/or a lower and an upper boundary value for a heat capacity flow rate (FCp) of each of the hot process streams and each of the cold process streams, and a minimum and maximum enthalpy value. The one or more tables and/or database 43 can also include a constrained stream list (not shown) as would be understood by one of ordinary skill in the art including an identification of at least one non-thermodynamically constrained process stream constrained from matching at least one other process stream due to a non-thermodynamic constraint, such as, for example, an indication that hot stream #1 of a process is forbidden from matching with cold stream #2 (see, e.g., FIG. 3).

The one or more tables and/or databases 43 can also include a plurality of stream-specific minimum temperature approach values $\Delta T_{min}^i$, e.g., a minimum or maximum or range interval for each separate one of the plurality of hot process streams and/or cold streams. The one or more tables and/or databases 43 can further include a determined or assigned stream-specific minimum temperature approach values $\Delta T_{min}$ for each separate one of the plurality of hot process streams and/or cold streams.

The system 30 can also include energy utility modeling program product 51 stored in memory 35 of the energy utility modeling computer 31 and adapted to: provide theoretical, practical, and economical energy targeting for the design and retrofit of energy recovery systems to find global energy utility targets, establish a good starting point for energy system design/retrofit using desired levels of heat recovery, find optimal driving force distributions in the energy system which is a function of the combined effect of process conditions and stream-specific minimum temperature approach values $\Delta T_{min}^i$ to optimize heat recovery for the non-thermodynamically constrained process, and via an interactive link to a heat exchangers network synthesis algorithm establish high fidelity relationship between energy cost versus capital cost in view of non-thermodynamic constraints to design energy recovery systems systematically and without the need for manual (trial and error) enumeration, inherent in other prior systems.

Note, the energy utility modeling program product 51 can be in the form of microcode, programs, routines, and symbolic languages that provide a specific set for sets of ordered operations that control the functioning of the hardware and direct its operation, as known and understood by those skilled in the art. Note also, the energy utility modeling program product 51, according to an embodiment of the present invention, need not reside in its entirety in volatile memory, but can be selectively loaded, as necessary, according to various methodologies as known and understood by those skilled in the art.

Figure 2A:
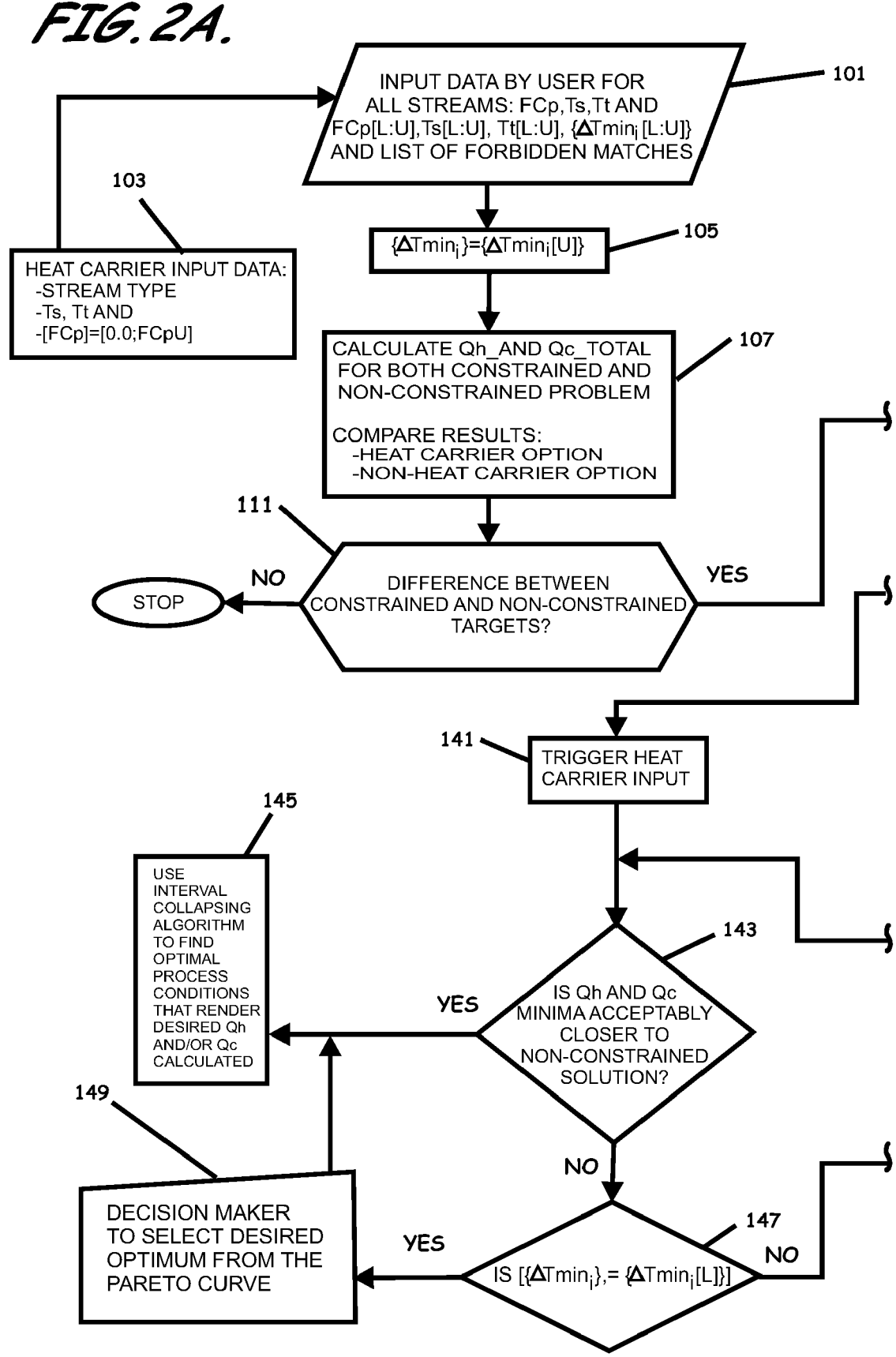
FIGS. 2A-B is a schematic flow diagram of an energy utility consumption modeling program product illustrating high-level functions according to an embodiment of the present invention.
Figure 2B:
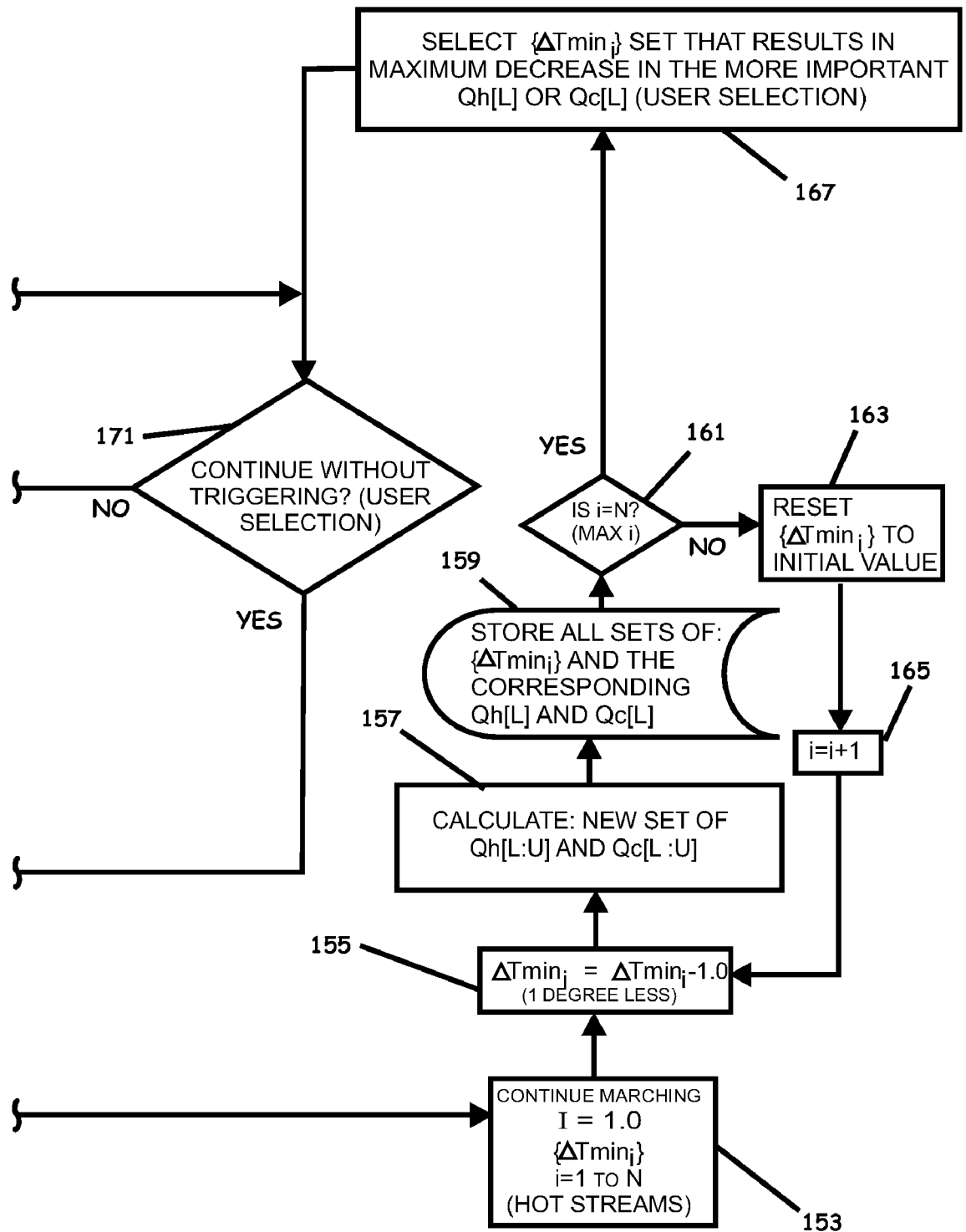

FIGS. 2A-2B illustrate a high-level flow diagram illustrating operation of the energy utility consumption modeling program product 51 according to an embodiment of the present invention. As shown in block 101, the program product 51 can receive input data entered by a user or stored in the database 43. The data can include, for example, a lower and an upper boundary value Ts[L:U] for a supply temperature Ts of each of the hot process streams and each of the cold process streams, a lower and an upper boundary value Tt[L:U] for a target temperature Tt of each of the hot process streams and each of the cold process streams, and/or a lower and an upper boundary value FCp[L:U] for a heat capacity flow rate FCp of each of the hot process streams and each of the cold process streams (see, e.g., FIG. 3). The data can also include a set of lower and upper stream specific minimum temperature approach boundary values $\{\Delta T_{min}^{i}[L:U]\}$ for each the plurality of hot process streams, and a list of one or more constrained process streams constrained from matching at least one other process stream due to a non-thermodynamic constraint (e.g., a list forbidden matches). Note, in the flow diagram, the "L" refers to low or minimum value of the range or interval and the "U" refers to the high or maximum value of the range or interval.

As shown in block 103, the input data can further include parameters for one or more additional heat carrier streams or dummy streams to include, for example, the type of stream, a value for the supply temperature Ts, and a value for a target temperature Tt. The type stream is generally selected based upon potential availability of the addition of such stream, typically with minimal modification to the facility. For cold streams, supply temperature Ts and the target temperature Tt can be actual supply and target temperatures, while for hot streams, the supply temperature Ts and the target temperature Tt can be real values minus a user selected minimum. The dummy stream(s) is not a process stream, but has certain process functions. For example, the dummy stream(s) can work as a buffer stream between a pair of hot stream and cold stream forbidden from being matched. The dummy heat carrier stream, for example, can carry heat from the hot stream and transfer it to the forbidden match cold stream, hence reducing both hot and cold utilities consumption requirements. Its supply temperature is normally provided by the user, but its optimal target temperature and flowrate can be determined using the interval collapsing algorithm, which is also used to simultaneously determine the optimal process conditions such as, for example, flowrate, supply temperature, and target temperature, for all process streams (i.e., hot and cold, with and without forbidden match status, etc.), to reach a desired minimum energy cost target. The parameters for the additional one or more heat carrier streams also can include a lower and an upper boundary value for a heat capacity flow rate FCp which can be set to the lowest and highest expected hot stream values (e.g., FCp=[FCpL: FCpU]). In a preferred configuration, application of the range of values allows for energy utility consumption modeling program product 51 to determine the optimal heat capacity flow rate for the additional stream. Further, the input value of FCpL can be set to, or default to 0.0 to allow the program product 51 to reject the inclusion of the additional heat carrier stream. I.e., if the program product 51 determines that the optimal heat capacity flow rate should be 0.0, such would imply that an additional heat carrier stream would not enhance optimization. Note, according to another preferred configuration, if the supply temperature Ts and the target temperature Tt are entered as interval values, such values can be used as limits by the energy utility consumption modeling program product 51 to allow the program product 51 to determine the optimal supply temperature Ts and the target temperature Tt.

As shown in block 105, each member $\Delta T_{min}^{i}$ of the set $\{\Delta T_{min}^{i}\}$ of stream specific minimum temperature approach boundary values initially to be assigned to the hot process streams can be initially assigned the upper boundary value $\Delta T_{min}^{i} = \Delta T_{min}^{i} U$, which can be the stream-specific $\Delta T_{min}^{i}$ that creates a situation of no possible integration between any specific hot stream and any cold stream, i.e., the difference between the temperature of the hot stream being analyzed and the coolest cold stream.

As shown in block 107, using the input data and the $\Delta T_{min}^{i}$ value data, the program product 51 can then calculate the global heating energy utility interval [Qh [L:U]] ((total external hot utility required), illustrated more simply as [Qh_total], both with and without application of any non-thermodynamic constraints (matching restrictions) and without the non-thermodynamic constraint compensation techniques described herein. The program product 51 can also similarly determine the global cooling energy utility interval [Qc [L:U]] (total external cold utility required), illustrated more simply as [Qc_total]. According to an embodiment of the program product 51, a cascade (interval collapsing) algorithm, as will be described in more detail later, can used to perform such operation.

As shown in block 111, the program product 51 then compares the non-thermodynamically constrained results for [Qh [L:U]], [Qc [L:U]] with the non-constrained results for [Qh [L:U]], [Qc [L:U]], and determines if there is a significant difference therebetween. If there is no significant difference, the non-thermodynamic constraints can be ignored and the values that were obtained via the interval collapsing algorithms can be used in the development of the waste heat recovery system design. This can include determining the exact process conditions within the received range boundaries that provide [Qh], [Qc], associated energy costs, and can include selecting the minimum energy cost of the two calculated energy costs. Further, using the specific minimum temperature approach $\Delta T_{min}^{i}$ values that provide the process conditions which provide the minimum energy cost, a heat exchanger network (HEN) can then be efficiently designed. Further, a capital cost associated with the HEN can be calculated. The program product 51 can use the calculated minimum energy cost along with its associated calculated capital cost to form a single point in a Pareto-optimal chart (not shown), to enhance decision maker evaluation.

If, however, there is a substantial difference there between, the heat carrier inputs can be triggered (block 141) if desired (block 171). If so desired, the user can be prompted to provide a user selected number of "dummy" or "additional" heat carrier streams to insert in the problem, and the respective supply temperature (Ts), interval target temperature ([Tt]) and interval specific heat flowrate ([FCp]) for each dummy heat carrier stream, as shown, for example, at block 103. The process then continues in a loop which steps through the various combinations of the specific minimum temperature approaches $\Delta T_{min}^{i}$ for each hot stream with, for example, a one degree reduction (blocks 153-165), calculates the [Qh], [Qc] minima (block 157), and determines if the [Qh], [Qc] minima is acceptably closer to the not non-thermodynamically constrained solution (block 143). As shown in block 145, if acceptable, the interval collapsing algorithms can be used to find the process conditions that render the desired [Qh] and/or [Qc].

As shown in blocks 147 and 153, if not acceptable and if the members of the set $\{\Delta T_{min}^{i}\}$ of stream specific minimum temperature approach boundary values have not yet been assigned upper boundary values such that $\{\Delta T_{min}^{i}\} = \{\Delta T_{min}^{i} [L]\}$, the analysis can continue, for example, using the set of minimum temperature approach values $\{\Delta T_{min}^i\}$ (selected at block 167, either automatically, or by a user) as the new set of upper boundary values $\{\Delta T_{min}^i\}$ of the minimum temperature approach values $\Delta T_{min}^i$ of each of the hot streams. As shown in blocks 147 and 149, if not acceptable and if it has been assigned such floor value, the algorithm passes, or otherwise makes available, the completed Pareto curve to a user such as, for example, a decision maker, along with the corresponding definitions of the process conditions/variables.

As shown in blocks 153 and 155, and as will be described in more detail later, incremental values can be marched into $\Delta T_{min}^i$ for each individual hot stream "i"=1 to N in order to complete an analysis on the continuum of values. As shown in block 157, similar to block 107, but using the decremented $\Delta T_{min}^i$ value data for hot stream (i), the program product 51 then calculates the global heating energy utility interval Qh [L:U] and the global cooling energy utility interval Qc [L:U], using, for example, the featured cascade algorithm. As shown in block 159, the global minimum heating utility interval, global minimum cooling utility interval, and adjusted set of stream specific minimum temperature approach values $\{\Delta T_{min}^i\}$, are then stored, for example, in database 43.

As shown in block 161, if the number "i" of hot streams (i) is not the maximum number "N", the program product 51 resets the set of stream specific minimum temperature approach values $\{\Delta T_{min}^i\}$ (block 163) to the value marched in at 153 (i.e., the initially entered set $\{\Delta T_{min}^i\}$ of upper values), increments the value of "i" (block 165) to select a different hot stream, and decrements $\Delta T_{min}^i$ of the respective hot stream "i" (block 155) by a preselected value, e.g., I=1.0 to continue the analysis and storage of datasets (blocks 157-159). If the number "i" of hot streams (i) is the maximum number "N", as shown in block 161, the program product 51 advances to block 167 and chooses the set $\{\Delta T_{min}^i\}$ from among the "N" stored sets characterized by resulting in the maximum decrease in the more expensive global minimum energy utility values Qh(L) or Qc(L), for example, as selected by the user. As shown in block 171, the program product 51 then continues with or without triggering heat carrier at block 141 and analyzes if the global minimum energy utility values Qh(L) or Qc(L) coinciding with chosen set $\{\Delta T_{min}^i\}$ provides an energy minima that is sufficiently closer to the non-constrained solution (block 143).

The following provides a brief summary of the $\{\Delta T_{min}^i\}$ outer loop calculations/selection procedure according to an embodiment of the present invention.

| | |
|---|---|
| Step # 1: | Begin with assigned $\{\Delta Tmin^i\}$ upper values. |
| Step # 2: | Calculate non-constrained and non-thermodynamically constrained [Qh] and [Qc] intervals. |
| Step # 3: | Reduce a $\Delta Tmin^i$ of one of the $\{\Delta Tmin^i\}$ set streams by 1.0 then repeat step # 2 completely. |
| Step # 4: | Store the new $\{\Delta Tmin^i\}$ set and the corresponding non-constrained and non-thermodynamically constrained [Qh] and [Qc] intervals. |
| Step # 5: | Reset the $\{\Delta Tmin^i\}$ set and repeat step # 3 for another hot stream not tried before, then repeat step #2, then step # 4. |
| Step # 6: | Repeat step # 5 until each hot steam's $\Delta Tmin$ is reduced by 1.0 degree. |
| Step # 7: | Go to step # 4 where all the above calculation results are stored and select the $\{\Delta Tmin^i\}$ set that renders best decrease in, e.g., the [Qh] interval (and/or [Qc] interval) and designate this set to become the new $\{\Delta Tmin^i\}$ set upper values. |
| Step # 8: | Repeat these steps until reaching desired [Qh] or [Qc] target. |

Figure 3:
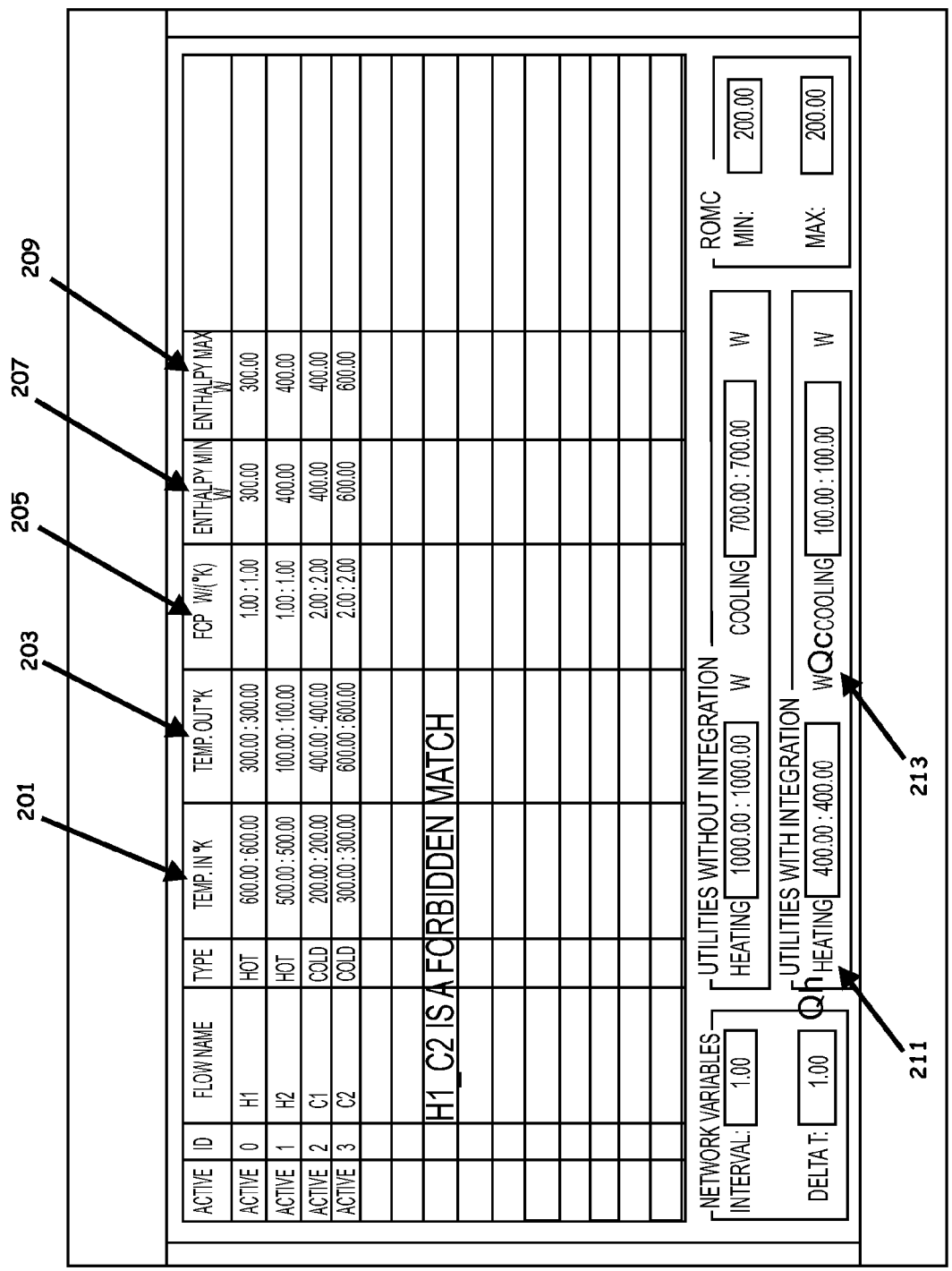
FIG. 3 is a schematic diagram of an exemplary graphical user interface according to an embodiment of the present invention.

Additional details describing some of the more important functions of the program product 51, according to an embodiment of the present invention, follow:

FIG. 3 is a screen shot of a graphical user interface for an embodiment of the program product 51, which illustrates an industrial process that incorporates four separate and distinct resource streams in an embodiment of the present invention. Resource streams H1 and H2 are hot process streams, whereas streams C1 and C2 are cold process streams. In this example, separate operational attributes for each resource stream are monitored and modeled. These include the supply temperature Ts of each stream shown at 201, its target temperature Tt shown at 203, and a heat capacity flow rate FCp for the stream shown at 205. FIG. 3 also illustrates a problem whereby H1 and C2 streams are forbidden to match with each other as the only constraint in the problem. As this information is entered, the software continuously automatically updates and calculates values for both the global minimum energy required for cooling and the global minimum energy required for heating by the process employed. It also calculates both the global maximum energy required for cooling and the global maximum energy required for heating by the process employed.

According to a preferred configuration, as this information is entered, the program product 51 can continuously update and calculate, under any possible minimum temperature difference between the hot and cold resources, values for both the global minimum energy required for cooling and the global minimum energy required for heating by the process (Enthalpy Min) shown at 207. It also calculates both the global maximum energy required for cooling and the global maximum energy required for heating by the process (Enthalpy Max) shown at 209. The program product 51 is also adapted to calculate global minimum energy consumption values required by hot and cold process streams in any process or cluster of processes under a variable heat transfer driving force distribution, and to determine the optimal process conditions and heat transfer driving force distribution among process streams for desired energy consumption targets, using, for example, the mathematical formulation described below.

Note, the "optimal" global minimum heating energy utility $Qh_{min}$ or Qh(L) shown at 211 and the "optimal" global minimum cooling energy utility $Qc_{min}$ or Qc(L) shown at 213, with applied integration between streams, however, may not be the actual optimal global minimum heating utility and/or global minimum cooling because not all heat exchangers, and thus, not all process streams and utilities, need to obey the same global minimum value for driving forces, and because of the existence of process constraints called forbidden matches. Further, process conditions need not, and usually are not, specific discrete values incapable of being adjusted or analyzed separately. Additional efficiencies, i.e., improved values for global minimum heating energy utility $Qh_{min}$ and the global minimum cooling energy utility $Qc_{min}$, can be found by utilizing both process conditions manipulation and stream-specific minimum temperature approach values $\Delta T_{min}^i$ to target for minima energy consumption, at an optimal driving force distribution and optimal process conditions. Additional efficiencies can further be found by incorporating process condition modification to minimize the inefficiencies caused by forbidden matches.

Figure 4:
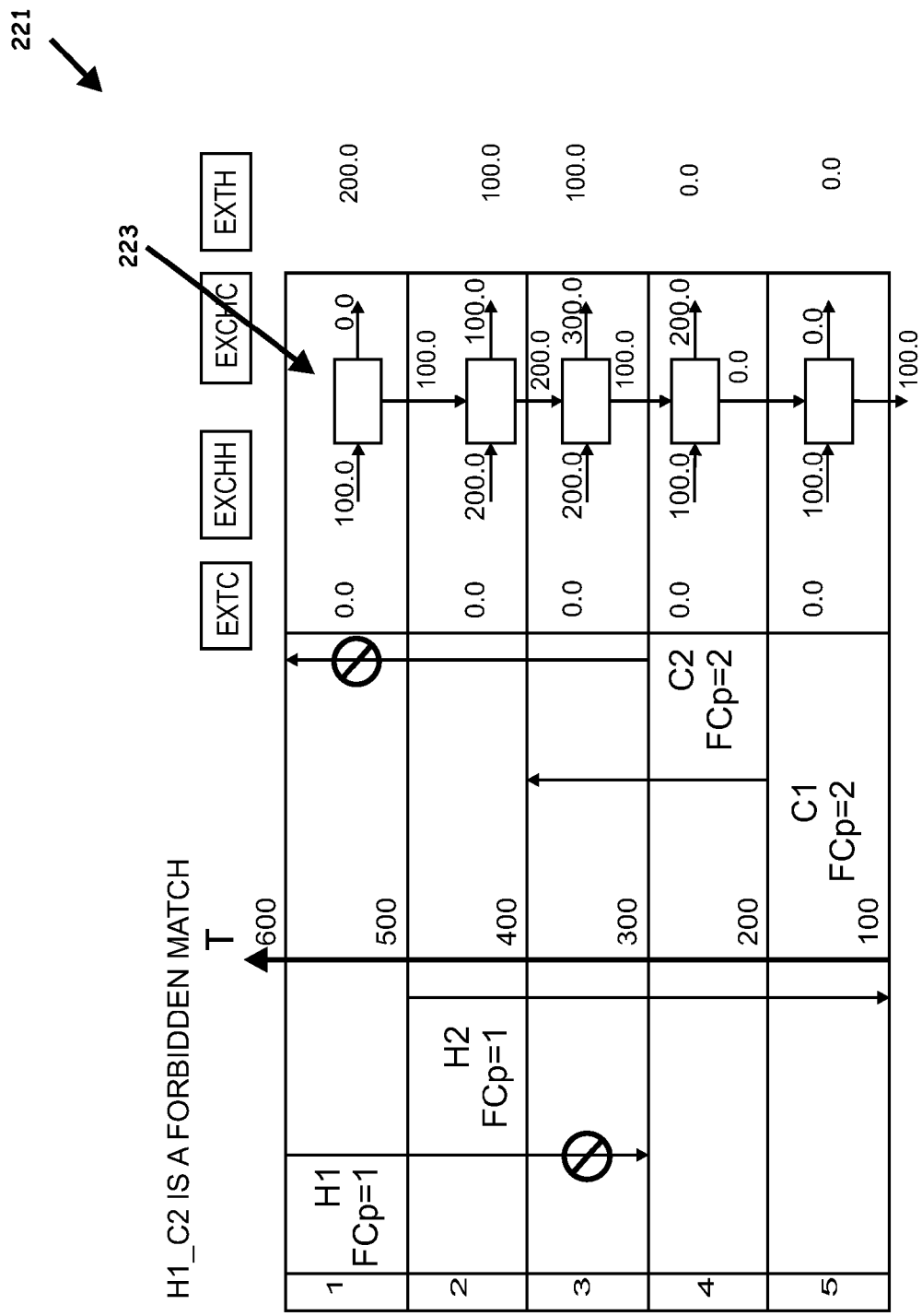
FIG. 4 is a graph and block flow diagram illustrating the temperature steps of a cascading algorithm used in a calculation for finding a global minimum heating energy utility requirement [Qh] and a global minimum cooling energy utility requirement [Qc] for a process having a forbidden match according to an embodiment of the present invention.

FIGS. 3 and 4 illustrate a simple example of an industrial process to demonstrate the application of the method introduced above, for example, in its simplest mode (without process conditions modification for a constrained process having two hot process streams H1 and H2 and two cold process streams C1 and C2) to determine global minima energy utility targets whereby streams H1-C2 are forbidden to match. Specifically, FIG. 4 provides a temperature step interval diagram 221 which can be used to balance the exchangeable loads (energy), e.g., heat extracted collectively from the hot process streams ("[EXCHH]"), heat collectively applied to a plurality of cold process streams ("[EXCHC]"), and surplus heat available for a next of the temperature step intervals 223, to determine non-exchangeable energy to be obtained from an external hot utility or utilities (["EXTH"]) and non-exchangeable energy to be obtained from an external cold utility or utilities ("[EXTC]"), to thereby determine the optimal global heating energy utility interval ([Qh]) and the optimal global cooling energy utility interval ([Qc]).

Figure 5:
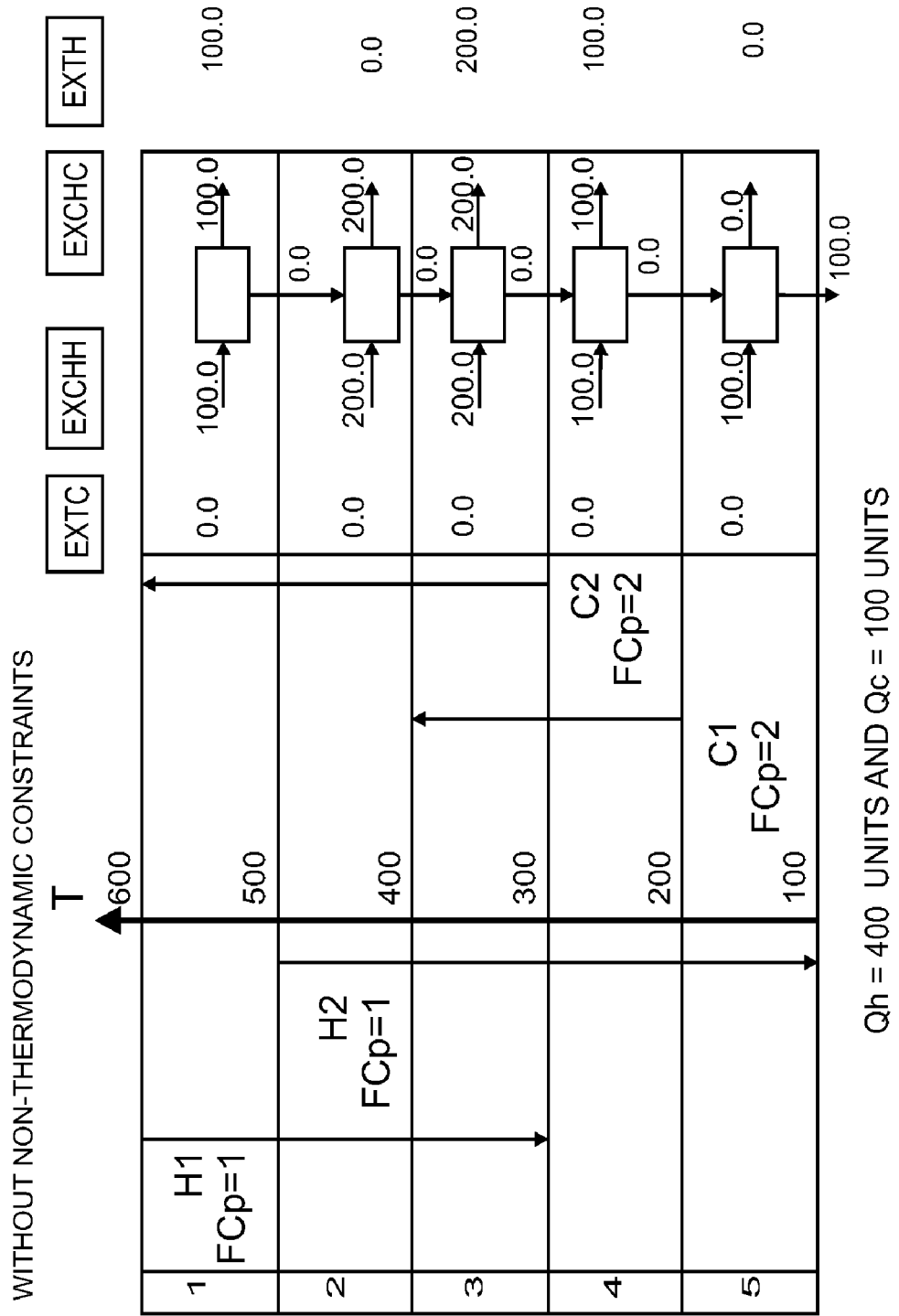
FIG. 5 is a graph and block flow diagram illustrating the temperature steps of a cascading algorithm used in a calculation for finding a global minimum heating energy utility requirement [Qh] and a global minimum cooling energy utility requirement [Qc] for the process of FIG. 4 without regard to the forbidden match.

FIG. 5 illustrates an example of a temperature step interval diagram for the same industrial process, but without the forbidden match constraint—i.e., without any non-thermodynamic constraints. It can be seen that this example presents a rare situation whereby there is no difference in the minimum energy consumption or maximum waste heat recovery whether determined with or without the constraint of a forbidden match between streams H1 and C2 as shown in FIGS. 4 and 5, respectively.

Figure 6:
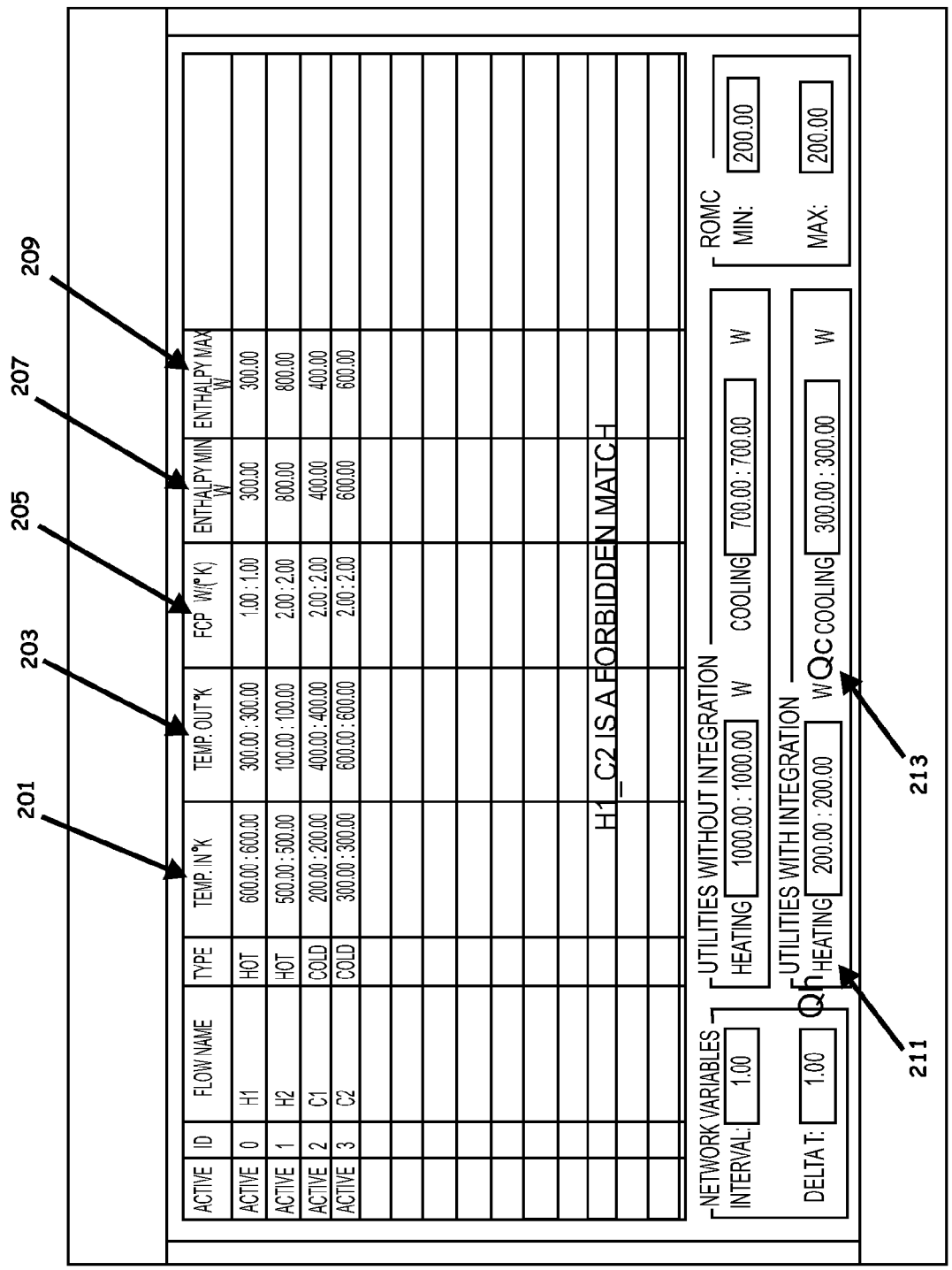
FIG. 6 is a schematic diagram of an exemplary graphical user interface according to an embodiment of the present invention.
Figure 7:
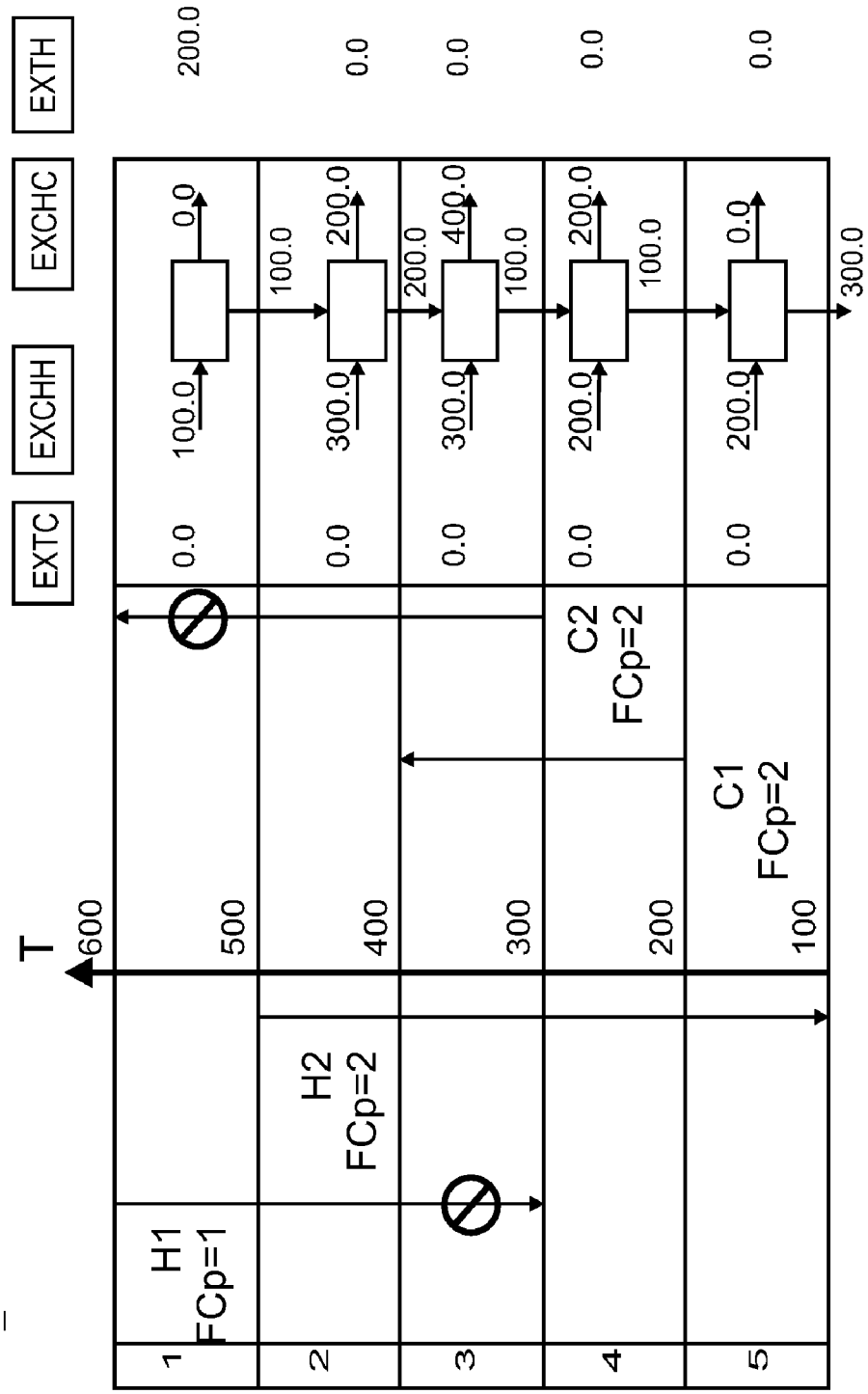
FIG. 7 is a graph and block flow diagram illustrating the temperature steps of a cascading algorithm used in a calculation for finding a global minimum heating energy utility requirement [Qh] and a global minimum cooling energy utility requirement [Qc] for a process having a forbidden match according to an embodiment of the present invention.
Figure 8:
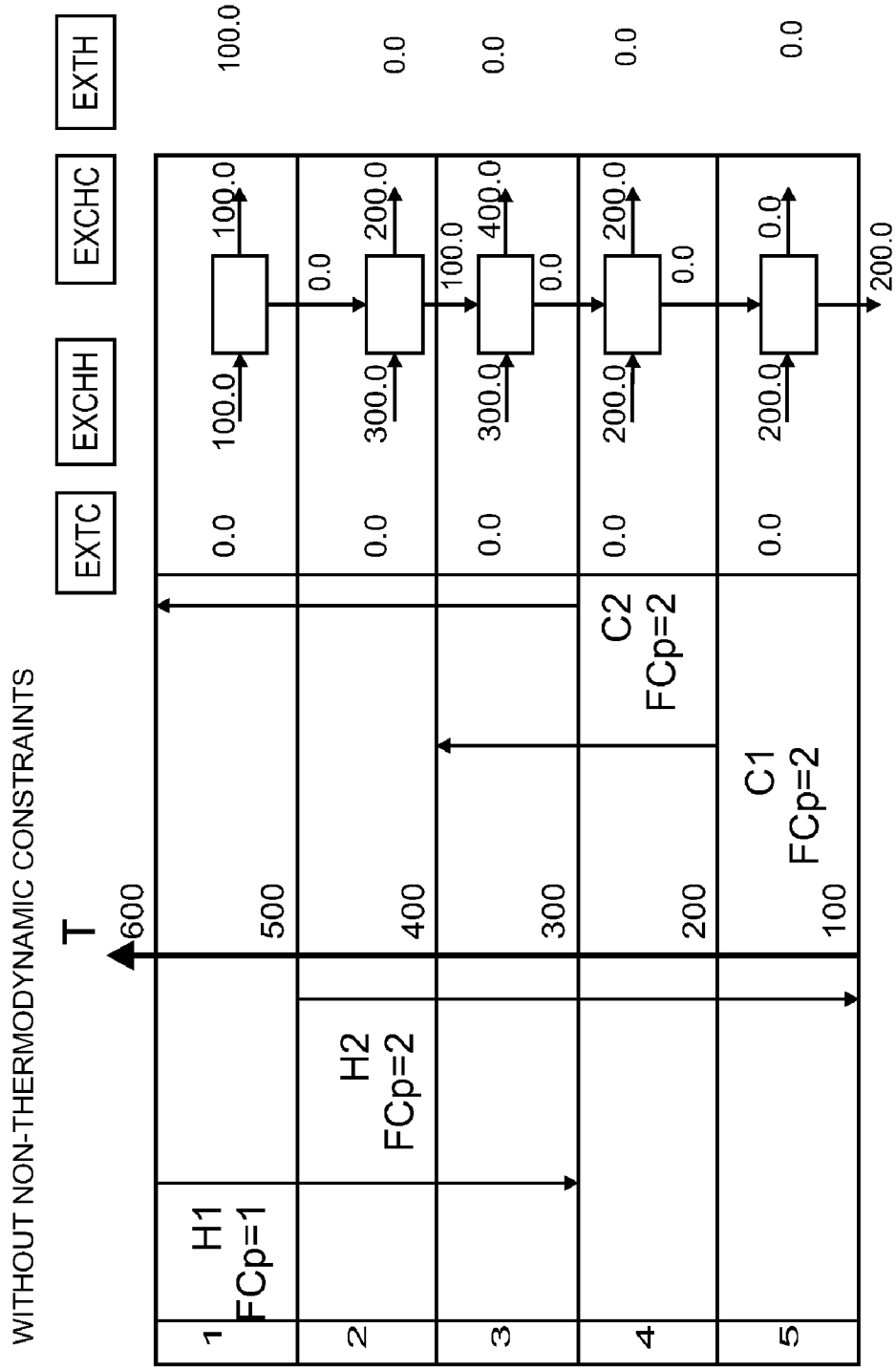
FIG. 8 is a graph and block flow diagram illustrating the temperature steps of a cascading algorithm used in a calculation for finding a global minimum heating energy utility requirement [Qh] and a global minimum cooling energy utility requirement [Qc] for the process of FIG. 7 without regard to the forbidden match.

FIGS. 6-8 illustrate an example application of the above described method on an industrial process having two hot process streams H1 and H2 and two cold process streams C1 and C2 and that is constrained by a non-thermodynamic constraint (with H1-C2 being a forbidden match), which results in a clear and significant effect on the heat recovery potential of the constrained process. Specifically, FIG. 6 illustrates the separate operational attributes for each process stream. FIG. 7 illustrates a temperature step interval diagram which can be used to balance the exchangeable loads (energy) and to determine non-exchangeable energy to be obtained from an external hot and/or cold utility or utilities to thereby determine the optimal global minimum heating and/or cooling energy utility interval or intervals. FIG. 8 illustrates an example of a temperature step interval diagram for the same industrial process, but without the forbidden match constraint—i.e., without any non-thermodynamic constraints. The global minimum hot and cold utilities of the non-thermodynamically constrained process each require an additional 100 units of energy.

The following provides a more detailed analysis illustrating, according to an embodiment of the present invention, various method steps/program product operations employed to calculate global minima energy consumption values required by hot and cold process streams in a non-thermodynamically constrained process or cluster of non-thermodynamically constrained processes under a variable heat transfer driving force distribution, and to determine the optimal process conditions for desired energy consumption targets to include the addition of "dummy" heat carrier streams with corresponding optimal process conditions, i.e., flowrate and target temperature, and to include the heat transfer driving force distribution among process streams:

Step 1: The hot streams temperatures, received either via automated processes or by direct manual input, are shifted down one-by-one by the first set of desired minimum temperature differences, $\Delta T_{min}^i$, between the hot and cold process streams to form a set of possible discrete temperature values $\{\Delta T_{min}^i\}$ for a continuum of possible values for $\Delta T_{min}^i$. The minimum temperature approach value $\Delta T_{min}^i$ represents the $\Delta T_{min}$ of hot stream (i) which refers to the minimum temperature approach between a specific hot stream and all other cold streams. The first $\Delta T_{min}^i$ can be given, for example, a value equal to user defined maximum recommended for all hot streams to establish the global highest energy targets of the energy system. The second value of $\Delta T_{min}^i$ will be equal to, for example, one degree less or some other small incremental value as per the required temperature precision, to obtain the energy targets at an optimal driving force distribution from an energy point of view. This can continue until $\Delta T_{min}^i$ reaches a user defined recommended lower bound or a default value. Note, a preferred upper boundary for each hot stream $\Delta T_{min}^i$ can be the stream-specific $\Delta T_{min}^i$ that creates a situation of no possible integration between any specific hot stream and any cold stream, i.e., the difference between the temperature of the hot stream being analyzed and the coolest cold stream.

Step 2: The shifted supply and target (output) temperatures of hot streams, and the actual supply and the target cold streams temperature obtained through step 1 are then sorted in a descending order, with duplicates removed, with each successive temperature pair representing the boundaries of a "TEMPERATURE STEP" and defining a new temperature step "S". Each supply temperature and target temperature input can be in the form of intervals (e.g., a pair of range boundaries) as opposed to single discrete numbers.

Step 3: Each supply temperature and target temperature input interval is then divided, for example, on an equal basis according to the desired temperature precision. The completion of this step results in "N" number of process temperature steps. FIG. 4 illustrates a basic model showing the "temperature steps" for hot and cold streams having discrete attribute values. Note, for the simplicity of explaining the method, FIG. 4 illustrates application of the steps using the same $\Delta T_{min}^i$ of 10° K for each hot stream for a constrained process having two hot process streams H1 and H2 and two cold process streams C1 and C2.

Note, although while not shown in this flow graph, it should be understood by one of ordinary skill in the art that creating new or dummy heat carrier streams in the hot side or in the cold side of the graph can be accomplished with the same concept, described above, in order to enhance the analysis. The new heat carrier stream will have its supply temperature Ts defined by the user and its target temperature Tt and FCp can be variables on ranges. The target temperature range will be divided to equal temperature intervals again degree-by-degree or according to the required accuracy in temperature.

Step 4: The total number of temperature steps is "N+1," where S varies from 0,1,2, . . . , N and the temperature step number "0" represents the external energy utility temperature step. In this step, known as the external energy step, energy output, as will be described below, is assigned two initial values: $Q_{s=0}^{low\_output}=0.0$ in "energy units" and $Q_{s=0}^{high\_output}=0.0$ in "energy units."

Step 5: As perhaps best stated and shown in FIG. 1 and FIG. 3., four components of energy, exchangeable from hot to cold "EXCHH", non-exchangeable from hot to cold "NON-EX-CHH" and hence needing external cooling "EXTC"; exchangeable/receivable from hot "EXCHC" and non-exchangeable/receivable from cold to hot "NON-EXCHC" and hence needing external heating "EXTH". Note, EXTH equals the sum Σ of non-exchangeable energy [NON-EXCHC] between streams needing external hot utility heating at temperature step interval "i" and EXTC equals the sum Σ of non-exchangeable energy [NON-EXCHH] between streams needing external cold utility cooling at temperature step interval "i".

For each temperature step interval the following sub-calculation is conducted:

(1) Calculate hot side exchangeable supply for each temperature interval and display it in the column labeled "[EXCHH]";
(2) Calculate stream-by-stream the Σ"[NON-EXCHH]" load in each respective temperature interval and for all temperature step intervals below and display the temperature interval totals in the column labeled "EXTC";
(3) Calculate cold side exchangeable demand for each temperature interval and display it in the column labeled "[EXCHC]"; and
(4) Calculate stream-by-stream the Σ"[NON-EXCHC]" load in each respective temperature interval and for all temperature step intervals above and display the temperature interval totals in the column labeled "[EXTH]."

Each temperature step S greater than 0, where S=1,2, ..., N, has energy surplus $Q_s^{surplus}$. Such energy surplus has two calculated values: $Q_s^{low\_surplus}$ and $Q_s^{high\_surplus}$. It also has energy output $Q_s^{output}$ from one temperature step to another. Such energy output $Q_s^{output}$ has also two calculated values: $Q_s^{low\_output}$ and $Q_s^{high\_output}$ defining [EXCHC]. These values for energy surplus $Q_s^{surplus}$ and energy output $Q_s^{output}$ are calculated as follows for S=1,2, ..., N:

$$Q_s^{low\_surplus} = \left( \sum_{k=1}^{n_s} FCp_k^{low} - \sum_{j=1}^{m_s} FCp_j^{high} \right)(Th_s - Tc_s),$$

$$Q_s^{high\_surplus} = \left( \sum_{k=1}^{n_s} FCp_k^{high} - \sum_{j=1}^{m_s} FCp_j^{low} \right)(Th_s - Tc_s),$$

$$Q_s^{low\_output} = Q_{s-1}^{low\_output} + Q_s^{low\_Surplus},$$

$$Q_s^{high\_output} = Q_{s-1}^{high\_output} + Q_s^{high\_Surplus},$$

where $n_s$ and $m_s$ are the number of hot and cold streams respectively represented in the $s^{th}$ temperature step and $Th_s$ and $Tc_s$ are the higher and lower shifted temperatures for the hot streams, respectively, and actual temperature of the cold streams representing the temperature boundaries.

$FCp_k^{low}$: is the low value of the Heat Capacity Flowrate term resulted from the multiplication of the value of the flow F lower bound by the specific heat value Cp of the hot stream number k in flow-specific heat units.

$FCp_k^{high}$: is the high value of the Heat Capacity Flowrate term resulted from the multiplication of the value of the flow F upper bound by the specific heat value Cp of the hot stream number k in flow-specific heat units.

$FCp_j^{low}$: is the low value of the Heat Capacity Flowrate term resulted from the multiplication of the value of the flow F lower bound by the specific heat value Cp of the cold stream number j in flow-specific heat units.

$FCp_j^{high}$: is the high value of the Heat Capacity Flowrate term resulted from the multiplication of the value of the flow F upper bound by the specific heat value Cp of the cold stream number j in flow-specific heat units.

Step 6: The global heating energy utility interval ([Qh_total]) is then calculated. The global heating energy utility interval [Qh_total] is comprised of two components. The first component ([Qh]) is calculated below using the exchangeable loads on both sides of the cascade, and the second component ([Σ EXTH]) is the summation of the EXTH term for each interval, determined as follows:

$$Qh(\text{minimum}) = ABS\ Min\{Min[Q_s^{high\_output}], 0.0\},$$

where S=0, 1, 2, ..., N; and ABS is the absolute of the value between brackets, and $$Qh(\text{maximum}) = ABS\ Min\{Min[Q_s^{low\_output}], 0.0\}.$$

The [Qh] interval becomes:

$$[Qh] = [Qh(\text{minimum}), Qh(\text{maximum})].$$

The [Qh_total] interval becomes:

$$[Qh\_total] = [Qh] + [\Sigma\ EXTH],$$

which represents the total hot utility which must be obtained from outside the process.

Step 7: The global total cooling energy utility interval ([Qc_total]) is then calculated using steps similar to that for calculating [Qh_total]. The global total cooling energy utility interval [Qc_total] also comprises two components. The first component ([Qc]) is calculated using steps similar to that for calculating [Qh] through use of a set of intervals designated as [ZQh], and the second component ([Σ EXTC]) is the summation of the EXTC term for each interval, determined as follows:

$$ZQh(\text{minimum}) = ABS\ Min\{Min[Q_s^{high\_output}], 0.0\},$$

where S=0, 1, 2, ..., N, and $$ZQh(\text{maximum}) = ABS\ Min\{Min[Q_s^{low\_output}], 0.0\}.$$

The [ZQh] interval becomes:

$$[ZQh] = [ZQh(\text{minimum}), ZQh(\text{maximum})].$$

Next, the calculations of Step #5 are repeated using the symmetric image [ZQh(maximum, ZQh(minimum)] of the above [ZQh] interval in the first temperature step (temperature step number "0") to represent the external hot energy utility in temperature step number "zero". The symmetric image of the [ZQh] interval renders the [Qh] interval elements, but in different order. That is, if [ZQh]=[100, 200], the symmetric image would be [200, 100].

Step number "4," used in solving the Qh(minimum) and Qh(maximum) values for Qh, had two initial energy output values set as follows: $Q_{s=0}^{low\_output} = 0.0$ in "energy units" and $Q_{s=0}^{high\_output} = 0.0$ in "energy units". For calculating Qc, we set these two initial energy output ($Q_s^{output}$) values initially to be:

$$Q_{s=0}^{low\_output} = ZQh(\text{maximum}), \text{ and}$$

$$Q_{s=0}^{high\_output} = ZQh(\text{minimum}).$$

The remaining calculations from Step #5 are then repeated using these two new values instead of the "zero" values (used before), while using the left term of the interval as the Qs(low_output) and the right term of such interval as the Qs(high_output).

Upon completing all temperature intervals calculations, including calculations at the minimum and maximum heating and cooling utilities at maximum theoretical and then practical sets of $\Delta T_{min}^i$ based upon interval (range boundary) data, the output of the last interval will be the [Qc] interval including the global minimum cooling utility (Qc(minimum)) and the global maximum cooling utility (Qc(maximum)).

The [Qc_total] interval becomes:

$$[Qc\_total] = [Qc] + [\Sigma EXTC],$$

which represents the total cold utility which must be obtained from outside the process.

According to various embodiments of the present invention, improved energy consumption targets are determined, for example, by selecting an optimal set of process conditions and $\Delta T_{min}^i$ by marching in $\Delta T_{min}^i$, for example, one-by-one degree or some other small incremental value, for each hot stream with its "stream-specific" minimum temperature approach values $\Delta T_{min}^i$. An example of a process for analyzing better energy consumption according to an embodiment of the present invention is as follows:

(1) Select desired utility heating or cooling as an energy objective.
(2) Collapse the process conditions interval for each specific hot stream being analyzed.
(3) Decrease a $\Delta T_{min}^i$ of a specific hot stream by one degree.
(4) Determine the effect of change on the desired utility target.

Steps (3) and (4), immediately above, are automatically repeated for all hot streams (one at a time) and define the change that results in a maximum increase in desired waste energy consumption saving. The $\Delta T_{min}^i$ that results in such maximum increase is then assigned to be the new stream-specific $\Delta T_{min}^i$ for such hot stream, while other hot streams will continue to keep their old values. These procedures can be repeated on sets of $\Delta T_{min}^i$, starting, for example, from its upper bounds down to its recommended user defined lower bounds.

Figure 9:
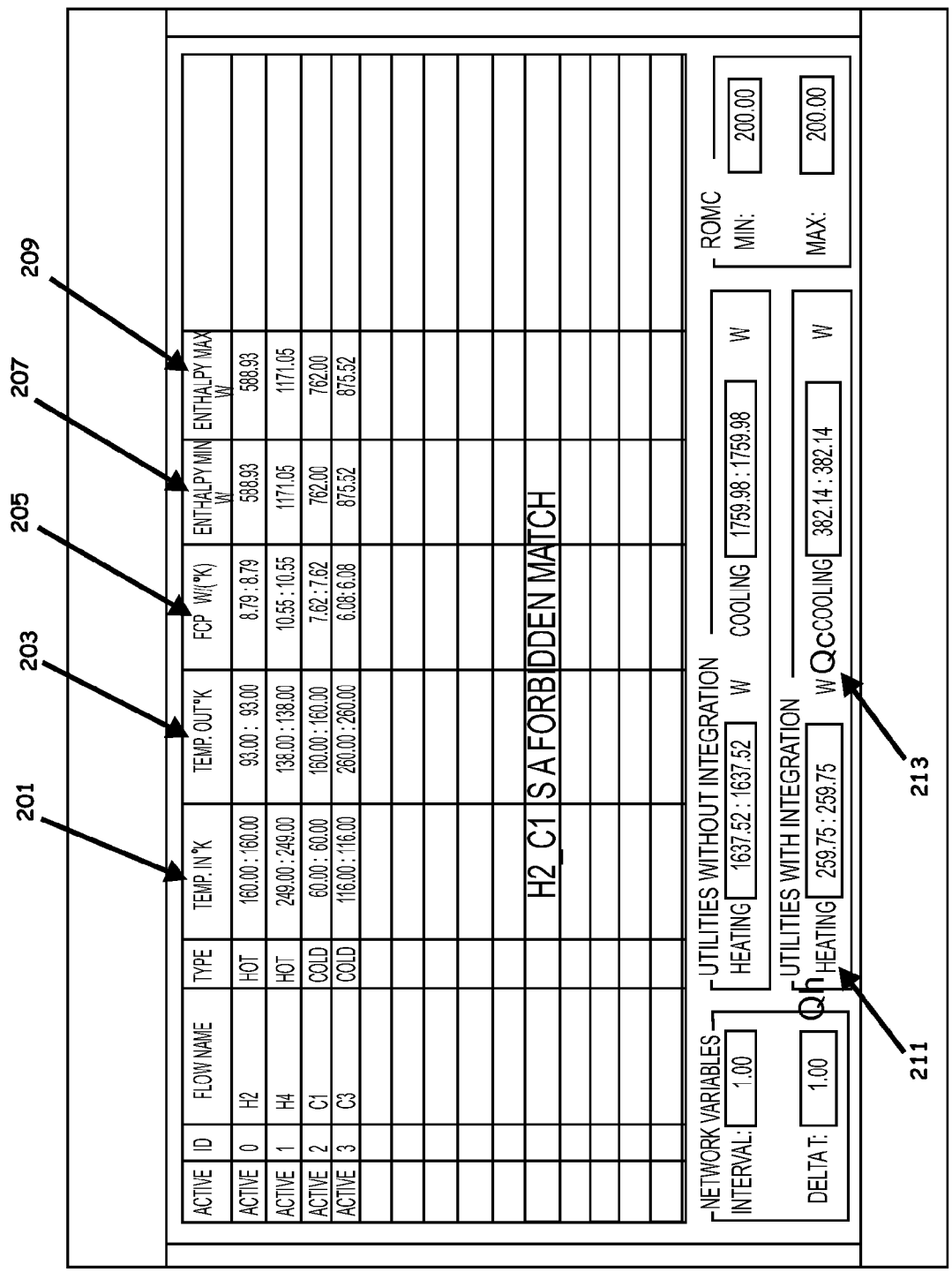
FIG. 9 is a schematic diagram of an exemplary graphical user interface illustrating input and output for a real-world exemplary process according to an embodiment of the present invention.
Figure 10:
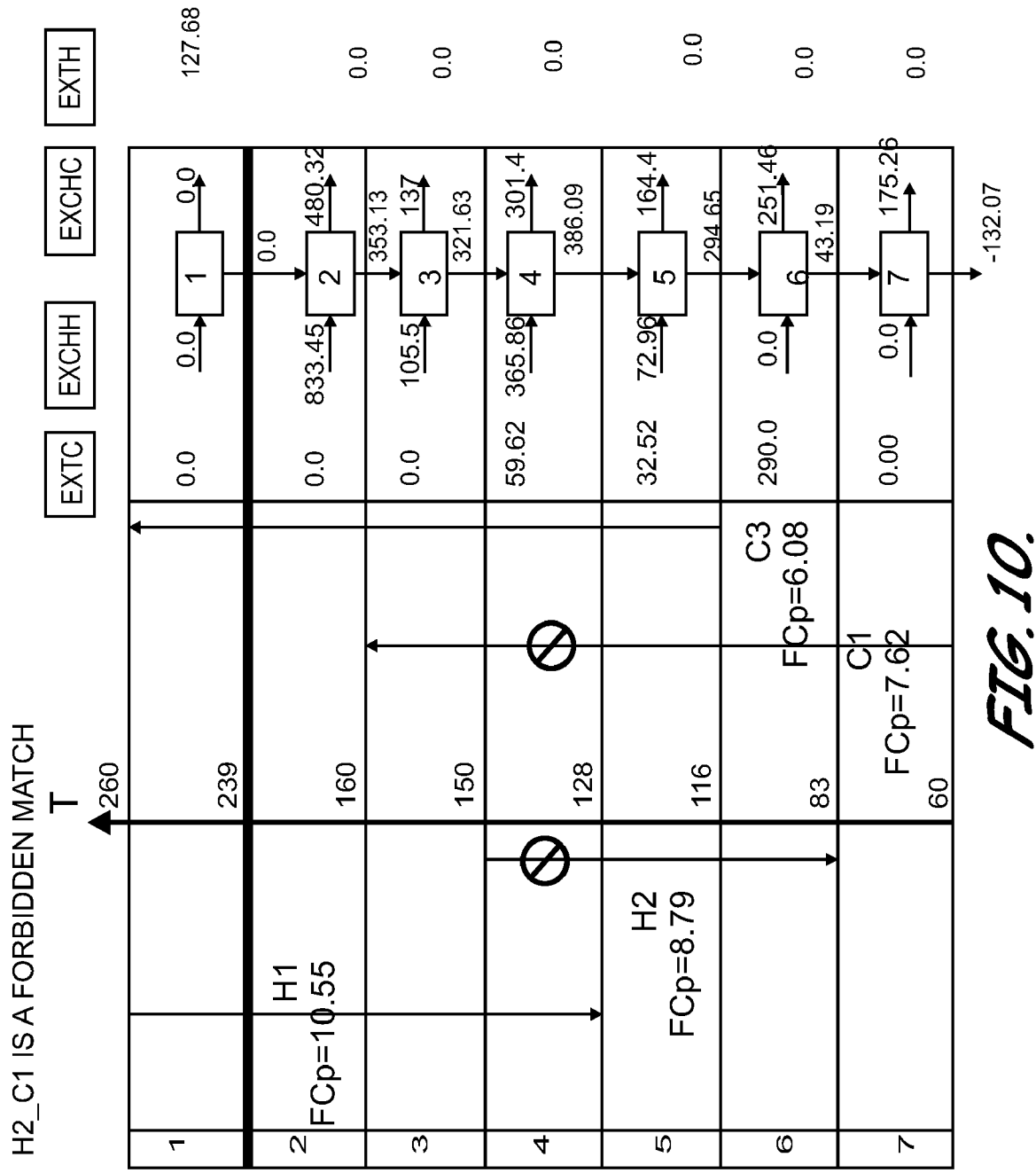
FIG. 10 is a graph and block flow diagram illustrating the temperature steps of the first phase of a cascading algorithm implemented according to an embodiment of the present invention.
Figure 11:
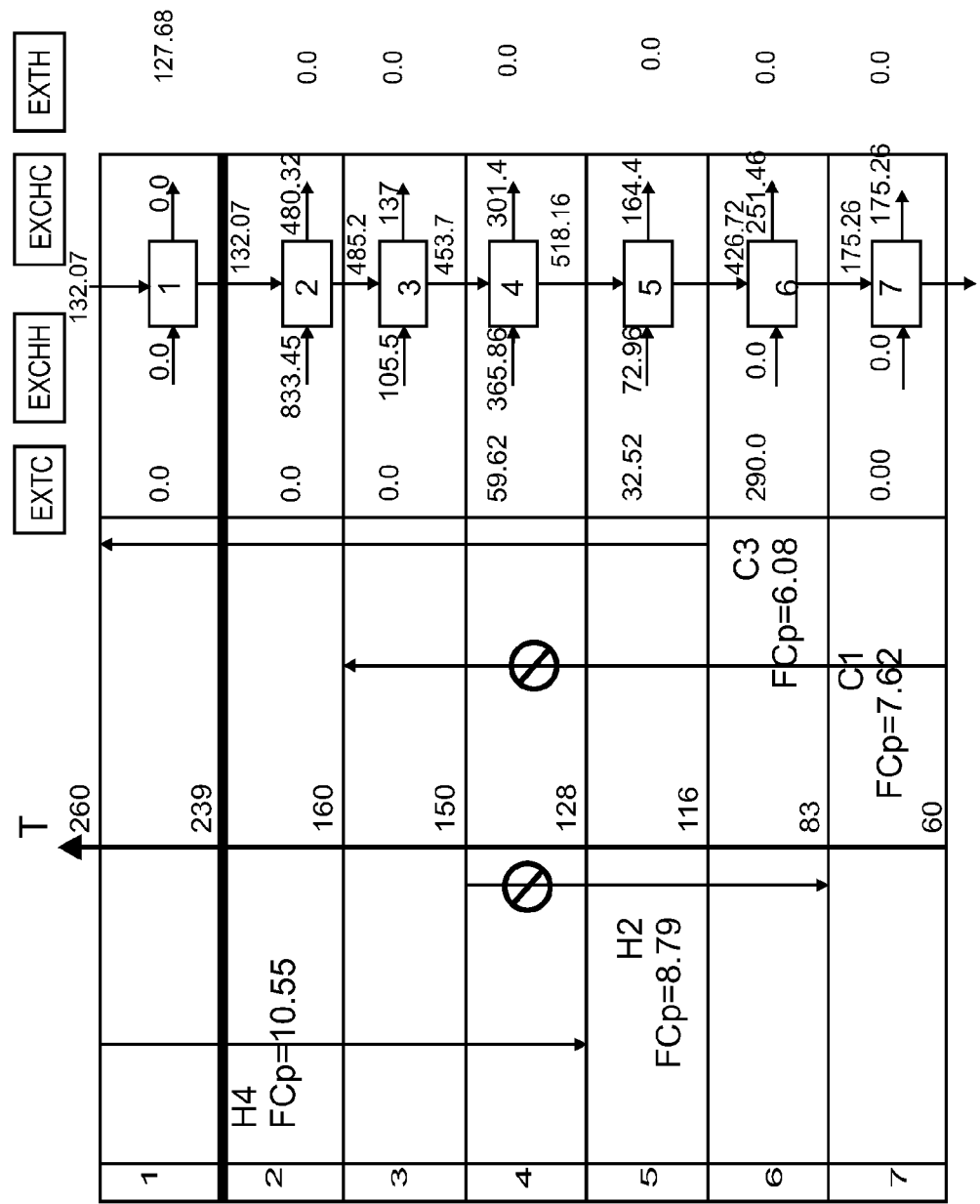
FIG. 11 is a graphical user interface illustrating the temperature steps of the second phase of a cascading algorithm implemented according to an embodiment of the present invention.

FIGS. 9-11 illustrates a real-world exemplary application of the method and energy utility consumption modeling program product 51 using values taken from literature (Grossmann, 1983) for an industrial process having two hot-process streams H4 and H2 and two cold process streams C1 and C3 and constrained by a non-thermodynamic constraint (with H2-C1 being a forbidden match), to include operational parameter range attribute value entry and output of the resulting determined optimal "constrained" total global heating energy utility interval ([Qh_total]) and the optimal "constrained" total global cooling energy utility interval ([Qc_total]) through a graphical user interface (see FIG. 9), and a pair of complementary temperature step interval diagrams which can be used to balance the exchangeable loads (energy) and to determine non-exchangeable energy to be obtained from an external hot and/or cold utility or utilities to thereby determine the optimal constrained total global minimum heating and the optimal constrained total global cooling energy utility interval or intervals (see FIGS. 10-11).

Figure 12:
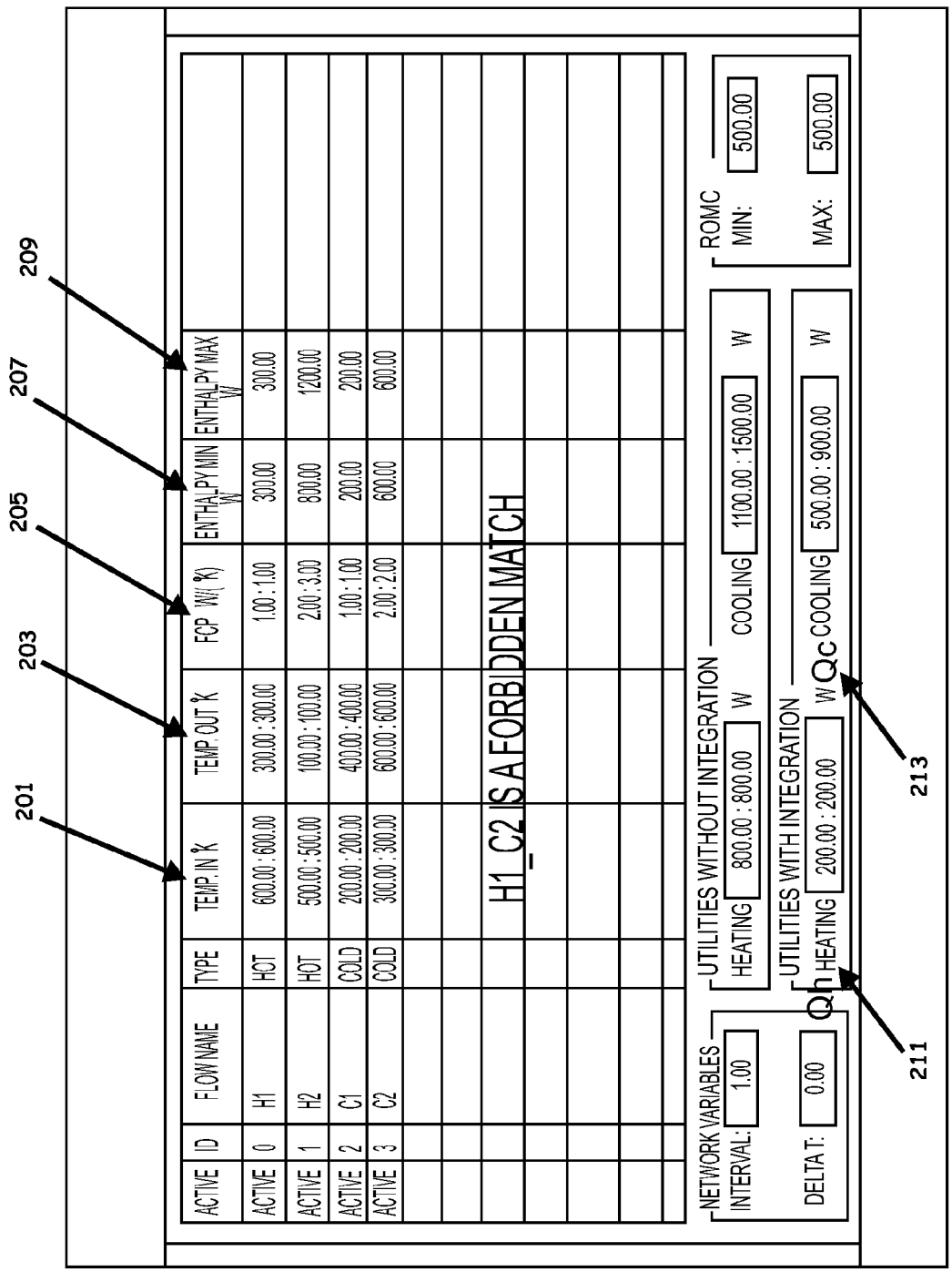
FIG. 12 is a schematic diagram of an exemplary graphical user interface according to an embodiment of the present invention.
Figure 13:
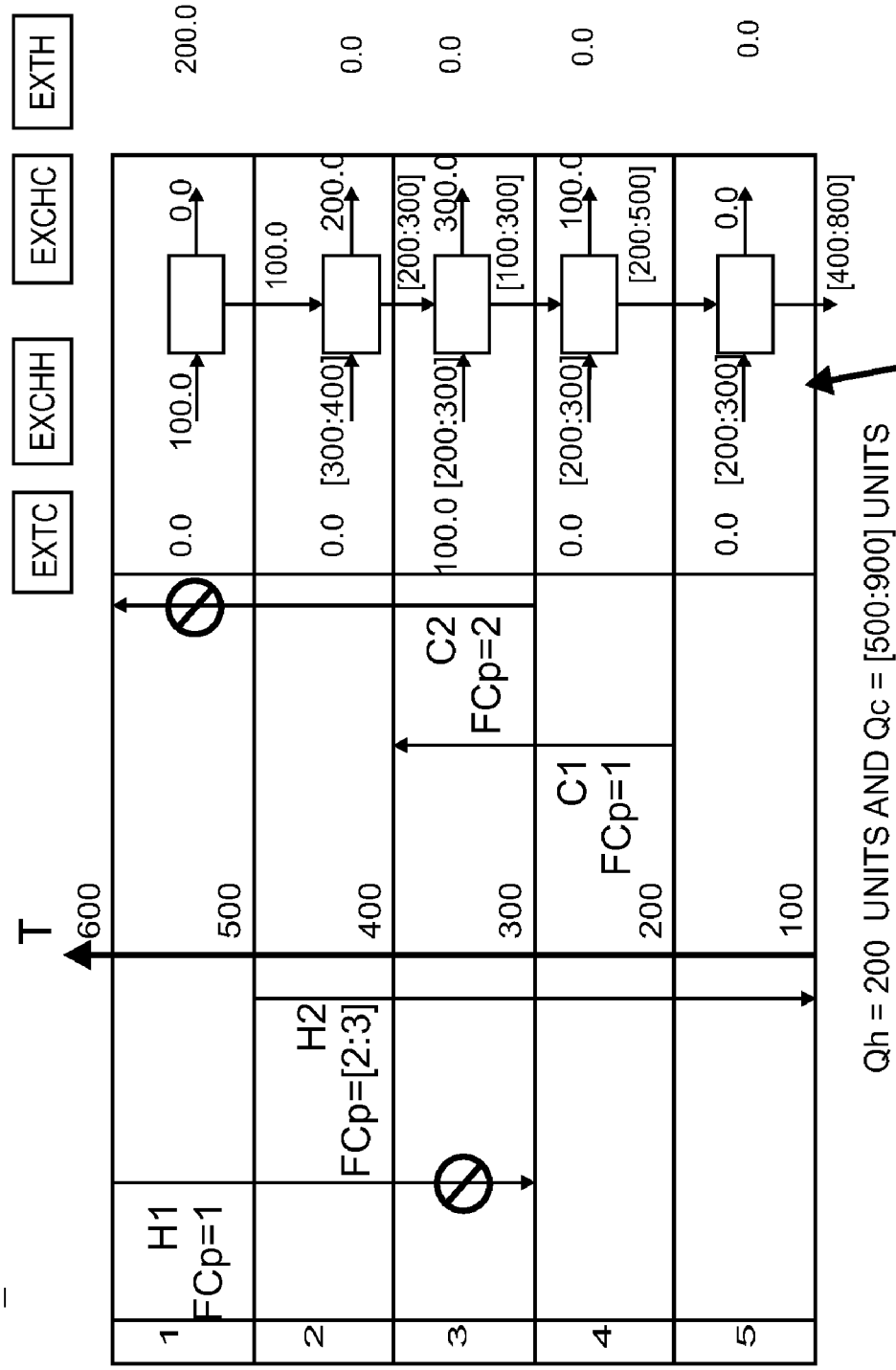
FIG. 13 is a graph and block flow diagram illustrating the temperature steps of a cascading algorithm used in a calculation for finding a global minimum heating energy utility requirement [Qh] and a global minimum cooling energy utility requirement [Qc] for a process having a forbidden match according to an embodiment of the present invention.
Figure 14:
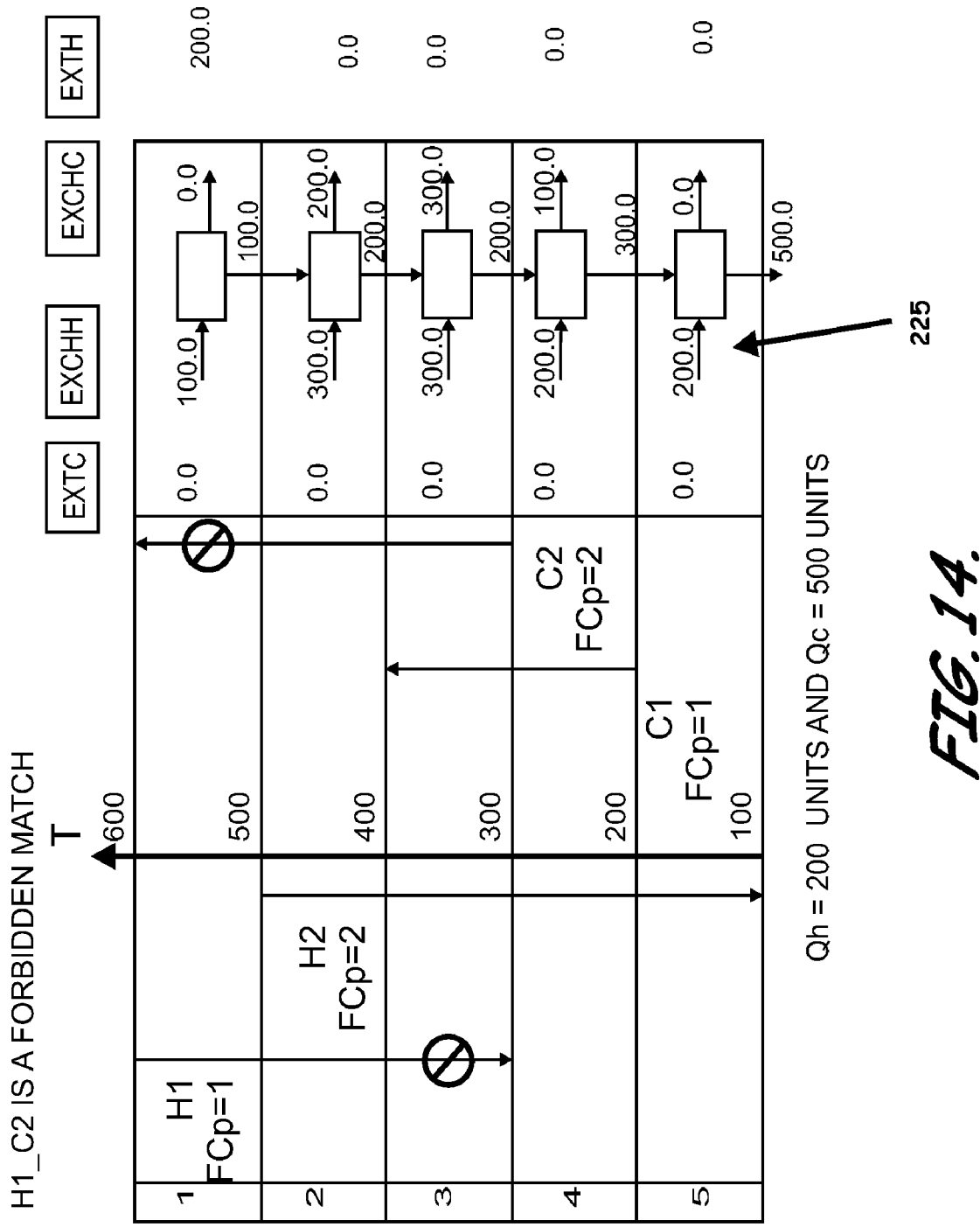
FIG. 14 is a graph and block flow diagram illustrating the temperature steps of FIG. 13 after application of a collapsing algorithm used to find optimal process conditions according to an embodiment of the present invention.

Interval Collapsing Algorithm to Find Optimal Process Conditions:

As perhaps best shown in FIGS. 12-14, according to an embodiment of the present invention, the program product 51 is adapted to indicate optimal value settings or values of particular operational attributes which, when used, result in the optimal energy consumption value calculated. These particular settings or values for operational attributes may then be used in the implementation of the actual process after modeling has occurred to potentially optimize the process.

To select the optimal set of process conditions, the process conditions interval 223 for each specific hot stream being analyzed is collapsed to render individual discrete boundary values while others are still in interval mode. This allows analysis of the specific process conditions of the respective hot stream at, for example, the range boundaries, or at some interim points therebetween, to thereby determine the desired minimum utility consumption value and exact process conditions that lead to it. The criteria for interval collapsing, for example, includes the selection of the lower bound or the upper bound of the interval-based operational attribute that render global minimum of a desired energy utility target. Any operational attribute value that does not render the desired energy target will be ignored. The desired energy target can be the global minimum cooling and/or global minimum heating utilities or it can be the global minimum heating utilities subject to minimum cooling utilities and vice versa.

If both the lower bound value and the upper bound value of stream supply temperature or target temperature are rendering bad values for the specified energy target, i.e., the algorithm does not render the global minimum energy target, the interval-based supply temperature is tested one-by-one to select the optimal supply temperature that renders the desired energy target. The same procedures can be used for the interval-based stream target temperature and for heat carrier streams target temperatures.

FIGS. 12-14 illustrate an example of application of the interval collapsing process with respect to an industrial process having two hot process streams H1 and H2 and two cold process streams C1 and C2 and constrained by a non-thermodynamic constraint (with H1-C2 being a forbidden match), with the value for the heat capacity flow rate of H2 having a value range of between 2 W/° K and 3 W/° K, i.e., FCp[2:3], which as shown in FIGS. 12-13, renders a global heating energy utility interval of [200:200] and a global cooling energy utility interval of [500:900].

It can be seen that the lower heat capacity flow rate FCp boundary limit of 2 W/° K for H2. Accordingly, as perhaps best shown in FIG. 14, to select the optimal set of process conditions, the process conditions interval reflected at 225 for the hot stream H2 (compare with FIG. 13) is collapsed to include only the values associated with the lower heat capacity flow rate FCp boundary limit of 2 W/° K, which renders a global minimum heating energy utility requirement of 200 units and a global minimum cooling energy utility requirement of 500 units.

Figure 15:
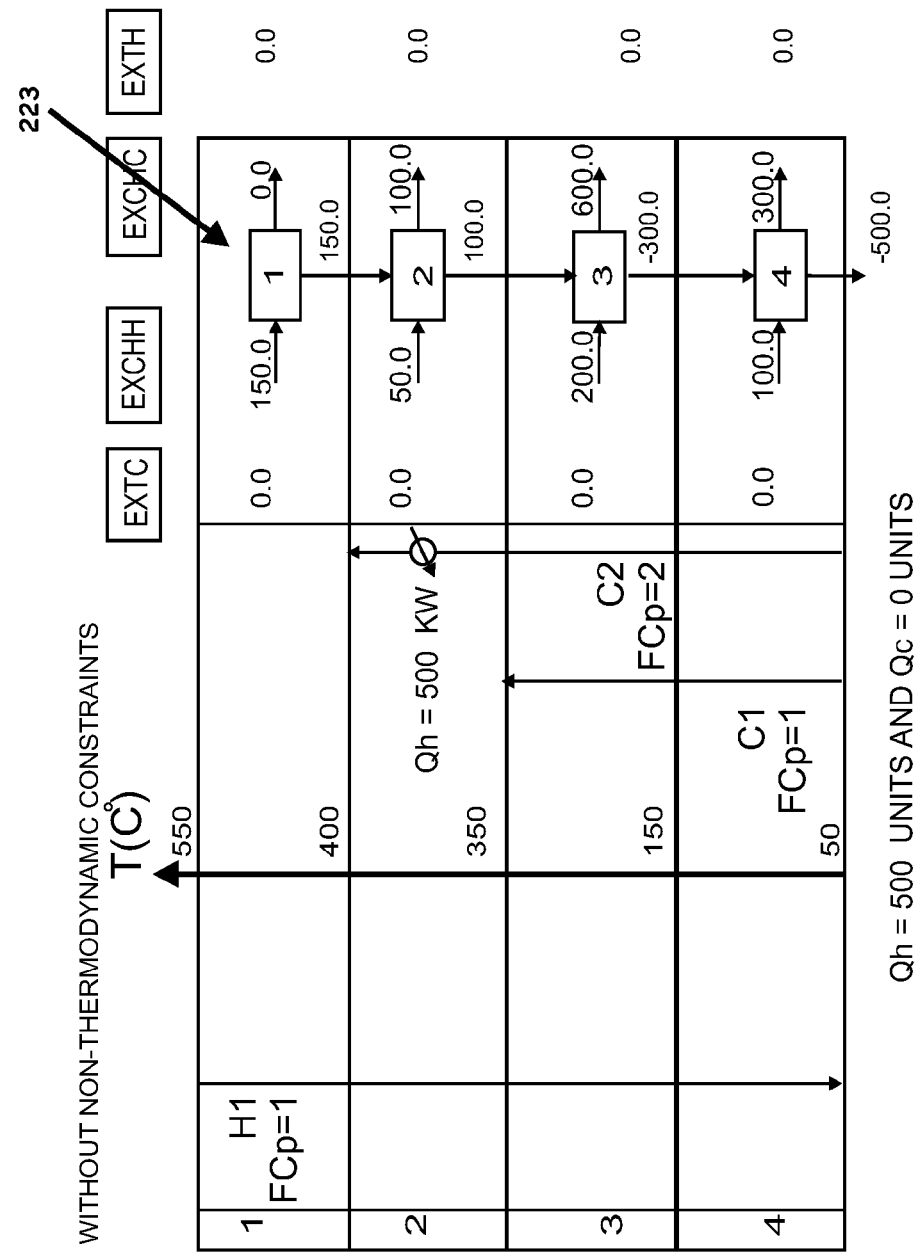
FIG. 15 is a graph and block flow diagram illustrating the temperature steps of a cascading algorithm used in a calculation for finding a global minimum heating energy utility requirement [Qh] and a global minimum cooling energy utility requirement [Qc] for a process without regard to a forbidden match.
Figure 16:
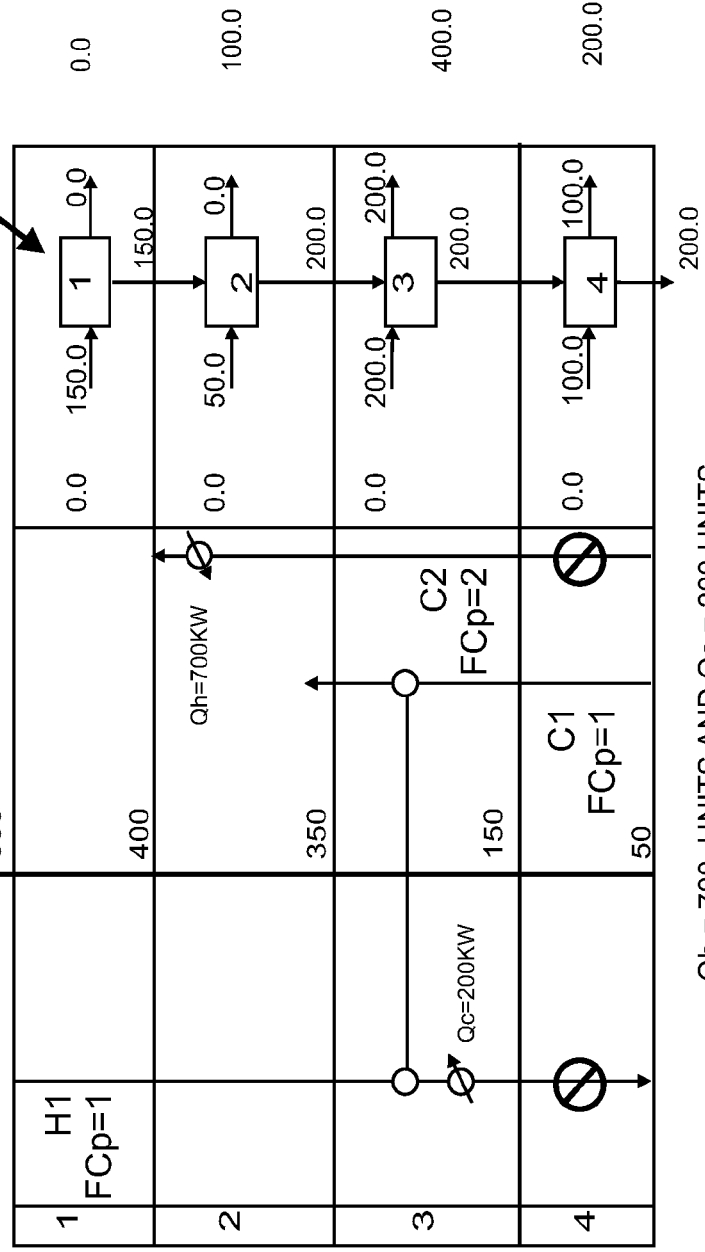
FIG. 16 is a graph and block flow diagram illustrating the temperature steps of a cascading algorithm used in a calculation for finding a global minimum heating energy utility requirement [Qh] and a global minimum cooling energy utility requirement [Qc] for a process having a forbidden match according to an embodiment of the present invention.
Figure 17:
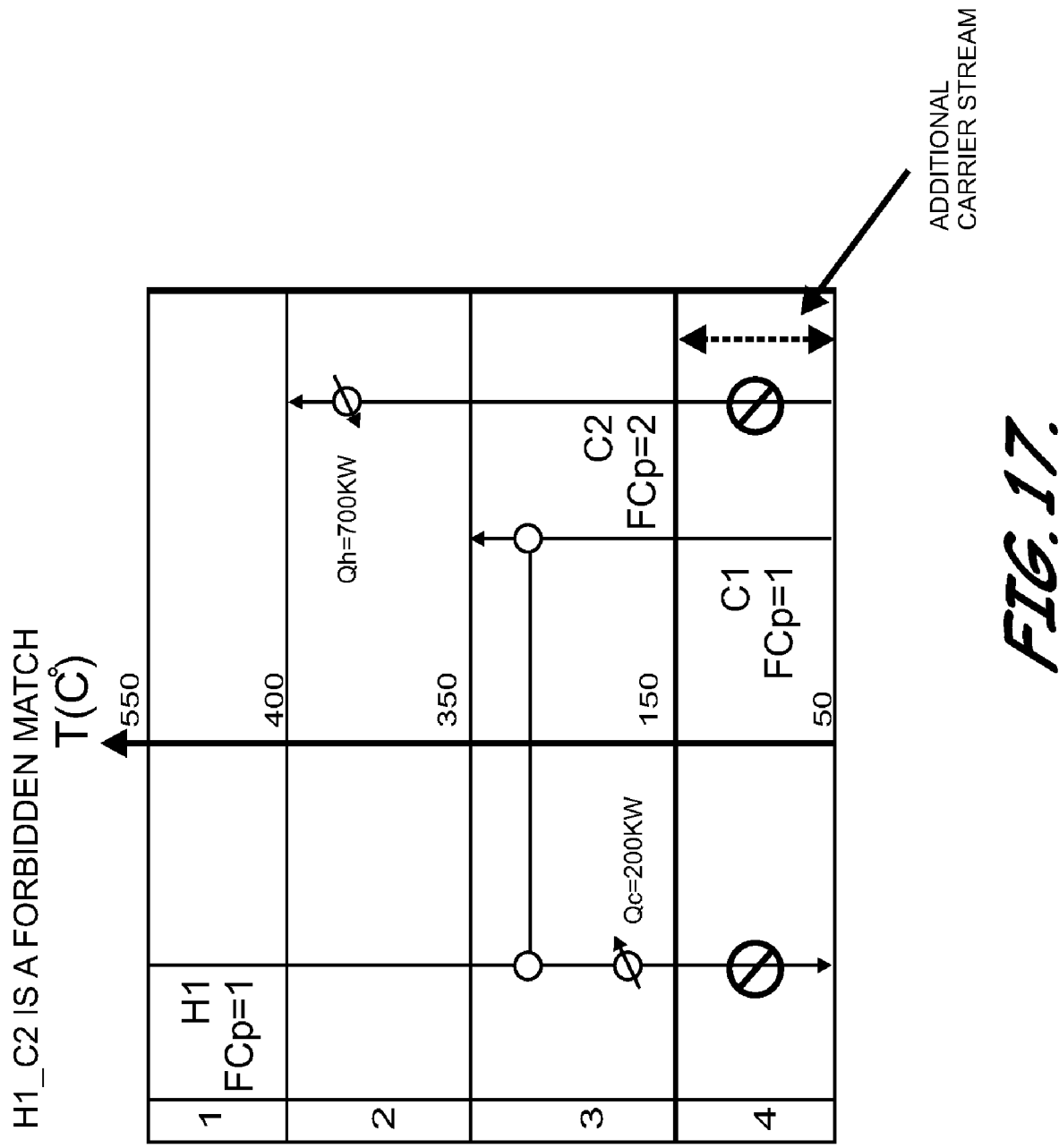
FIG. 17 is a graph illustrating the concept of adding an additional carrier stream for a process having a forbidden match according to an embodiment of the present invention.

FIG. 15 illustrates an example of a temperature step interval diagram 221 for a simple industrial process having one hot process stream H1 and two cold process streams C1 and C2 without any forbidden match constraints—i.e., without any non-thermodynamic constraints. FIG. 16, on the other hand, illustrates the same industrial process, but with H1-C2 being constrained by a non-thermodynamic constraint (with H1-C2 being a forbidden match), which results in a clear and significant effect on the heat recovery potential of the constrained process, i.e., both Qh and Qc are 200 units over that of the same process without non thermodynamic constraints.

FIGS. 17-23 illustrate an example application of the above described method on the industrial process having one hot process stream H1 and two cold process streams C1 and C2 and that is constrained by a non-thermodynamic constraint (with H1-C2 being a forbidden match), with application of an additional new carrier stream and associated heat carrier stream calculation procedures. Note, the minimum temperature approach value $\Delta T_{min}$ is embedded in the hot stream H1.

As shown in FIGS. 17-23, the addition of the additional carrier stream can provide the efficiency up to that obtainable in a configuration where no forbidden matches exist (see, e.g., FIG. 15). Specifically, FIGS. 17, 18, and 19 graphically illustrate the inclusion of the additional carrier stream to enhance heat recovery. The input data defining the carrier stream can include desired supply temperature Ts, target temperature Tt, and a heat capacity flow rate FCp provided as an interval with, for example, a zero flow rate at its lower limit, which, as perhaps best illustrated in FIG. 18, can act as a dual stream. There is a dependence between the cold heat carrier and the resultant hot heat carrier shown in FIG. 18. Further, target temperature Tt of the heat carrier can be treated as an interval also using the same calculation procedure. In the illustration, this target temperature interval range would be discreet having a width of 1.0° K.

Figure 18:
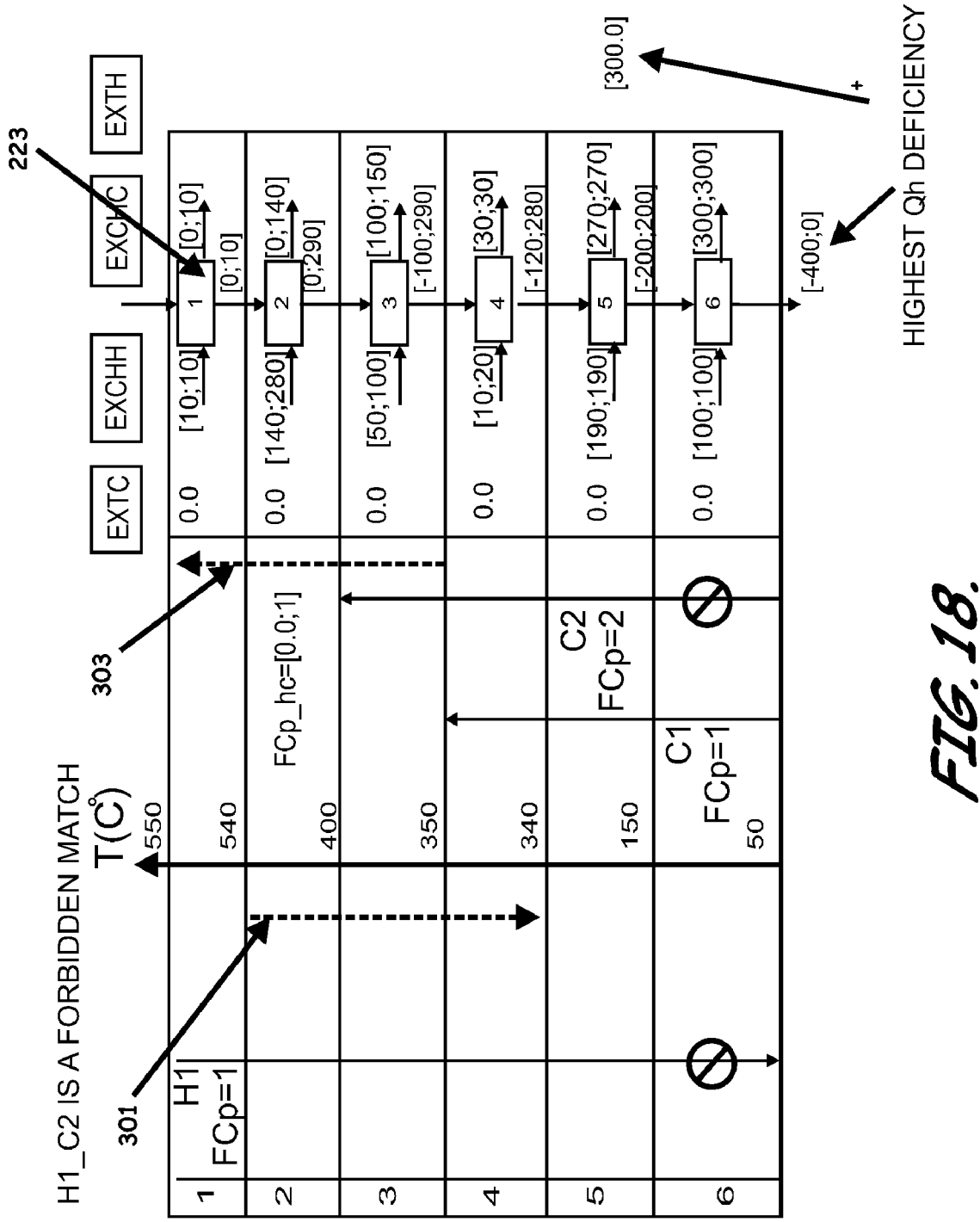
FIG. 18 is a graph and block flow diagram illustrating the temperature steps of a cascading algorithm used in a calculation for finding a global minimum heating energy utility requirement [Qh] for a process having a forbidden match and illustrating the application of an additional carrier screen performing as a dual stream according to an embodiment of the present invention.
Figure 19:
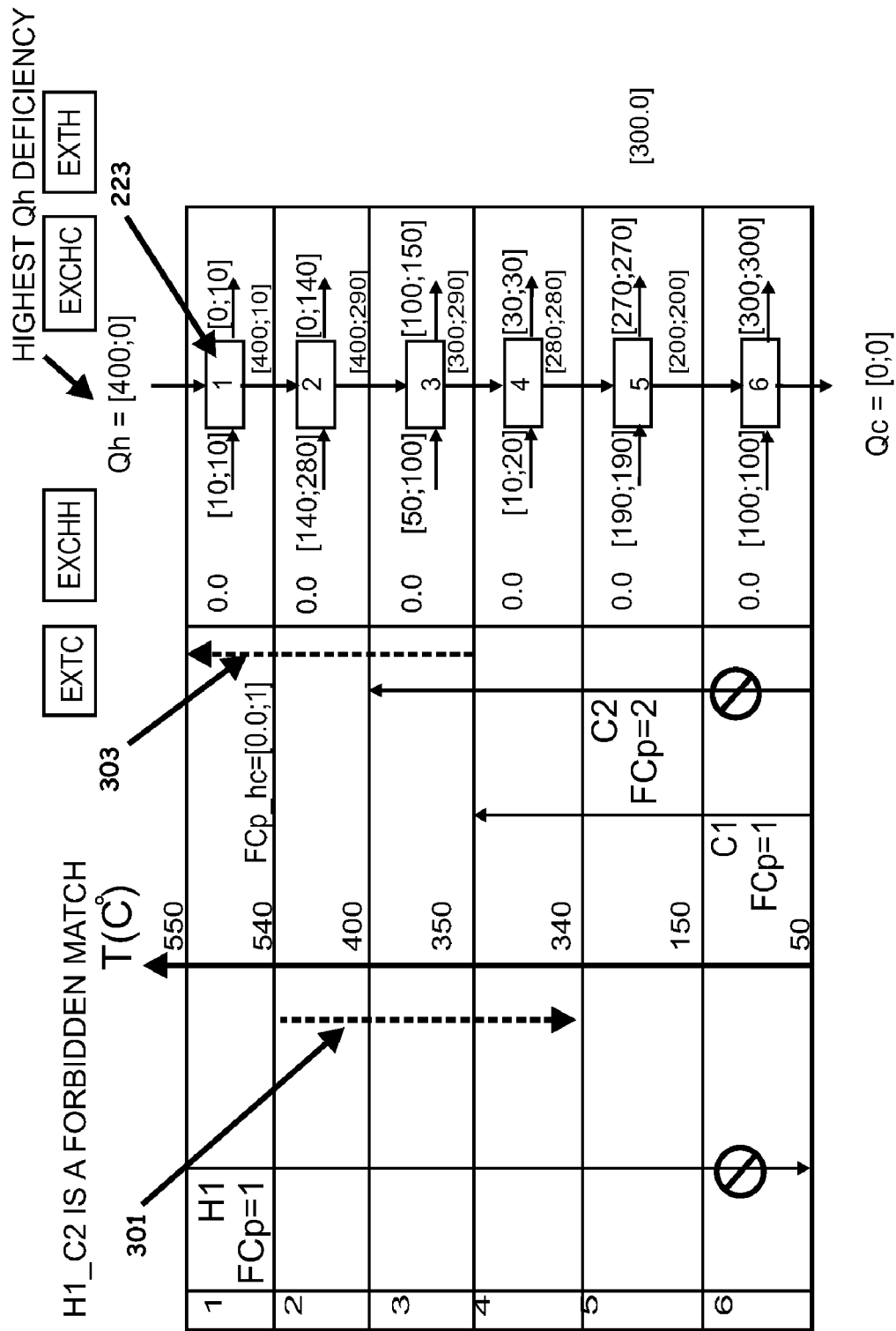
FIG. 19 is a graph and block flow diagram illustrating the temperature steps of a cascading algorithm used in a calculation for finding a global minimum cooling energy utility requirement [Qc] for a process having a forbidden match and illustrating the application of an additional carrier screen performing as a dual stream according to an embodiment of the present invention.
Figure 20:
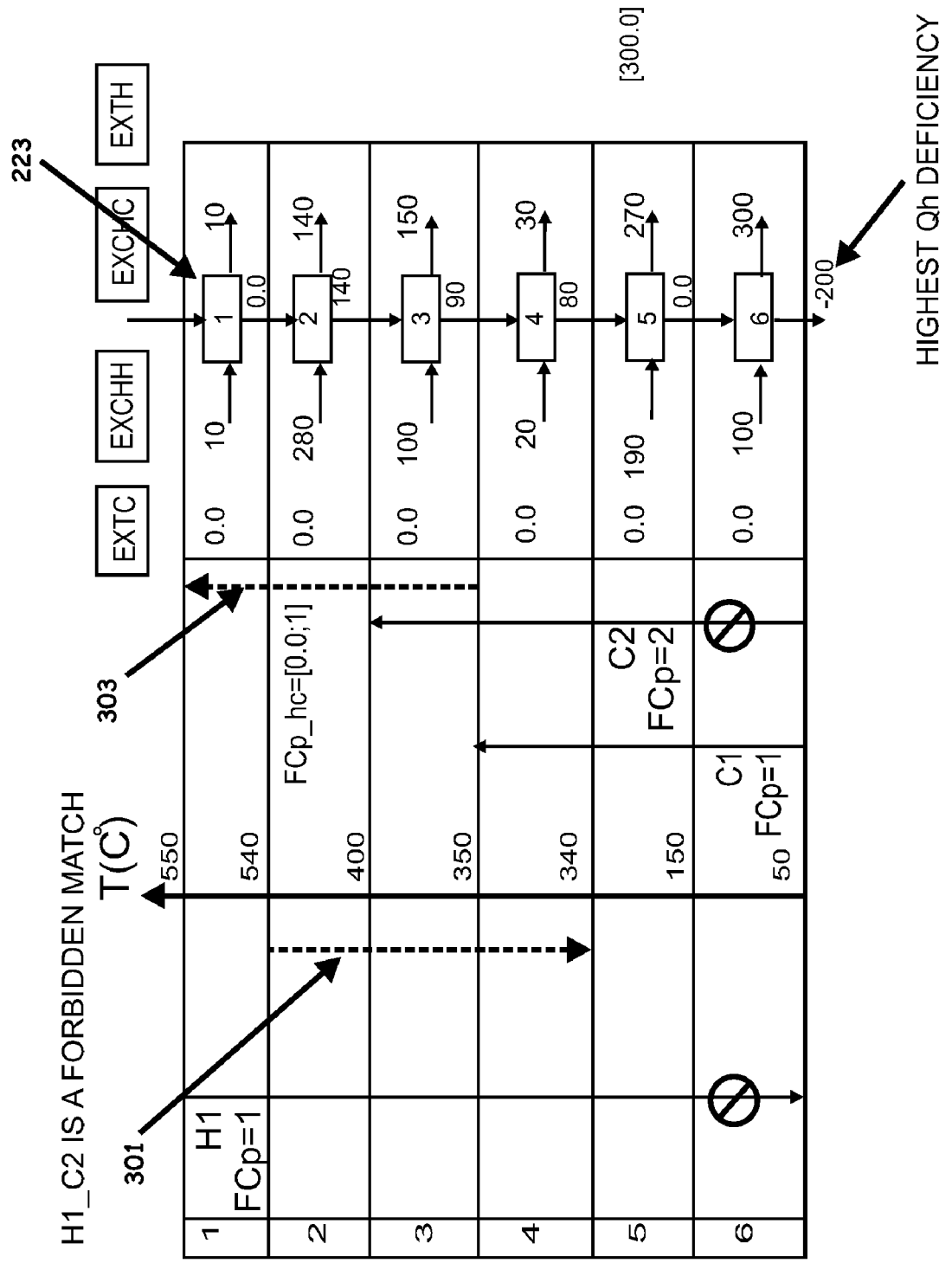
FIG. 20 is a graph and block flow diagram illustrating the temperature steps of FIG. 18 after application of a collapsing algorithm used to find optimal process conditions according to an embodiment of the present invention.
Figure 21:
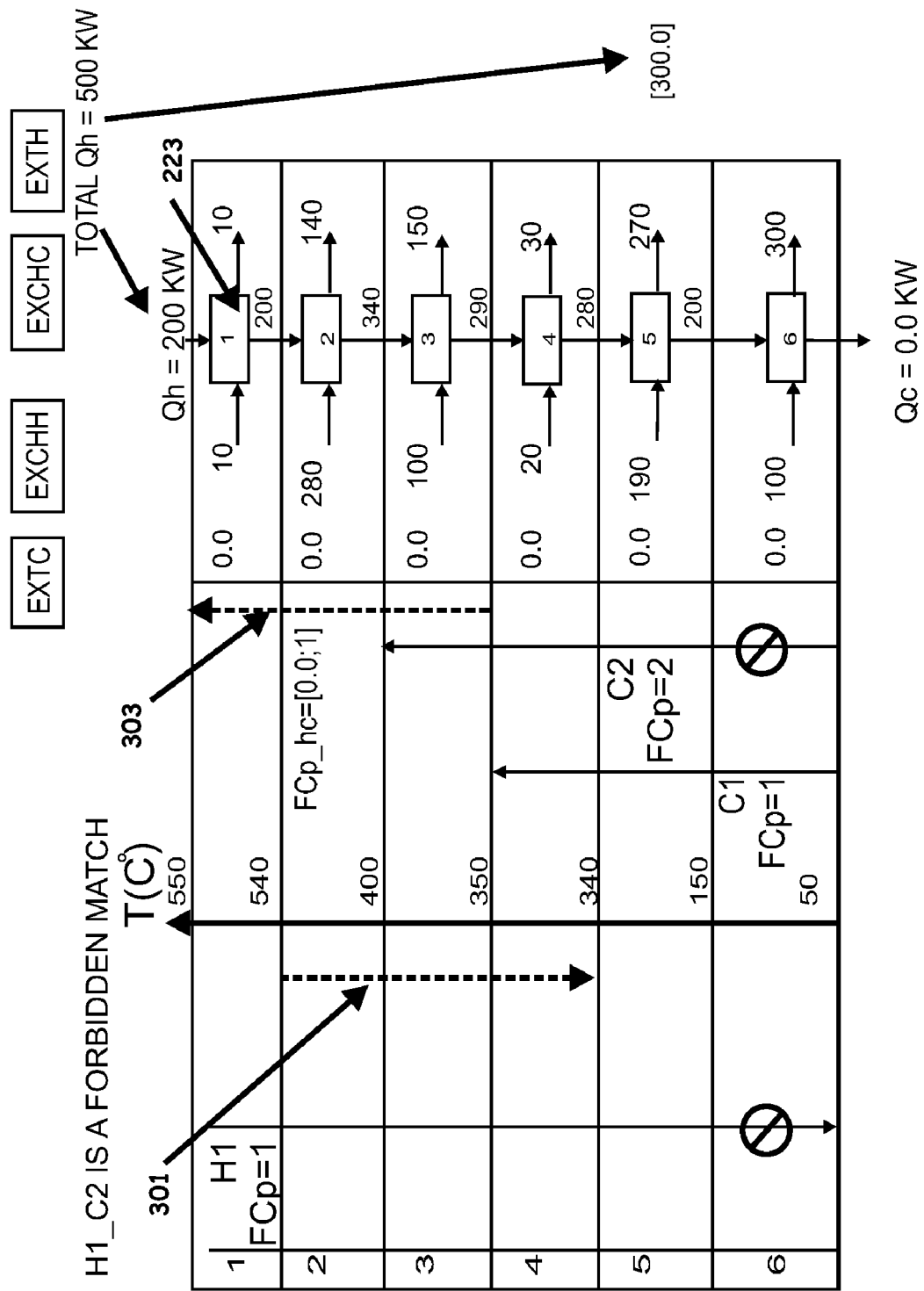
FIG. 21 is a graph and block flow diagram illustrating the temperature steps of FIG. 19 after application of a collapsing algorithm used to find optimal process conditions according to an embodiment of the present invention.

FIGS. 18 and 19 further illustrates a temperature step interval diagram for the industrial process to balance the exchangeable loads (energy) and to determine non-exchangeable energy to be obtained from an external hot and/or cold utility or utilities to thereby determine the optimal global heating energy utility interval [Qh] (FIG. 18) and the optimal global cooling energy utility interval [Qc] (FIG. 19) in conjunction with the application of the additional carrier screen functioning as a dual stream with aspects on both the hot stream and cold stream side of the graph shown at 301 and 303, respectively. The Qc minimum target in this example is equal to 0.0 kW. To reach the exact minimum Qh target, illustrated in FIGS. 20 and 21, the EXCHH intervals shown in FIGS. 18 and 19 are collapsed on the upper bound values. Due to dependence between the existence of the additional carrier stream on both hot and cold side, the EXCHC intervals are also collapsed on the upper bound values.

Figure 22:
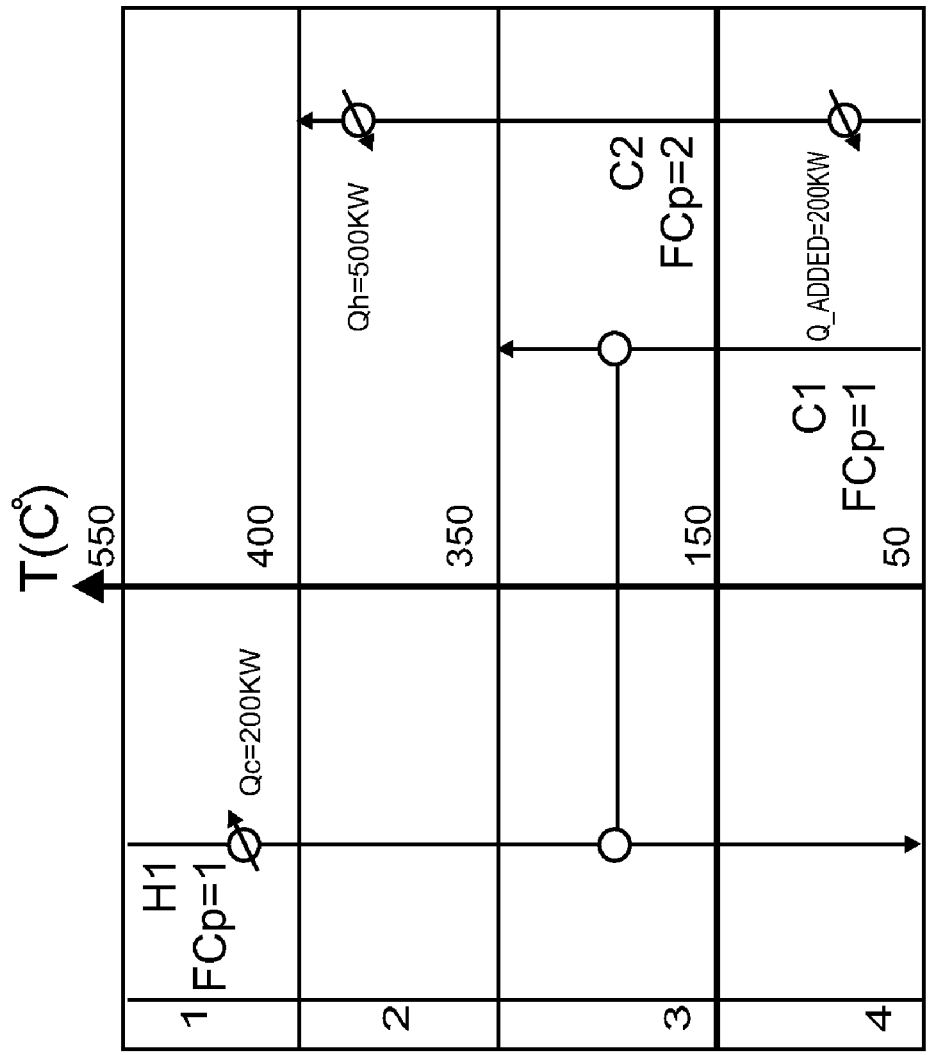
FIG. 22 is a graph illustrating the results of adding an additional carrier stream for a process having a forbidden match according to an embodiment of the present invention.
Figure 23:
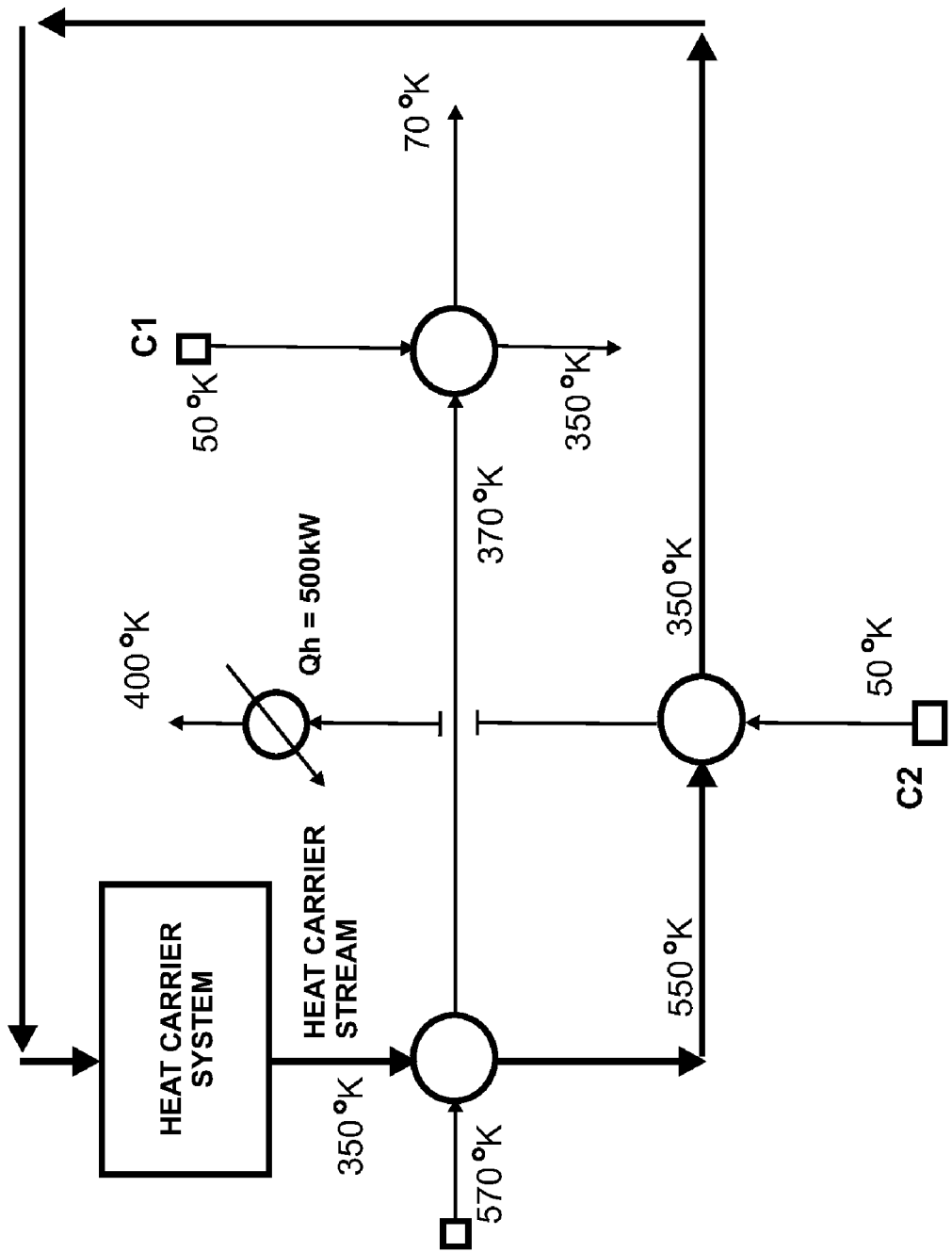
FIG. 23 is a schematic diagram illustrating heat transfer resulting from application of the additional carrier stream for a process having a forbidden match according to an embodiment of the present invention.

FIGS. 22 and 23 illustrate the result of the inclusion of the additional carrier stream in the calculation. As perhaps best shown in FIG. 22, the additional carrier stream functions to cool down the hot stream H1 through absorption of 200 kW of heat energy which is applied to the second cold stream C2 to heat the second cold stream C2 and thereby reduce the amount of heat energy Qh required from an external utility from 700 kW (see, e.g., FIG. 16) to 500 kW (FIG. 22). FIG. 23 provides a resulting heat flow diagram according to the exemplary process to illustrate heat transfer between streams due to the inclusion of the additional carrier stream.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium storing a set of instructions in a variety of forms for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and certain types of transmission type media such as, for example, digital and analog communication links capable of storing the set of instructions. Such media can contain, for example, both operating instructions and the operations instructions described previously with respect to the program product 51 stored in the memory 35 of the energy utility modeling computer 31, and the computer executable portions of the method steps according to the various embodiments of a method of modeling energy consumption of a non-thermodynamically constrained waste heat recovery process or processes, described above.

For example, a computer readable medium that is readable by energy utility consumption modeling computer 31 to optimize energy recovery for a non-thermodynamically constrained process having a plurality of process streams (H1 . . . Hn, C1 . . . Cn) can include a set of instructions, that when executed, cause the computer 31 to perform various operations to include receiving a first plurality of sets of values each separately defining a potential range of attribute values for at least one of the plurality of hot process streams and a first plurality of sets of values each separately defining a potential range of attribute values for at least one of the plurality of cold process streams, and receiving a constrained stream list comprising an identification of at least one constrained process stream constrained from matching at least one other process stream due to a non-thermodynamic constraint (e.g., an arbitrary hot stream H1 can be forbidden to match an arbitrary cold stream C2). Note, the process streams need to be, and typically are not, of the same type. Accordingly, the exemplary process streams can include a process stream characterized by being of a type that is different than that of the at least one non-thermodynamically constrained process stream and the at least one other process stream.

The operations can also include assigning (and/or determining) a set $\{\Delta T_{min}^{i}\}$ of stream-specific minimum temperature approach values $\Delta T_{min}^{i}$ to a corresponding set of hot process streams, and determining a plurality of temperature step intervals 223 for one of the plurality of specific minimum temperature approach values $\Delta T_{min}^{i}$. Each temperature step interval can have an input interval [EXCHH] typically in the form of a pair of inputs defining the high-end and low-end of a range of values indicating heat extracted collectively from the plurality of hot process streams, an output interval [EXCHC]=[$Q_s^{low\_output}$, $Q_s^{high\_output}$] indicating heat collectively applied to the plurality of cold process streams, and an output interval [$Q_s^{low\_surplus}$, $Q_s^{high\_surplus}$] indicating surplus heat available for a next of the plurality of temperature step intervals. The first value for $\Delta T_{min}^{i}$ is set, for example, to a user defined highest value for all hot process streams to establish a global maximum energy target values for the constrained process due to the choice of minimum temperature approach values. Correspondingly, the operations can also include determining a global heating energy utility interval [Qh(minimum), Qh(maximum)], and determining a total global heating energy utility interval [Qh_total] for the non-thermodynamically constrained process responsive to determining the global heating energy utility interval [Qh (minimum), Qh(maximum)].

The operations can also include determining a symmetric image [Qh(maximum), Qh(minimum)] of an intermediary interval [zQh] having interval values equal to the global heating energy utility interval [Qh(minimum), Qh(maximum)] responsive to determining the global heating energy utility interval [Qh(minimum), Qh(maximum)], applying the symmetric image to the plurality of temperature step intervals 223, determining a global cooling energy utility interval [Qc (minimum), Qc(maximum)] for exchangeable energy or simply [Qc], and determining a total global cooling energy utility interval [Qc_total] for the non-thermodynamically constrained process.

The operations can also include determining stream-by-stream for each of the plurality of temperature step intervals, a load value of exchangeable energy ([EXCHC]) to be obtained from at least one external hot stream for the respective temperature step interval, a load value of non-exchangeable energy ([NON-EXCHC]) to be obtained from at least one external hot utility for the respective interval and for each preceding temperature step interval to thereby determine total non-exchangeable energy [EXTH] to be obtained from the at least one external hot utility, a load value of exchangeable energy ([EXCHH]) to be obtained from at least one external hot stream for the respective interval, and a load value of non-exchangeable energy ([NON-EXCHH]) to be obtained from at least one external cold utility for the respective interval and each following interval to thereby determine a total non-exchangeable energy [EXTC] to be obtained from the at least one external cold utility, whereby the total non-exchangeable energy [EXTH] equals the sum Σ of the total non-exchangeable energy [NON-EXCHC] of each of the temperature step intervals, and the total non-exchangeable energy [EXTC] equals the sum Σ of the total non-exchangeable energy [NON-EXCHH] of each of the temperature step intervals.

The operations can further include determining a total global heating energy utility interval [Qh_total] by adding the global heating energy utility interval for exchangeable energy [Qh] and the sum of total non-exchangeable energy to be obtained from at least one external hot utility ([EXTH]) required for each of the temperature step intervals, and determining a total global cooling energy utility interval [Qc_total] by adding the global cooling energy utility interval for exchangeable energy [Qc] and the sum of total non-exchangeable energy to be obtained from at least one external cold utility ([EXTC]) required for each of the temperature step intervals.

According to an embodiment of the present invention, the operations can include those associated with the employment of at least one additional carrier/dummy stream to aid in the determination of process improvements. Accordingly, the operations can include receiving a range of attribute values for the additional/dummy heat carrier stream. Further, the operation of determining a plurality of temperature step intervals 223, and thus, the operations of determining the global heating and/or cooling energy utility intervals [Qh], [Qc], determining the load value of non-exchangeable energy ([NON-EXCHC], [NON-EXCHH]) to be obtained from at least one external hot or cold utility, respectively, and determining the optimal total global minimum heating and/or cooling energy utility interval [Qh_total], [Qc_total], can be further responsive to or otherwise based upon the attribute values provided for the dummy heat carrier streams.

According to an embodiment of the present invention, the operations can include those to employ an interval collapsing and marching process. For example, the operations can include selecting a desired utility heating or cooling energy utility target as an energy objective, collapsing a process conditions interval for one of the plurality of hot process streams to render a discrete boundary value for the one of the plurality of hot process streams with the process conditions of the other of the plurality of hot process streams remaining in the form of intervals, and decreasing a $\Delta T_{min}^i$ of one of the plurality of hot streams by one degree, determining an effect of the decrease in $\Delta T_{min}^i$ on the desired utility target. The operations can also include repeating the operations of decreasing the $\Delta T_{min}^i$ and determining the effect of the decrease to determine the optimal $\Delta T_{min}^i$ for the one of the plurality of hot streams, and performing the operations of collapsing a process conditions interval, decreasing a $\Delta T_{min}^i$, determining the effect of the decrease, and repeating the operations of decreasing a $\Delta T_{min}^i$ and determining the effect of the decrease for each other of the plurality of hot streams to thereby determine the optimal $\Delta T_{min}^i$ for each of the plurality of hot process streams.

The operations can further include repeating the above described interval collapsing and marching process throughout a range of minimum temperature approach values $\Delta T_{min}^i$ [L:U] beginning at an upper boundary value $\Delta T_{min}^i$ [U] and substituting the determined optimal $\Delta T_{min}^i$ for each of the plurality of hot process streams as the new upper boundary value until the determined total global minimum heating energy utility Qh_total and/or determined total global minimum cooling energy utility Qc_total are sufficiently close to that of the solution for the process problem not limited by the non-thermodynamic constraints.

The various embodiments of the present invention have several advantages/benefits. For example, the program product 51 can be adapted to model the energy consumption of a particular both thermodynamically and non-thermodynamically constrained process. In general terms, the modeling operation or facility provided can be used in investigations or analyses of specific processes and their energy consumption characteristics or requirements. According to an embodiment of the present invention, the model or modeling facility provided may be used to optimize the energy consumption characteristics of a constrained process, preferably to minimize the amount of energy consumed. Beneficially, insights obtained from each process application energy target calculation phase can be used to make the processing time of this algorithm consume less than a second of the computer time.

Note, reference throughout has been made to embodiments of the present invention being used as a tool to optimize the energy consumption of a constrained process, sometimes referred to herein as non-thermodynamically constrained process. Those skilled in the art, however, should appreciate that embodiments of the present invention may also be used as a simple analytical or analysis tool, if required, directed to a wide range and number of different types of varied processes. Furthermore, the non-thermodynamically constrained process, although primarily described as being a constrained industrial process, may be defined as any operation or set of operations which consumes energy to, in turn, produce a required result, or alternatively, to produce a material or product. Such processes can range, for example, from domestic processes that use the household hot water system to heat, cool or mechanically process or chop materials, to industrial process to include electricity generation systems and plants, etc. Processes that have their associated energy consumption modeled in conjunction with one or more embodiments of the present invention may also include a single manufacturing production line for a specific type of product, or manufacturing plant, equipment or production lines, or collections of production lines which may produce unrelated products or materials. Furthermore, a single constrained process to be considered in conjunction with embodiments of the present invention may also consist of (or incorporate) a set of sub-processes which need not necessarily be related together, nor in some instances, need not require the physical apparatus or equipment employed to be located in close proximity or adjacent to other equipment used.

Beneficially, various embodiments of the program product 51 are adapted to model energy consumption of a single constrained process. The energy consumed may be in a variety of different forms of mechanical and thermal energy. For the sake of simplicity, reference throughout this specification has generally been made to the energy consumed being originally sourced from thermal energy. Again, those skilled in the art should appreciate that other types of energy may also be monitored or modeled and reference to the thermal energy should in no way be seen as limiting. In addition, the energy consumed in conjunction with the illustrated embodiments of the present invention were, in general terms, referred to as being employed to heat or cool materials of a constrained process. Again, however, those skilled in the art should appreciate that other energy consumption applications may also be considered and reference to the above should in no way be seen as limiting.

A non-thermodynamically constrained process modeled in accordance with various embodiments of the present invention may include a plurality of resource streams of a constrained process. In general terms, a resource stream may comprise a flow of material that is consumed, modified or employed in some way within the process. For example, resource streams may be in the form of flows of water or other types of fluid or gases, or alternatively, two or three phase flows with pressure as a state variable can be handled the same way energy and mass quantities are handled. For the sake of simplicity, reference throughout this specification has generally been made to the process streams of a constrained process monitored using embodiments of the present invention and employed in the particular process modeled to include flows of one or more types of fluid. Those skilled in the art should appreciate that other types of resources may also be employed and modeled in conjunction with embodiments of the present invention and reference to the above should in no way be seen as limiting. Furthermore, those skilled in the art should also appreciate that a resource stream need not necessarily be made up of a substantially continuous flow of material. For example, in some instances a resource stream of a constrained process may be composed from a supply or flow or material delivered periodically in discreet blocks, if required.

As noted previously, a resource stream may have at least one operational attribute associated with it. An operational and/or design attribute may be a specific characteristic or parameter associated with a particular stream which in turn will have an effect on the energy consumed by the process modeled. Those skilled in the art should appreciate that various different types of operational attributes may be monitored and modeled in conjunction with various embodiments of the present invention, depending on the particular type of resource stream which the operational attribute is associated with. For example, in some instances, examples of operational attributes could include a materials temperature, flow rate, composition, pressure, latent heat of vaporization, latent heat of condensation, latent heat of sublimation, and/or combinations of all these attributes. Nevertheless, for the sake of simplicity, reference has generally been made to the operational attributes in the form of the temperature of a fluid flow, the flow rate, and the specific heat of the resource stream of a fluid flow. Again, those skilled in the art should appreciate that other configurations and implementations of the present invention are envisioned and reference to the above should in no way be seen as limiting.

Beneficially, various embodiments of the program product 51 can record, hold or otherwise receive a list of identified resource streams within a constrained process that affect the energy consumption of the process. All the resource streams involved can be monitored and modeled in conjunction with the embodiments of the present invention to provide the most accurate indication or calculation of the energy consumption value or values required.

In a preferred configuration, all relevant operational and/or design attributes of the resource streams monitored or modeled can be identified for or within the program product 51. That is, all operational and/or design attributes of the streams monitored which have an effect on the energy consumption of a process may be tracked and modeled in conjunction with a preferred embodiment of the present invention. Modeling each and every operational and design attribute of a constrained process which affects energy consumption can beneficially provide an accurate calculation of energy consumption for the process modeled.

In various alternative embodiments of the present invention, it is not necessary to identify and monitor all resource streams employed in a constrained process. For example, in such an alternative embodiment, only a selected number of streams which are of the most importance or have the most significance with respect to energy consumption of the process need be monitored or identified. This can provide an approximate calculation of the energy consumption value or values required while using relatively low cost computer systems or to provide a fast approximate indication of an energy consumption value.

In various alternative embodiments of the present invention, it is not necessary to monitor or model each and every relevant operational and/or design attribute. For example, in one alternative embodiment, only a selected number of highly relevant or highly significant attributes with respect to energy consumption is monitored or modeled. The program product 51 can allow the rigorous check of such significance via an interactive data entry capability that enables the continuous calculation of the energy consumption global minima and maxima upon the entry of the data of each individual resource stream of a constrained process. This function/process can allow a fast and approximate energy consumption values to be calculated, or alternatively allow the present invention to function using a relatively low capacity computer system or systems.

Beneficially, various embodiments of the program product 51 are adapted to receive from a user at least one set of a range of attribute values for one or more operational attributes of a resource stream. The user of the program product 51 may be a person, persons or organization wishing to model and potentially optimize the energy consumption of a particular constrained process. The user involved can input at least one set of a range of attribute values for a selected operational or design attribute of a resource stream to thereby provide the base data or information required to set up a model of the process involved.

This information can be indicative of an allowable range of values for a particular operational and/or design attribute of a constrained process that can vary the energy consumed by the process involved. Beneficially, by supplying a range of attribute values, this can substantially simplify the use of the program product provided for a user, who beneficially, need not experiment with each and every potential case provided through all the discreet single values capable of being entered and received, as is generally the case with conventional systems.

In a further preferred embodiment of the present invention, a single set of a range of attribute values may be received from a user and assigned to each and every operational and design attribute identified for each and every resource stream monitored and modeled in conjunction with the present invention. The range of attribute values received can provide the operational and design parameters of a constrained process within which each of the operational attributes can vary of fluctuate in the running of the process to be modeled, as well as stream-specific minimum temperature approach values.

In alternative embodiments of the present invention, a single range of attribute values of a constrained process need not necessarily be received for each and every operational and/or design attribute monitored and modeled in conjunction with the present invention. For example, in an alternative embodiment, a single range of operational or design attributes may be provided for a single operational or design attribute for a resource stream that has multiple attributes, as should be appreciated by those skilled in the art. Furthermore, it should also be appreciated that more than one set of ranges of attribute values can be received in relation to a single operational attribute. Several sets of continuous ranges of attribute values can be received, if desired, in accordance with such an embodiment. As such, although reference has been made to receiving a single set of a range of attribute values for each and every attribute of each and every resource stream monitored and modeled in conjunction with one or more embodiments of the present invention, those skilled in the art should appreciate that other configurations and implementations are envisioned, and reference to the above, should in no way be seen as limiting.

Beneficially, various embodiments of the program product 51 are adapted to calculate at least one energy consumption value for a non-thermodynamically constrained process using, for example, the received range or ranges of attribute values. The energy consumption value or values calculated can be an optimal value for the process involved, calculated through determining or selecting a specific collection of attribute values, which result in an optimized energy consumption result. Various embodiments of the program product 51 can also calculate or otherwise determine a specifically optimized set of operational and/or design attribute values or settings that provide the global minimum energy consumed by the constrained process. The values can beneficially be used to fine tune the operation or design of equipment to be employed to implement the process, or alternatively, to adjust or assist in redesign and redevelopment or refitting work to be completed with respect to an existing process system.

In an embodiment of the present invention, the program product 51 can be used to calculate a value for the total required global external energy utility required/used to heat resource streams (Qh_total), and the total required global external energy utility required/used to cool resource streams (Qc_total), and can also be used to calculate the minimum heating utility subject to the global minimum cooling utility, and/or to calculate the minimum cooling utility subject to global minimum heating utility for a constrained process.

Beneficially, various embodiments of the program product 51 are adapted to calculate global minima energy consumption values required by hot and cold resource streams in any constrained process or cluster of constrained processes using unique mathematical formulation that can also render improved waste heat recovery. Those skilled in the art should appreciate that other implementations or aspects of the technology developed, however, are also envisioned and reference to the above should in no way be seen as limiting. Various embodiments of the present invention include the methodology, the mathematical algorithm, and the user-friendly program product that automatically executes the methodology. The method and calculation engine/mathematical algorithm in the program product can be considered independently since they individually can be utilized by others to develop their own version of one or more embodiments of the program product 51.

This application is related to U.S. patent application Ser. No. 11/768,084, filed Jun. 25, 2007, titled "Systems, Method, and Program Product for Targeting and Optimal Driving Force Distribution in Energy Recovery Systems," which claims priority to and the benefit of U.S. Patent Application No. 60/816,234, filed Jun. 23, 2006, titled "Method and Program Product for Targeting and Optimal Driving Force Distribution in Energy Recovery Systems," and is related to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. This invention is not to be construed as limited to the particular forms or embodiments disclosed, since these are regarded as illustrative rather than restrictive. It will be apparent, however, that various modifications and changes can be made within the spirit and scope of the invention as described in the foregoing specification.

That claimed is:

1. A system to model the energy consumption of a non-thermodynamically constrained waste heat recovery process, the non-thermodynamically constrained process using a plurality of resource streams including at least one non-thermodynamically constrained process stream, the system comprising:

an energy utility consumption modeling computer including a processor and memory coupled to the processor;

energy utility consumption modeling program product to target and optimize non-thermodynamically constrained waste heat recovery for the non-thermodynamically constrained process, the program product stored in the memory of the energy utility consumption modeling computer and including instructions that when executed by the energy utility modeling computer, cause the computer to perform the operations of:

receiving a first plurality of sets of values each separately defining a potential range of attribute values for an attribute of one of a plurality of hot process streams and a second plurality of sets of values each separately defining a potential range of attribute values of an attribute of one of a plurality of cold process streams;

receiving a constrained stream list comprising an identification of at least one non-thermodynamically constrained process stream constrained from matching at least one other process stream due to a non-thermodynamic constraint defining a forbidden match;

assigning a set of a plurality of stream-specific minimum temperature approach values to a corresponding plurality of hot process streams;

decreasing a value of one of the plurality of minimum temperature approach values in the set of a plurality of stream-specific minimum temperature approach values assigned to the plurality of hot process streams, the value of the one of the plurality of minimum temperature approach values being assigned to a corresponding one of the plurality of hot process streams;

determining a plurality of temperature step intervals responsive to the potential range of attribute values for the plurality of hot process streams, the potential range of attribute values for the plurality of cold process streams, and the assigned set of the plurality of stream-specific minimum temperature approach values, each temperature step interval having an input interval indicating heat extracted collectively from the plurality of hot process streams, an output interval indicating heat collectively applied to the plurality of cold process streams, and an output interval indicating surplus heat available for a next of the plurality of temperature step intervals;

determining a global heating energy utility interval for exchangeable energy for the non-thermodynamically constrained process using the plurality of temperature step intervals;

determining a total global heating energy utility interval for the non-thermodynamically constrained process responsive to determining the global heating energy utility interval;

determining a global cooling energy utility interval for exchangeable energy for the non-thermodynamically constrained process responsive to determining the global heating energy utility interval for exchangeable energy;

determining a total global cooling energy utility interval for the non-thermodynamically constrained process responsive to determining the global cooling energy utility interval for exchangeable energy;

performing each of the operations of assigning a set of a plurality of stream-specific minimum temperature approach values, decreasing a value of one of the plurality of minimum temperature approach values assigned to a corresponding one of the plurality of hot process streams, determining a plurality of temperature step intervals, determining a global heating energy utility interval for exchangeable energy, determining a total global heating energy utility interval, determining a global cooling energy utility interval for exchangeable energy, and determining a total global cooling energy utility interval, for each other of the plurality of hot process streams to thereby form a plurality of different sets of minimum temperature approach values and a corresponding plurality of global minimum heating and global minimum cooling energy utility values;

determining a set of minimum temperature approach values of the plurality of different sets of minimum temperature approach values resulting in a maximum decrease in the total global minimum heating energy utility value defining a determined optimal set of minimum approach temperature values, the total global minimum cooling energy utility value, or the total global minimum heating energy utility value and total global minimum cooling energy utility value, associated therewith defining a desired one or more optimal global minimum energy values; and determining optimal process conditions that render the desired one or more optimal global minimum energy values responsive to the determined optimal set of minimum approach temperature values.

2. A system as defined in claim 1, wherein the plurality of hot process streams include at least one existing hot process stream to be cooled and the plurality of cold process streams include at least one existing cold process stream to be heated to define a plurality of existing process streams, and wherein the operation of determining optimal process conditions that render the desired one or more optimal global minimum energy values, includes:

determining an optimal supply temperature, an optimal target temperature, and an optimal flowrate for each of the plurality of existing process streams.

3. A system as defined in claim 2, wherein the energy utility consumption modeling program product further includes instructions to perform the operations of:

performing one or more of the following: creating a new hot process stream to be cooled and creating a new cold process stream to be heated, defining one or more newly created process streams; and determining optimal process conditions for each of the one or more newly created process streams, to include determining an optimal supply temperature, an optimal target temperature, and an optimal flowrate for each of the one or more newly created process streams.

4. A system as defined in claim 1, wherein the energy utility consumption modeling program product further includes instructions to perform the operation of determining stream-by-stream for each of the plurality of temperature step intervals, a load value of non-exchangeable energy to be obtained from at least one external hot utility for the respective temperature step interval and each preceding temperature step interval to thereby determine a total of non-exchangeable energy to be obtained from the at least one external hot utility; and wherein the operation of determining the total global heating energy utility interval is performed by adding the global heating energy utility interval for exchangeable energy for the non-thermodynamically constrained process and the total of non-exchangeable energy to be obtained from at least one external hot utility required for the plurality of temperature step intervals.

5. A system as defined in claim 4, wherein the energy utility consumption modeling program product further includes instructions to perform the operations of:

determining a symmetric image of the global heating energy utility interval for exchangeable energy responsive to determining the global heating energy utility interval for exchangeable energy;

applying the symmetric image to the plurality of temperature step intervals to thereby determine the global cooling energy utility interval for exchangeable energy for the non-thermodynamically constrained process; and determining the global cooling energy utility interval for exchangeable energy for the non-thermodynamically constrained process responsive to applying the symmetric image to the plurality of temperature step intervals.

6. A system as defined in claim 5, wherein the energy utility consumption modeling program product further includes instructions to perform the operation of determining stream-by-stream for each separate one of the first plurality of temperature step intervals, a load value of non-exchangeable energy to be obtained from at least one external cold utility for the respective temperature step interval and each following temperature step interval to thereby determine a total of non-exchangeable energy to be obtained from the at least one external cold utility; and wherein the operation of determining the total global cooling energy utility interval is performed by adding the optimal global cooling energy utility interval for exchangeable energy for the non-thermodynamically constrained process and the total of non-exchangeable energy to be obtained from at least one external cold utility required for the plurality of temperature step intervals.

7. A system as defined in claim 1, wherein the plurality of sets of minimum temperature approach values is a first plurality of different sets of minimum temperature approach values;

wherein the plurality of global minimum heating and global minimum cooling energy utility values is a first plurality of global minimum heating and global minimum cooling energy utility values; and wherein the energy utility consumption modeling program product further includes instructions to perform the operations of:

assigning each of the plurality of minimum temperature approach values of the set of minimum temperature approach values determined to result in a maximum decrease in one or more of the global energy utility values as an upper minimum temperature approach value limit for each corresponding one of the plurality of hot streams to define an upper base minimum temperature approach value limit set for the plurality of hot streams, performing each of the operations of decreasing a value of one of the plurality of minimum temperature approach value assigned to one of the plurality of hot process streams, determining a plurality of temperature step intervals, determining a global heating energy utility interval for exchangeable energy, determining an total global heating energy utility interval, and determining a total global cooling energy utility interval, for each of the plurality of hot process streams using the upper base minimum temperature approach value limit set to thereby form a second plurality of different sets of minimum temperature approach values and a corresponding second plurality of global minimum heating and global minimum cooling energy utility values, and determining a set of minimum temperature approach values of the second plurality of different sets of minimum temperature approach values resulting in a maximum decrease in the total global minimum heating energy utility value, the total global minimum cooling energy utility value, or the total global minimum heating energy utility value and total global minimum cooling energy utility value, associated therewith.

8. A system as defined in claim 1, wherein the input indicating heat extracted collectively from the plurality of hot process streams includes a pair of inputs defining a high-end and a low-end value of the range of values indicating heat extracted collectively from the plurality of hot process streams; and wherein a first value for the one of the plurality of stream-specific minimum temperature approach values is set to a user defined highest value for all hot process streams to establish a global maximum energy target values for the constrained process.

9. A system as defined in claim 1, wherein the operation of receiving a first plurality of sets of values each separately defining a potential range of attribute values for at least one of the plurality of hot process streams includes receiving a potential range of attribute values for at least one dummy heat carrier resource stream having a type different than that of the at least one non-thermodynamically constrained process stream and the at least one other process stream;

wherein the operation of determining a first plurality of temperature step intervals is further responsive to the potential range of attribute values for the at least one dummy heat carrier stream; and wherein the energy utility consumption modeling program product further includes instructions to perform the operation of determining an optimal value of a target temperature and the heat capacity flow rate of the at least one dummy heat carrier stream.

10. A system as defined in claim 1, wherein the operation of receiving a first plurality of sets of values each separately defining a potential range of attribute values for at least one of the plurality of hot process streams includes receiving a range of attribute values for a potential heat capacity flow rate for a dummy heat carrier stream;

wherein the operation of determining a plurality of temperature step intervals is further responsive to the range of attribute values for the dummy heat carrier stream; and wherein the energy utility consumption modeling program product further includes instructions to perform the operation of determining an optimal value of the target temperature and the heat capacity flow rate of the dummy heat carrier stream.

11. A system to model the energy consumption of a non-thermodynamically constrained waste heat recovery process, the non-thermodynamically constrained process using a plurality of process streams including at least one non-thermodynamically constrained process stream, the system comprising:

an energy utility consumption modeling computer including a processor and memory coupled to the processor;

energy utility consumption modeling program product to target and optimize non-thermodynamically constrained waste heat recovery for the non-thermodynamically constrained process, the program product stored in the memory of the energy utility consumption modeling computer and including instructions that when executed by the energy utility modeling computer, cause the computer to perform the operations of:

receiving a first plurality of sets of range attribute values each separately defining a potential range of attribute values for an attribute of one of a plurality of hot process streams and a second plurality of sets of range attribute values each separately defining a potential range of attribute values of an attribute of one of a plurality of cold process streams, and indicia of the non-thermodynamically constrained process stream collectively defining input data, the first and the second plurality of sets of range attribute values collectively including at least one set of a range of attribute values for at least one attribute of the non-thermodynamically constrained process stream constrained from matching at least one other process stream due to a non-thermodynamic constraint, determining a global minimum energy utility value for exchangeable energy for the non-thermodynamically constrained process for each of a plurality of potential combinations of a plurality of stream-specific minimum temperature approach values assigned to each of the plurality of hot process streams responsive to the input data, the global minimum energy utility for exchangeable energy comprising one of the following: optimal global minimum heating energy value for exchangeable energy and optimal global minimum cooling energy value for exchangeable energy, a number of the potential combinations of stream-specific minimum temperature approach values being at least that of a sum of a number of the plurality of hot streams and a number of the plurality of cold streams, determining a total of non-exchangeable energy to be obtained from at least one external utility for the non-thermodynamically constrained process for each of the plurality of potential combinations of a plurality of stream-specific minimum temperature approach values assigned to each of the plurality of hot process streams responsive to the input data, the total of non-exchangeable energy to be obtained from at least one external utility comprising one of the following: total of non-exchangeable heating energy to be obtained from at least one external hot utility and total of non-exchangeable cooling energy to be obtained from at least one external cold utility, determining an optimal total energy consumption value for the non-thermodynamically constrained process responsive to the determined global minimum energy utility value for the non-thermodynamically constrained process and the total of non-exchangeable energy to be obtained from the at least one external utility, for each of the plurality of potential combinations of the plurality of stream-specific minimum temperature approach values, and determining optimal process conditions that render the optimal total energy consumption value responsive to the determined optimal total energy consumption value.

12. A system as defined in claim 11, wherein the plurality of hot process streams include at least one existing hot process stream to be cooled and the plurality of cold process streams include at least one existing cold process stream to be heated to define a plurality of existing process streams, and wherein the operation of determining optimal process conditions that render the optimal total energy consumption value includes:

determining an optimal supply temperature, an optimal target temperature, and an optimal flowrate for each of the plurality of existing process streams.

13. A system as defined in claim 12, wherein the energy utility consumption modeling program product further includes instructions to perform the operations of:

performing one or more of the following: creating a new hot process stream to be cooled and creating a new cold process stream to be heated, defining a corresponding one or more newly created process streams; and determining optimal process conditions for each of the one or more newly created process streams, to include determining an optimal supply temperature, an optimal target temperature, and an optimal flowrate for each of the one or more newly created process streams.

14. A system as defined in claim 11, wherein the energy utility consumption modeling program product further includes instructions to perform the operations of:

assigning a set of stream-specific minimum temperature approach values for each of the plurality of hot process streams, the set of stream-specific minimum temperature approach values indicating the plurality of stream-specific minimum temperature approach values between each respective one of the hot streams and the plurality of cold process streams;

receiving a desired utility heating or cooling energy utility target as an energy objective;

collapsing a process conditions interval for process conditions for one of the plurality of hot process streams to render a discrete boundary value for the one of the plurality of hot process streams, the process conditions of the other of the plurality of hot process streams remaining in the form of intervals;

decreasing a minimum temperature approach value of one of the plurality of hot streams by one degree;

determining an effect of the decrease in the minimum temperature approach value on the desired utility target;

repeating the operations of decreasing the minimum temperature approach value and determining the effect of the decrease to thereby determine the optimal minimum temperature approach value for the one of the plurality of hot streams; and performing the operations of collapsing a process conditions interval, decreasing a minimum temperature approach value, determining the effect of the decrease, and repeating the operations of decreasing a minimum temperature approach value and determining the effect of the decrease for each other of the plurality of hot streams to thereby determine the optimal minimum temperature approach value for each of the plurality of hot process streams.

15. Energy utility consumption modeling program product to target and optimize non-thermodynamically constrained waste heat recovery for a non-thermodynamically constrained process, the non-thermodynamically constrained process using a plurality of resource streams including at least one non-thermodynamically constrained process stream, the program product comprising a set of instructions stored in a tangible computer readable medium, that when executed by a computer, cause the computer to perform the operations of:

determining for each of a plurality of temperature step intervals for each separate one of a plurality of different sets of minimum temperature approach values assigned to a plurality of hot process streams, a load value of exchangeable energy to be obtained from at least one process stream for each respective temperature step interval responsive to at least one set of a range of attribute values for a non-thermodynamically constrained process stream, at least one set of a range of attribute values for a not non-thermodynamically constrained process stream, and indicia of at least one non-thermodynamic constraint collectively defining input data to thereby determine a global minimum energy utility value for each of the plurality of different sets of minimum temperature approach values;

determining an optimal global minimum energy utility value for exchangeable energy for the non-thermodynamically constrained process responsive to the global minimum energy utility values determined for each of the plurality of different sets of minimum temperature approach values, the optimal global minimum energy utility for exchangeable energy comprising one of the following: an optimal global minimum heating energy value for exchangeable energy and an optimal global minimum cooling energy value for exchangeable energy;

determining for each of the plurality of temperature step intervals for each of the plurality of different sets of minimum temperature approach values, a load value of non-exchangeable energy to be obtained from the at least one external utility for the respective temperature step interval to thereby determine a total of non-exchangeable energy to be obtained from the at least one external utility for the non-thermodynamically constrained process for each of the plurality of different sets of minimum temperature approach values, the respective total of non-exchangeable energy to be obtained from at least one external utility comprising one of the following: total of non-exchangeable heating energy to be obtained from at least one external hot utility and total of non-exchangeable cooling energy to be obtained from at least one external cold utility;

determining an optimal total energy consumption value for the non-thermodynamically constrained process responsive to the determined optimal global minimum energy utility value for the non-thermodynamically constrained process and the determined total of non-exchangeable energy associated therewith; and determining optimal process conditions that render the optimal total energy consumption value responsive to the determined optimal total energy consumption value.

16. Program product as defined in claim 15, wherein the plurality of resource streams include at least one existing hot process stream to be cooled and at least one existing cold process stream to be heated to define a plurality of existing process streams, and wherein the operation of determining optimal process conditions that render the optimal total energy consumption value includes:
  determining an optimal supply temperature, an optimal target temperature, and an optimal flowrate for each of the plurality of existing process streams.

17. Program product as defined in claim 16, wherein the energy utility consumption modeling program product further includes instructions to perform the operations of:
  performing one or more of the following: creating a new hot process stream to be cooled and creating a new cold process stream to be heated defining one or more newly created process streams; and
  determining optimal process conditions for each of the one or more newly created process streams, to include determining an optimal supply temperature, an optimal target temperature, and an optimal flowrate for each of the one or more newly created process streams.

18. Program product as defined in claim 15,
  wherein the determined optimal global minimum energy utility value for exchangeable energy for the non-thermodynamically constrained process comprises the optimal global minimum heating energy value for exchangeable energy for the non-thermodynamically constrained process;
  wherein the determined total of non-exchangeable energy to be obtained from the at least one external utility comprises a total of non-exchangeable heating energy to be obtained from at least one external hot utility associated with the respective global minimum heating energy value for exchangeable energy for the non-thermodynamically constrained process;
  wherein the optimal total energy consumption value comprises an optimal total global minimum heating energy utility value for the non-thermodynamically constrained process; and
  wherein the optimal total global minimum heating energy utility value for the non-thermodynamically constrained process includes a sum of the optimal global minimum heating energy value for exchangeable energy for the non-thermodynamically constrained process and the total of non-exchangeable heating energy to be obtained from the at least one external hot utility associated therewith.

19. Program product as defined in claim 15, wherein the operations further comprise:
  determining stream-by-stream for each separate one of the plurality of temperature step intervals for each separate one of the plurality of different sets of minimum temperature approach values assigned to the plurality of hot process streams, a load value of non-exchangeable energy to be obtained from the at least one external hot utility for the respective interval and each preceding interval to thereby determine the total of non-exchangeable heating energy to be obtained from the at least one external hot utility.

20. Program product as defined in claim 15,
  wherein the determined optimal global minimum energy utility value for exchangeable energy for the non-thermodynamically constrained process comprises the optimal global minimum cooling energy value for exchangeable energy for the non-thermodynamically constrained process;
  wherein the determined total of non-exchangeable energy to be obtained from the at least one external utility comprises a total of non-exchangeable cooling energy to be obtained from at least one external cold utility associated with the respective global minimum cooling energy value for exchangeable energy for the non-thermodynamically constrained process;
  wherein the optimal total energy consumption value comprises an optimal total global minimum cooling energy utility value for the non-thermodynamically constrained process; and
  wherein the optimal total global minimum cooling energy utility value for the non-thermodynamically constrained process includes a sum of the optimal global minimum cooling energy value for exchangeable energy for the non-thermodynamically constrained process and the total non-exchangeable cooling energy to be obtained from the at least one external cold utility associated therewith.

21. Program product as defined in claim 20, wherein the operations further comprise:
  determining stream-by-stream for each separate one of the plurality of temperature step intervals for each separate one of the plurality of different sets of minimum temperature approach values assigned to the plurality of hot process streams, a load value of non-exchangeable energy to be obtained from at least one external cold utility for the respective interval and each following interval to thereby determine the total non-exchangeable energy to be obtained from the at least one external cold utility.

22. Program product as defined in claim 15, wherein the operations further comprise:
  assigning a different set of stream-specific minimum temperature approach values for each of the plurality of hot process streams, each set of stream-specific minimum temperature approach values indicating the plurality of stream-specific minimum temperature approach values between each respective one of the hot process streams and a plurality of cold process streams;
  receiving a selected utility heating or cooling energy utility target as an energy objective;
  determining a global minimum energy utility value for exchangeable energy for the non-thermodynamically constrained process for each of the plurality of different sets of minimum temperature approach values;
  collapsing a process conditions interval for process conditions for one of the plurality of hot process streams to render a discrete boundary value for the one of the plurality of hot process streams, the process conditions of the other of the plurality of hot process streams remaining in the form of intervals;
  decreasing a minimum temperature approach value of one of the plurality of hot streams by one degree;
  determining an effect of the decrease in the minimum temperature approach value on the utility target;
  repeating the operations of decreasing the minimum temperature approach value and determining the effect of the decrease to determine the optimal minimum temperature approach value for the one of the plurality of hot streams; and
  performing the operations of collapsing a process conditions interval, decreasing a minimum temperature approach value, determining the effect of the decrease, and repeating the operations of decreasing a minimum temperature approach value and determining the effect of the decrease for each other of the plurality of hot streams to thereby determine the optimal minimum temperature approach value for each of the plurality of hot process streams.

23. Program product as defined in claim 15, wherein the operations further comprise:
receiving the at least one set of a range of attribute values for at least one attribute of the at least one non-thermodynamically constrained process streams;
receiving the at least one set of a range of attribute values for at least one attribute of at least one not non-thermodynamically constrained process stream; and
receiving a stream list comprising an identification of the non-thermodynamically constrained process stream constrained from matching at least one other process stream due to a non-thermodynamic constraint.

24. Program product as defined in claim 23, wherein the operations further comprise:
receiving at least one set of a range of attribute values for at least one dummy heat carrier resource stream having a type different than that of the at least one non-thermodynamically constrained process stream and the at least one other process stream, the at least one dummy heat carrier resource stream representing at least one potential additional resource stream that could be added to the non-thermodynamically constrained process with minimal capital cost;
recalculating the optimal total energy consumption value for the non-thermodynamically constrained process responsive to the received at least one set of a range of attribute values for the at least one non-thermodynamically constrained process stream and the at least one not non-thermodynamically constrained process stream, the received stream list, and the at least one set of a range of attribute values for the at least one dummy heat carrier stream; and
wherein the operation of determining a load value of exchangeable energy for each of a plurality of temperature step intervals for each separate one of a plurality of different sets of minimum temperature approach values is further responsive to the range of attribute values for the at least one dummy heat carrier stream.

25. Program product as defined in claim 15, wherein the operations further comprise:
receiving at least one set of a range of attribute values for at least one dummy heat carrier stream representing at least one potential additional resource stream that could be added to the non-thermodynamically constrained process with minimal capital cost;
recalculating the optimal total energy consumption value for the non-thermodynamically constrained process responsive to the received at least one set of a range of attribute values for the at least one non-thermodynamically constrained process stream and the at least one not non-thermodynamically constrained process stream, the received stream list, and the at least one set of a range of attribute values for the at least one dummy heat carrier stream; and
wherein the operation of determining a load value of exchangeable energy for each of a plurality of temperature step intervals for each separate one of a plurality of different sets of minimum temperature approach values is further responsive to the range of attribute values for the at least one dummy heat carrier stream.

26. Program product as defined in claim 15, wherein the operations further comprise:
receiving at least one set of a range of attribute values for a dummy heat carrier stream representing a potential additional resource stream that could be added to the non-thermodynamically constrained process with minimal capital cost; and
wherein the operation of determining optimal process conditions that render the optimal total energy consumption value further includes the operation of determining an optimal target temperature and heat capacity flow rate of the dummy heat carrier stream.

27. Energy utility consumption modeling program product to target and optimize non-thermodynamically constrained waste heat recovery for a non-thermodynamically constrained process, the non-thermodynamically constrained process using a plurality of process streams including at least one non-thermodynamically constrained process stream, the program product comprising a set of instructions stored in a tangible computer readable medium, that when executed by a computer, cause the computer to perform the operations of:
receiving at least one set of a range of attribute values for at least one attribute of the non-thermodynamically constrained process stream constrained from matching at least one other process stream due to a non-thermodynamic constraint, at least one set of a range of attribute values for at least one attribute of a not non-thermodynamically constrained process stream, and indicia of the non-thermodynamically constrained process stream collectively defining input data;
determining a global minimum energy utility value for exchangeable energy for the non-thermodynamically constrained process for each separate one of a plurality of potential combinations of a plurality of stream-specific minimum temperature approach values responsive to the input data;
determining an optimal global minimum energy utility value for exchangeable energy for the non-thermodynamically constrained process responsive to the global minimum energy utility value for each of the plurality of potential combinations of the plurality of stream-specific minimum temperature approach values, the optimal global minimum energy utility for exchangeable energy comprising one of the following: an optimal global minimum heating energy value for exchangeable energy and an optimal global minimum cooling energy value for exchangeable energy;
determining a total of non-exchangeable energy to be obtained from at least one external utility for the non-thermodynamically constrained process for each of the plurality of potential combinations of the plurality of stream-specific minimum temperature approach values responsive to the input data, the total of non-exchangeable energy to be obtained from at least one external utility comprising one of the following: a total of non-exchangeable heating energy to be obtained from at least one external hot utility and a total of non-exchangeable cooling energy to be obtained from at least one external cold utility;
determining an optimal total energy consumption value for the non-thermodynamically constrained process responsive to the determined optimal global minimum energy utility value for the non-thermodynamically constrained process and the determined total of non-exchangeable energy associated therewith; and
determining optimal process conditions that render the optimal total energy consumption value responsive to the determined optimal total energy consumption value.

28. Program product as defined in claim 27, wherein the plurality of process streams include at least one existing hot process stream to be cooled and at least one existing cold process stream to be heated to define a plurality of existing process streams, and wherein the operation of determining optimal process conditions that render the optimal total energy consumption value, includes:
determining an optimal supply temperature, an optimal target temperature, and an optimal flowrate for each of the plurality of existing process streams.

29. Program product as defined in claim 28, wherein the energy utility consumption modeling program product further includes instructions to perform the operations of:
performing one or more of the following: creating a new hot process stream to be cooled and creating a new cold process stream to be heated defining one or more newly created process streams; and
determining optimal process conditions for each of the one or more newly created process streams, to include determining an optimal supply temperature, an optimal target temperature, and an optimal flowrate for each of the one or more newly created process streams.

30. Program product as defined in claim 27,
wherein the input data further comprises at least one set of a range of attribute values for at least one dummy heat carrier resource stream having a type different than that of the non-thermodynamically constrained process stream, the not non-thermodynamically constrained process stream, and the at least one other process stream, the at least one dummy heat carrier resource stream representing at least one potential additional resource stream that could be added to the non-thermodynamically constrained process with minimal capital cost; and
wherein the operation of determining a global minimum energy utility value for exchangeable energy for the non-thermodynamically constrained process for each of the plurality of potential combinations of the plurality of stream-specific minimum temperature approach values is further responsive to the range of attribute values for the at least one dummy heat carrier stream.

31. Program product as defined in claim 30, wherein the operations further comprise:
determining for each of a plurality of temperature step intervals for each separate one of the plurality of potential combinations of the plurality of stream-specific minimum temperature approach values, a load value of exchangeable energy to be obtained from at least one process stream for each respective temperature step interval responsive to the input data.

32. Program product as defined in claim 31,
wherein the determined optimal global minimum energy utility value for exchangeable energy for the non-thermodynamically constrained process comprises the optimal global minimum heating energy value for exchangeable energy for the non-thermodynamically constrained process;
wherein the determined total of non-exchangeable energy to be obtained from the at least one external utility comprises total of non-exchangeable heating energy to be obtained from at least one external hot utility associated with the respective global minimum heating energy value for exchangeable energy for the non-thermodynamically constrained process;
wherein the optimal total energy consumption value comprises an optimal total global minimum heating energy utility value for the non-thermodynamically constrained process;
wherein the optimal total global minimum heating energy utility value for the non-thermodynamically constrained process includes a sum of the optimal global minimum heating energy value for exchangeable energy for the non-thermodynamically constrained process and the total of non-exchangeable heating energy to be obtained from the at least one external hot utility associated therewith; and
wherein the operations further comprise determining stream-by-stream for each separate one of the plurality of temperature step intervals for each separate one of the plurality of potential combinations of the plurality of stream-specific minimum temperature approach values, a load value of non-exchangeable energy to be obtained from the at least one external hot utility for the respective interval and each preceding interval to thereby determine the total of non-exchangeable heating energy to be obtained from the at least one external hot utility.

33. Program product as defined in claim 31,
wherein the determined optimal global minimum energy utility value for exchangeable energy for the non-thermodynamically constrained process comprises the optimal global minimum cooling energy value for exchangeable energy for the non-thermodynamically constrained process;
wherein the determined total of non-exchangeable energy to be obtained from the at least one external utility comprises total of non-exchangeable cooling energy to be obtained from at least one external cold utility associated with the respective global minimum cooling energy value for exchangeable energy for the non-thermodynamically constrained process;
wherein the optimal total energy consumption value comprises an optimal total global minimum cooling energy utility value for the non-thermodynamically constrained process;
wherein the optimal total global minimum cooling energy utility value for the non-thermodynamically constrained process includes a sum of the optimal global minimum cooling energy value for exchangeable energy for the non-thermodynamically constrained process and the total non-exchangeable cooling energy to be obtained from the at least one external cold utility associated therewith; and
wherein the operations further comprise determining stream-by-stream for each separate one of the plurality of temperature step intervals for each separate one of the plurality of potential combinations of the plurality of stream-specific minimum temperature approach values, a load value of non-exchangeable energy to be obtained from the at least one external cold utility for the respective interval and each following interval to thereby determine the total non-exchangeable energy to be obtained from the at least one external cold utility.

34. Program product as defined in claim 27, wherein the operations further comprise:
receiving at least one set of a range of attribute values for a dummy heat carrier stream representing a potential additional resource stream that could be added to the non-thermodynamically constrained process with minimal capital cost; and
wherein the operation of determining optimal process conditions that render the optimal total energy consumption value further includes the operation of determining an optimal target temperature and heat capacity flow rate of the dummy heat carrier stream.

35. Program product as defined in claim 27, wherein the plurality of process streams includes a plurality of hot process streams and a plurality of cold process streams, and wherein the operations further comprise:
assigning a different set of stream-specific minimum temperature approach values for each of the plurality of hot process streams, each set of stream-specific minimum temperature approach values indicating the plurality of stream-specific minimum temperature approach values between each respective one of the hot process streams and the plurality of cold process streams;

receiving a selected utility heating or cooling energy utility target as an energy objective;

determining a global minimum energy utility value for exchangeable energy for the non-thermodynamically constrained process for each of the plurality of different sets of minimum temperature approach values;

collapsing a process conditions interval for process conditions for one of the plurality of hot process streams to render a discrete boundary value for the one of the plurality of hot process streams, the process conditions of the other of the plurality of hot process streams remaining in the form of intervals;

decreasing a minimum temperature approach value of one of the plurality of hot streams by one degree;

determining an effect of the decrease in minimum temperature approach value on the utility target;

repeating the steps of decreasing the minimum temperature approach value and determining the effect of the decrease to determine the optimal minimum temperature approach value for the one of the plurality of hot streams; and performing the steps of collapsing a process conditions interval, decreasing a minimum temperature approach value, determining the effect of the decrease, and repeating the steps of decreasing a minimum temperature approach value and determining the effect of the decrease for each other of the plurality of hot streams to thereby determine the optimal minimum temperature approach value for each of the plurality of hot process streams.

36. A computer implemented method of modeling energy consumption of a non-thermodynamically constrained waste heat recovery process, the constrained process using a plurality of resource streams including at least one non-thermodynamically constrained process stream, the method comprising the steps of:

determining for each of a plurality of temperature step intervals for each separate one of a plurality of different sets of minimum temperature approach values assigned to a plurality of hot process streams, a load value of exchangeable energy to be obtained from at least one process stream for each respective temperature step interval responsive to at least one set of a range of attribute values for a non-thermodynamically constrained process stream, at least one set of a range of attribute values for a not non-thermodynamically constrained process stream, and indicia of at least one non-thermodynamic constraint collectively defining input data to thereby determine a global minimum energy utility value for each of the plurality of different sets of minimum temperature approach values;

determining an optimal global minimum energy utility value for exchangeable energy for the non-thermodynamically constrained process responsive to the global minimum energy utility values determined for each of the plurality of different sets of minimum temperature approach values, the optimal global minimum energy utility for exchangeable energy comprising one of the following: an optimal global minimum heating energy value for exchangeable energy and an optimal global minimum cooling energy value for exchangeable energy;

determining for each of the plurality of temperature step intervals for each of the plurality of different sets of minimum temperature approach values, a load value of non-exchangeable energy to be obtained from the at least one external utility for the respective temperature step interval to thereby determine a total of non-exchangeable energy to be obtained from the at least one external utility for the non-thermodynamically constrained process for each of the plurality of different sets of minimum temperature approach values, the respective total of non-exchangeable energy to be obtained from at least one external utility comprising one of the following: total of non-exchangeable heating energy to be obtained from at least one external hot utility and total of non-exchangeable cooling energy to be obtained from at least one external cold utility;

determining an optimal total energy consumption value for the non-thermodynamically constrained process responsive to the determined optimal global minimum energy utility value for the non-thermodynamically constrained process and the determined total of non-exchangeable energy associated therewith; and determining optimal process conditions that render the optimal total energy consumption value responsive to the determined optimal total energy consumption value.

37. A method as defined in claim 36, wherein the plurality of resource streams include at least one existing hot process stream to be cooled and at least one existing cold process stream to be heated to define a plurality of existing process streams, and wherein the step of determining optimal process conditions that render the optimal total energy consumption value, includes the step of:

determining an optimal supply temperature, an optimal target temperature, and an optimal flowrate for each of the plurality of existing process streams.

38. A method as defined in claim 37, further comprising the steps of:

performing one or more of the following: creating a new hot process stream to be cooled and creating a new cold process stream to be heated defining one or more newly created process streams; and determining optimal process conditions for each of the one or more newly created process streams, to include determining an optimal supply temperature, an optimal target temperature, and an optimal flowrate for each of the one or more newly created process streams.

39. A method as defined in claim 36, wherein the determined optimal global minimum energy utility value for exchangeable energy for the non-thermodynamically constrained process comprises the optimal global minimum heating energy value for exchangeable energy for the non-thermodynamically constrained process;

wherein the determined total of non-exchangeable energy to be obtained from the at least one external utility comprises a total of non-exchangeable heating energy to be obtained from at least one external hot utility associated with the respective global minimum heating energy value for exchangeable energy for the non-thermodynamically constrained process;

wherein the optimal total energy consumption value comprises an optimal total global minimum heating energy utility value for the non-thermodynamically constrained process; and wherein the optimal total global minimum heating energy utility value for the non-thermodynamically constrained process includes a sum of the optimal global minimum heating energy value for exchangeable energy for the non-thermodynamically constrained process and the total of non-exchangeable heating energy to be obtained from the at least one external hot utility associated therewith.

40. A method as defined in claim 36, further comprising the step of:
   determining stream-by-stream for each separate one of the plurality of temperature step intervals for each separate one of the plurality of different sets of minimum temperature approach values assigned to the plurality of hot process streams, a load value of non-exchangeable energy to be obtained from the at least one external hot utility for the respective interval and each preceding interval to thereby determine the total of non-exchangeable heating energy to be obtained from the at least one external hot utility.

41. A method as defined in claim 36,
   wherein the determined optimal global minimum energy utility value for exchangeable energy for the non-thermodynamically constrained process comprises the optimal global minimum cooling energy value for exchangeable energy for the non-thermodynamically constrained process;
   wherein the determined total of non-exchangeable energy to be obtained from the at least one external utility comprises a total of non-exchangeable cooling energy to be obtained from at least one external cold utility associated with the respective global minimum cooling energy value for exchangeable energy for the non-thermodynamically constrained process;
   wherein the optimal total energy consumption value comprises an optimal total global minimum cooling energy utility value for the non-thermodynamically constrained process; and
   wherein the optimal total global minimum cooling energy utility value for the non-thermodynamically constrained process includes a sum of the optimal global minimum cooling energy value for exchangeable energy for the non-thermodynamically constrained process and the total non-exchangeable cooling energy to be obtained from the at least one external cold utility associated therewith.

42. A method as defined in claim 41, further comprising the step of:
   determining stream-by-stream for each separate one of the plurality of temperature step intervals for each separate one of the plurality of different sets of minimum temperature approach values assigned to the plurality of hot process streams, a load value of non-exchangeable energy to be obtained from at least one external cold utility for the respective interval and each following interval to thereby determine the total non-exchangeable energy to be obtained from the at least one external cold utility.

43. A method as defined in claim 36, wherein the plurality of resource streams includes the plurality of hot process streams and a plurality of cold process streams, the method further comprising the steps of:
   assigning a different set of stream-specific minimum temperature approach values for each of the plurality of hot process streams, each set of stream-specific minimum temperature approach values indicating the plurality of stream-specific minimum temperature approach values between each respective one of the hot process streams and the plurality of cold process streams;
   receiving a selected utility heating or cooling energy utility target as an energy objective;
   determining a global minimum energy utility value for exchangeable energy for the non-thermodynamically constrained process for each of the plurality of different sets of minimum temperature approach values;
   collapsing a process conditions interval for process conditions for one of the plurality of hot process streams to render a discrete boundary value for the one of the plurality of hot process streams, the process conditions of the other of the plurality of hot process streams remaining in the form of intervals;
   decreasing a minimum temperature approach value of one of the plurality of hot streams by one degree;
   determining an effect of the decrease in the minimum temperature approach value on the utility target;
   repeating the steps of decreasing the minimum temperature approach value and determining the effect of the decrease to determine the optimal minimum temperature approach value for the one of the plurality of hot streams; and
   performing the steps of collapsing a process conditions interval, decreasing a minimum temperature approach value, determining the effect of the decrease, and repeating the steps of decreasing a minimum temperature approach value and determining the effect of the decrease for each other of the plurality of hot streams to thereby determine the optimal minimum temperature approach value for each of the plurality of hot process streams.

44. A method as defined in claim 36, further comprising the steps of:
   receiving the at least one set of a range of attribute values for at least one attribute of the at least one non-thermodynamically constrained process streams;
   receiving the at least one set of a range of attribute values for at least one attribute of at least one not non-thermodynamically constrained process stream; and
   receiving a stream list comprising an identification of the non-thermodynamically constrained process stream constrained from matching at least one other process stream due to a non-thermodynamic constraint.

45. A method as defined in claim 44, further comprising the steps of:
   receiving at least one set of a range of attribute values for at least one dummy heat carrier stream representing a potential additional resource stream that could be added to the non-thermodynamically constrained process with minimal capital cost;
   recalculating the optimal total energy consumption value for the non-thermodynamically constrained process responsive to the received at least one set of a range of attribute values for the at least one non-thermodynamically constrained process stream and the at least one not non-thermodynamically constrained process stream, the received stream list, and the at least one set of a range of attribute values for the at least one dummy heat carrier stream; and
   wherein the step of determining a load value of exchangeable energy for each of a plurality of temperature step intervals for each separate one of a plurality of different sets of minimum temperature approach values is further responsive to the range of attribute values for the at least one dummy heat carrier stream.

46. A method as defined in claim 36, further comprising the step of:

receiving at least one set of a range of attribute values for a dummy heat carrier stream representing a potential additional resource stream that could be added to the non-thermodynamically constrained process with minimal capital cost; and wherein the step of determining optimal process conditions that render the optimal total energy consumption value further includes the step of determining an optimal target temperature and heat capacity flow rate of the dummy heat carrier stream.

47. A computer implemented method of modeling energy consumption of a non-thermodynamically constrained waste heat recovery process, the non-thermodynamically constrained process using a plurality of resource streams including at least one non-thermodynamically constrained process stream, the method comprising the steps of:

receiving at least one set of a range of attribute values for at least one attribute of the non-thermodynamically constrained process stream constrained from matching at least one other process stream due to a non-thermodynamic constraint, at least one set of a range of attribute values for at least one attribute of a not non-thermodynamically constrained process stream, and indicia of the non-thermodynamically constrained process stream collectively defining input data;

determining a global minimum energy utility value for exchangeable energy for the non-thermodynamically constrained process for each separate one of a plurality of potential combinations of a plurality of stream-specific minimum temperature approach values responsive to the input data;

determining an optimal global minimum energy utility value for exchangeable energy for the non-thermodynamically constrained process responsive to the global minimum energy utility value for each of the plurality of potential combinations of the plurality of stream-specific minimum temperature approach values, the optimal global minimum energy utility for exchangeable energy comprising one of the following: an optimal global minimum heating energy value for exchangeable energy and an optimal global minimum cooling energy value for exchangeable energy;

determining a total of non-exchangeable energy to be obtained from at least one external utility for the non-thermodynamically constrained process for each of the plurality of potential combinations of the plurality of stream-specific minimum temperature approach values, responsive to the input data, the total of non-exchangeable energy to be obtained from at least one external utility comprising one of the following: total of non-exchangeable heating energy to be obtained from at least one external hot utility and total of non-exchangeable cooling energy to be obtained from at least one external cold utility;

determining an optimal total energy consumption value for the non-thermodynamically constrained process responsive to the determined optimal global minimum energy utility value for the non-thermodynamically constrained process and the determined total of non-exchangeable energy associated therewith; and determining optimal process conditions that render the optimal total energy consumption value responsive to the determined optimal total energy consumption value.

48. A method as defined in claim 47, wherein the plurality of resource streams include at least one existing hot process stream to be cooled and at least one existing cold process stream to be heated to define a plurality of existing process streams, and wherein the step of determining optimal process conditions that render the optimal total energy consumption value, includes the steps of:

determining an optimal supply temperature, an optimal target temperature, and an optimal flowrate for each of the plurality of existing process streams.

49. A method as defined in claim 48, further comprising the steps of:

performing one or more of the following: creating a new hot process stream to be cooled and creating a new cold process stream to be heated defining one or more newly created process streams; and determining optimal process conditions for each of the one or more newly created process streams, to include determining an optimal supply temperature, an optimal target temperature, and an optimal flowrate for each of the one or more newly created process streams.

50. A method as defined in claim 36, further comprising the step of:

receiving at least one set of a range of attribute values for a dummy heat carrier stream representing a potential additional resource stream that could be added to the non-thermodynamically constrained process with minimal capital cost; and wherein the step of determining optimal process conditions that render the optimal total energy consumption value further includes the step of determining an optimal target temperature and heat capacity flow rate of the dummy heat carrier stream.

51. A method as defined in claim 47, wherein the input data further comprises at least one set of a range of attribute values for at least one dummy heat carrier resource stream having a type different than that of the non-thermodynamically constrained process stream, the not non-thermodynamically constrained process stream, and the at least one other process stream, the at least one dummy heat carrier resource stream representing at least one potential additional resource stream that could be added to the non-thermodynamically constrained process with minimal capital cost; and wherein the step of determining a global minimum energy utility value for exchangeable energy for the non-thermodynamically constrained process for each of the plurality of potential combinations of the plurality of stream-specific minimum temperature approach values is further responsive to the range of attribute values for the at least one dummy heat carrier stream.

52. A method as defined in claim 51, further comprising the step of:

determining for each of a plurality of temperature step intervals for each separate one of the plurality of potential combinations of the plurality of stream-specific minimum temperature approach values, a load value of exchangeable energy to be obtained from at least one process stream for each respective temperature step interval responsive to the input data.

53. A method as defined in claim 52, wherein the determined optimal global minimum energy utility value for exchangeable energy for the non-thermodynamically constrained process comprises the optimal global minimum heating energy value for exchangeable energy for the non-thermodynamically constrained process;

wherein the determined total of non-exchangeable energy to be obtained from the at least one external utility comprises total of non-exchangeable heating energy to be obtained from at least one external hot utility associated with the respective global minimum heating energy value for exchangeable energy for the non-thermodynamically constrained process;

wherein the optimal total energy consumption value comprises an optimal total global minimum heating energy utility value for the non-thermodynamically constrained process;

wherein the optimal total global minimum heating energy utility value for the non-thermodynamically constrained process includes a sum of the optimal global minimum heating energy value for exchangeable energy for the non-thermodynamically constrained process and the total of non-exchangeable heating energy to be obtained from the at least one external hot utility associated therewith; and wherein the steps further comprise determining stream-by-stream for each separate one of the plurality of temperature step intervals for each separate one of the plurality of potential combinations of the plurality of stream-specific minimum temperature approach values, a load value of non-exchangeable energy to be obtained from the at least one external hot utility for the respective interval and each preceding interval to thereby determine the total of non-exchangeable heating energy to be obtained from the at least one external hot utility.

54. A method as defined in claim 52, wherein the determined optimal global minimum energy utility value for exchangeable energy for the non-thermodynamically constrained process comprises the optimal global minimum cooling energy value for exchangeable energy for the non-thermodynamically constrained process;

wherein the determined total of non-exchangeable energy to be obtained from the at least one external utility comprises total of non-exchangeable cooling energy to be obtained from at least one external cold utility associated with the respective global minimum cooling energy value for exchangeable energy for the non-thermodynamically constrained process;

wherein the optimal total energy consumption value comprises an optimal total global minimum cooling energy utility value for the non-thermodynamically constrained process;

wherein the optimal total global minimum cooling energy utility value for the non-thermodynamically constrained process includes a sum of the optimal global minimum cooling energy value for exchangeable energy for the non-thermodynamically constrained process and the total of non-exchangeable cooling energy to be obtained from the at least one external cold utility associated therewith; and wherein the method further comprises the step of determining stream-by-stream for each separate one of the plurality of temperature step intervals for each separate one of the plurality of potential combinations of the plurality of stream-specific minimum temperature approach values, a load value of non-exchangeable energy to be obtained from the at least one external cold utility for the respective interval and each following interval to thereby determine the total non-exchangeable energy to be obtained from the at least one external cold utility.

55. A method as defined in claim 47, wherein the plurality of resource streams includes a plurality of hot process streams and a plurality of cold process streams, the method further comprising the steps of:

assigning a different set of stream-specific minimum temperature approach values for each of the plurality of hot process streams, each set of stream-specific minimum temperature approach values indicating the plurality of stream-specific minimum temperature approach values between each respective one of the hot process streams and the plurality of cold process streams;

receiving a desired utility heating or cooling energy utility target as an energy objective;

determining a global minimum energy utility value for exchangeable energy for the non-thermodynamically constrained process for each of the plurality of different sets of minimum temperature approach values;

collapsing a process conditions interval for process conditions for one of the plurality of hot process streams to render a discrete boundary value for the one of the plurality of hot process streams, the process conditions of the other of the plurality of hot process streams remaining in the form of intervals;

decreasing a minimum temperature approach value of one of the plurality of hot streams by one degree;

determining an effect of the decrease in minimum temperature approach value on the utility target;

repeating the steps of decreasing the minimum temperature approach value and determining the effect of the decrease to determine the optimal minimum temperature approach value for the one of the plurality of hot streams; and performing the steps of collapsing a process conditions interval, decreasing a minimum temperature approach value, determining the effect of the decrease, and repeating the steps of decreasing a minimum temperature approach value and determining the effect of the decrease for each other of the plurality of hot streams to thereby determine the optimal minimum temperature approach value for each of the plurality of hot process streams.

* * * * *